(12) United States Patent  
Anazawa et al.

(10) Patent No.: US 12,510,509 B2  
(45) Date of Patent: Dec. 30, 2025

(54) MULTI-CAPILLARY ELECTROPHORESIS INSTRUMENT

(71) Applicant: HITACHI HIGH-TECH CORPORATION, Tokyo (JP)

(72) Inventors: Takashi Anazawa, Tokyo (JP); Motohiro Yamazaki, Tokyo (JP); Ryoji Inaba, Tokyo (JP); Shuhei Yamamoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 196 days.

(21) Appl. No.: 18/567,833

(22) PCT Filed: Jul. 27, 2021

(86) PCT No.: PCT/JP2021/027630  
§ 371 (c)(1),  
(2) Date: Dec. 7, 2023

(87) PCT Pub. No.: WO2023/007567  
PCT Pub. Date: Feb. 2, 2023

(65) Prior Publication Data  
US 2024/0295527 A1  Sep. 5, 2024

(51) Int. Cl.  
*G01N 27/447* (2006.01)

(52) U.S. Cl.  
CPC . *G01N 27/44782* (2013.01); *G01N 27/44721* (2013.01)

(58) Field of Classification Search  
CPC ....... G01N 27/44782; G01N 27/44721; G01N 27/44726; G01N 27/44717; G01N 2021/6421; G01N 21/64  
See application file for complete search history.

(56) References Cited

U.S. PATENT DOCUMENTS 7,005,053 B2 * 2/2006 Yamazaki ........ G01N 27/44708  
204/601  
7,459,068 B2 * 12/2008 Nordman ......... G01N 27/44704  
204/603

(Continued)

FOREIGN PATENT DOCUMENTS

JP 4823522 B2 11/2011  
JP 6093274 B2 3/2017

(Continued)

OTHER PUBLICATIONS

International Search Report with English Translation and Written Opinion of International Patent Application No. PCT/JP2021/027630 dated Oct. 12, 2021 (8 pages).

*Primary Examiner* — Seung C Sohn  
(74) *Attorney, Agent, or Firm* — Foley & Lardner LLP

(57) ABSTRACT

In an instrument configured to spectroscopically divide fluorescences emitted from a plurality of capillaries and collectively measure the fluorescences using an image sensor, when the number of pixels of a binning region on the image sensor on which a predetermined wavelength-band component of each fluorescence is projected is denoted by $B_m$, the number of pixels of hardware binning is denoted by $B_h$, the number of pixels of software binning is denoted by $B_s$, $B_m = B_h \times B_s$, the total noise measured in a case where $B_m = B_h = B_s = 1$ is denoted by N, the readout noise is denoted by $N_r$, the dark-current noise is denoted by $N_d$, and the shot noise is denoted by $N_s$, $B_m$, $B_h$, $B_s$, N, $N_r$, $N_d$, and $N_s$ satisfy a predetermined relationship, thereby realizing high sensitivity and high dynamic range in fluorescence measurement.

20 Claims, 29 Drawing Sheets

(56) References Cited

U.S. PATENT DOCUMENTS

| 10,902,593 | B2 | 1/2021 | Marks et al. |
| 2004/0069928 | A1 | 4/2004 | Sagatelyan et al. |
| 2017/0115223 | A1 | 4/2017 | Yamazaki et al. |
| 2021/0190689 | A1 | 6/2021 | Anazawa et al. |

FOREIGN PATENT DOCUMENTS

| JP | 6286028 B2 | 2/2018 |
| JP | 6820907 B2 | 1/2021 |

* cited by examiner

MULTI-CAPILLARY ELECTROPHORESIS INSTRUMENT

TECHNICAL FIELD

The present disclosure relates to a multi-capillary electrophoresis instrument.

BACKGROUND ART

A capillary electrophoresis instrument is widely used in which a single or a plurality of capillaries is filled with an electrophoretic separation medium such as an electrolyte solution or an electrolyte solution containing a polymer gel or a polymer, and electrophoresis analysis is performed. Targets to be analyzed are wide from small molecules to macromolecules such as proteins and nucleic acids. There are many measurement modes such as a mode in which a light absorption point of each capillary is irradiated with a lamp light and absorption of the lamp light that occurs when the analysis target passes through the light absorption point is detected, and a mode in which a light-emitting point of each capillary is irradiated with a laser beam and fluorescence or scattered light induced when the analysis target passes through the light-emitting point is detected. Hereinafter, a capillary electrophoresis instrument for DNA analysis will be described in detail as an example.

In the capillary electrophoresis instrument for DNA analysis, a laser beam is incident perpendicularly to each axis of E (E is an integer of 1 or more) capillaries arranged on the same plane and irradiates them simultaneously. As a result, E light-emitting points arranged on a straight line are formed on the E capillaries arranged on the same plane. When DNA fragments labeled with G (G is an integer of 1 or more) types of fluorophores passes through each light-emitting point on each capillary by electrophoresis, the fluorophores are excited by the laser beam irradiation and emit fluorescences. Since these G types of fluorophores have fluorescence spectra different from each other, it is possible to identify a type of a fluorophore passing through the light-emitting point by spectroscopically measuring its fluorescence. Therefore, in the capillary electrophoresis instrument for DNA analysis, fluorescences emitted from the E light-emitting points arranged on the straight line are simultaneously and spectroscopically measured, and their temporal changes are further measured. In order to realize this, the capillary electrophoresis instrument for DNA analysis is provided with the following multicolor-detection optical system using wavelength dispersion. Fluorescences emitted from the E light-emitting points are collectively collimated by a first camera lens, light having a laser wavelength is cut by a longpass filter. Then, E collimated fluorescences are dispersed by wavelength through a transmission-type diffraction grating, and E wavelength-dispersed images are formed on an image sensor by a second camera lens. As an image sensor, a CCD image sensor, a CMOS image sensor, or another type of image sensor can be used. Here, a direction of wavelength dispersion is parallel to the long axis of each capillary at its light-emitting point, that is, perpendicular to the direction in which the light-emitting points are arranged (the arrangement direction of the light-emitting points). On the image sensor, the E wavelength-dispersed images of the fluorescences from the E light-emitting points are arranged in parallel to each other without being mixed with each other. Therefore, the fluorescence from each light-emitting point can be spectroscopically measured independently. The image sensor is placed such that one axis of the two-dimensional lattice arrangement of the pixels of the image sensor is parallel to the wavelength-dispersion direction, and the other axis is parallel to the arrangement direction of the light-emitting points. When a fluorescence of a fluorophore emitted from a light-emitting point is measured by the multicolor-detection optical system, intensity distribution of a pixel array along the corresponding wavelength-dispersed image gives a fluorescence spectrum of the fluorophore. Collective acquisition of the E wavelength-dispersed images by the image sensor is performed with a constant exposure time, and the above is continuously repeated at constant time intervals. Therefore, it is possible to measure time-series of signal intensities of fluorescences emitted from the E light-emitting points while performing their spectral analysis.

Each wavelength-dispersed image is divided into F (F is an integer of 1 or more) wavelength bands (hereinafter, referred to as bins or colors), and signal intensities received by a plurality of pixels corresponding to each bin are respectively integrated. Such integration is called binning. This is called F wavelength-band detection or F color detection. The wavelength width of each wavelength band may be 1 nm, 10 nm, or 100 nm, and can be arbitrarily set. The wavelength width may be different in each of the F wavelength bands. In general, in order to identify and quantify the G types of fluorophores, it is necessary that F≥G. At each time in the time series, color conversion is performed on results of the F color detection, and individual fluorescence intensity of each of the G types of fluorophores, corresponding to concentration of each of the G types of fluorophores can be acquired. In the present disclosure, fluorescence intensity of each fluorophore proportional to concentration of each fluorophore, that is, individual fluorescence intensity of each fluorophore is simply referred to as concentration of each fluorophore.

For each light-emitting point P(e) (e=1, 2, ..., and E), an emitted fluorescence of each fluorophore D(g) (g= 1, 2, ..., and G) is detected in each bin W(f) (f= 1, 2, ..., and F). At an arbitrary time, concentration of the fluorophore D(g) at the light-emitting point P(e) is Z(g), and signal intensity integrated in the bin W(f) for the light-emitting point P(e) is X(f). Here, the following Expressions (1) to (4) are established, where X is a vector of F rows and 1 column having F signal intensities X(f) as elements, Z is a vector of G rows and 1 column having G concentrations Z(g) as elements, and Y is a matrix of F rows and G columns having F×G elements of Y(f) (g). Expressions (1) to (4) are relational expressions of (f) and (g), but not the relational expression of (e), and are independently established for each light-emitting point P(e). In the case of monochromatic detection where F=1, G=1 is obtained by F≥G, and X, Y, and Z are neither a vector nor a matrix.

[Expression 1]
$$X = Y \times Z \tag{1}$$

[Expression 2]
$$X = \begin{pmatrix} X(1) \\ \vdots \\ X(F) \end{pmatrix} \tag{2}$$

[Expression 3]
$$Y = \begin{pmatrix} Y(1)(1) & \cdots & Y(1)(G) \\ \vdots & \ddots & \vdots \\ Y(F)(1) & \cdots & Y(F)(G) \end{pmatrix} \tag{3}$$

[Expression 4]

$$Z = \begin{pmatrix} Z(1) \\ \vdots \\ Z(G) \end{pmatrix} \quad (4)$$

Here, each element Y(f) (g) of the matrix Y of F rows and G columns represents a signal intensity ratio of the emitted fluorescence of each fluorophore D(g) detected in each bin W(f) based on spectral crosstalk. F elements Y(f) ($g_0$) (f=1, 2, . . . , and F, and $g_0$ is any one of g=1, 2, . . . , and G) of any one column of the matrix Y can be determined by causing the one type of fluorophore D($g_0$) to emit the fluorescence alone. Since it is generally difficult to strictly control the concentration of the fluorophore D($g_0$), it is convenient to normalize the F elements Y(f) ($g_0$) in the one column. For example, among the F elements, the largest element may be set to 1, and the other elements may be indicated by ratios to the largest element. Alternatively, the F elements may be determined such that the total of the F elements becomes 1. That is, the following Expression (5) is preferable.

[Expression 5]

$$\sum_{f=1}^{F} Y(f)(g_0) = 1 \quad (5)$$

Then, all the columns of the matrix Y can be determined by individually performing the above process for all the G types of fluorophores D(g). The matrix Y depends only on the properties of the fluorophores D(g) and the bins W(f) and does not change during an electrophoresis analysis. As long as conditions of the optical system, the fluorophore D(g), the bin W(f), and the like are fixed, the matrix Y is kept constant even for different electrophoresis analyses. Therefore, for each light-emitting point, the concentrations Z(g) of the fluorophores D(g) at each time point are obtained from the signal intensities X(f) in the bins W(f) at each time point by the following Expression (6).

[Expression 6]

$$Z = Y^- \times X \quad (6)$$

Here, $Y^-$ is a general inverse matrix of Y with G rows and F columns, and is obtained by $Y^-=(Y^T \times Y)^{-1} \times Y^T$. When the matrix Y is a square matrix with F=G, $Y^-$ is equal to an inverse matrix $Y^{-1}$. The operation of Expression (6) is referred to as color conversion or spectral crosstalk cancellation. Expression (1) is simultaneous equations indicating relationships between the unknown concentrations of the G types of fluorophores and the known F-color fluorescence intensities, and Expression (6) corresponds to obtaining the solution of the simultaneous equations. Therefore, in general, as described above, a condition of F≥G is required. If F<G, the solution cannot be uniquely obtained (that is, there may be a plurality of solutions), and thus color conversion cannot be executed as in Expression (6).

A multicolor-detection optical system that does not use wavelength dispersion can also be used. For example, in Patent Literature 1, a multicolor-detection optical system using multicolor image splitting is described. A fluorescence emitted from each of E light-emitting points is individually collimated by each of E lenses to form a light flux, lights having a laser wavelength is cut by a longpass filter, and then each light flux is divided into F-color light fluxes by a F dichroic-mirror array. After that, images of the F-color light fluxes are formed on the image sensor for each of the E light-emitting points. Here, a dividing direction (a direction in which the F-color light fluxes are arranged) is parallel to a long axis of each capillary, that is, perpendicular to a light-emitting-point arrangement direction (a direction in which the light-emitting points are arranged). As a result, E×F multicolor divided images are two-dimensionally arranged on the image sensor without being mixed with each other. The fluorescence from each light-emitting point can be spectroscopically measured independently. The image sensor is disposed such that the dividing direction is parallel to one axis of the two-dimensional lattice arrangement of the pixels of the image sensor, and the light-emitting point arrangement direction is parallel to the other axis. Collective imaging of the E×F divided images by the image sensor is continuously repeated with a constant exposure time and a constant time intervals, so that it is possible to capture time-series changes thereof while performing spectral analysis of the fluorescences from the E light-emitting points. A plurality of pixels on which each of the E×F divided images are formed are defined and signal intensities of the plurality of pixels are integrated. Similarly to the multicolor-detection optical system using wavelength dispersion, a pixel region of the plurality of pixels is referred to as a bin, and an integration of the signal intensities within the pixel region is referred to as binning. In each of the E×F divided images, there may be a region that is not included in any bin. The other configurations are similar to those of the multicolor-detection optical system using wavelength dispersion, and Expressions (1) to (6) are similarly established. Hereinafter, a case of using a multicolor-detection optical system using wavelength dispersion will be examined, but a case of using a multicolor-detection optical system that does not use wavelength dispersion as described above can also be similarly examined.

As described above, the signal intensity X(f) of the bin W(f) for each light-emitting point is obtained by integrating (binning) the signal intensities of the individual pixels constituting the bin W(f). Number of pixels constituting the bin W(f) is denoted by $B_m(f)$. $B_m(f)$ is an integer of 1 or more. When a signal intensity of a pixel j (j=1, 2, . . . , and $B_m(f)$) constituting the bin W(f) is Q(j), the signal intensity X(f) of the bin W(f) is expressed by the following Expression (7).

[Expression 7]

$$X(f) = \sum_{j=1}^{B_m(f)} Q(j) \quad (7)$$

Integration methods (binning methods) includes hardware binning and software binning. Expression (7) is common to both the binning methods. Hardware binning is a method in which electric charges accumulated in $B_m(f)$ pixels are summed on an image sensor, then converted into a voltage, and subjected to AD conversion to obtain a signal intensity X(f). On the other hand, software binning is a method in which individual signal intensities of $B_m(f)$ pixels are summed on a circuit or a computer to obtain a signal intensity X(f). Specifically, in software binning, electric charges accumulated in each pixel of the $B_m(f)$ pixels are converted into a voltage, and subjected to AD conversion to obtain each signal intensity. Then, the signal intensities of the $B_m(f)$ pixels are integrated on a computer to obtain the signal intensity $X(f)$. As will be described later, the signal intensity $X(f)$ can be obtained by combining hardware binning and software binning. Generally, compared with software binning, hardware binning is known to be suitable for highly sensitive measurement because readout noise can be reduced and sensitivity can be improved. In particular, when measuring weak light in the dark, hardware binning is a very advantageous method. Compared with software binning, hardware binning can shorten the time for reading the signal intensity $X(f)$ of the bin $W(f)$, and is thus suitable for high-speed imaging. On the other hand, as compared with software binning, it is known that dynamic range is reduced in hardware binning because a saturation level of an amount of light emitted from a light-emitting point is reduced. Therefore, it is possible to expand dynamic range at the expense of sensitivity by adopting software binning instead of hardware binning. In a currently commercially available capillary electrophoresis instrument for DNA analysis, sensitivity is more important than the dynamic range. Thus, the signal intensity $X(f)$ is obtained not by software binning but by hardware binning. However, in recent years, a capillary electrophoresis instrument for DNA analysis is increasingly requiring both sensitivity and dynamic range. In order to realize this, various prior arts have been developed as described below.

In Patent Literature 2, in imaging by an image sensor, a long exposure time and a short exposure time are alternately repeated instead of a constant exposure time being repeated as described above. Under a condition that an amount of fluorescence emitted from a light-emitting point is constant, the image sensor receives more fluorescence in a long exposure time, so that sensitivity is improved. Conversely, in a short exposure time, less fluorescence is received, so that sensitivity decreases. However, a saturation level of the amount of fluorescence emitted from the light-emitting point and measured by the image sensor, that is, a maximum amount of fluorescence that can be measured linearly by the image sensor increases. That is, a long-exposure time functions as a high-sensitivity mode, and a short-exposure time functions as a low-sensitivity mode. For example, when the amount of fluorescence emitted from the light-emitting point is small, the emitted fluorescence cannot be detected in the low-sensitivity mode, but the emitted fluorescence can be measured well in the high-sensitivity mode. On the other hand, when the amount of fluorescence emitted from the light-emitting point is large, the emitted fluorescence exceeds the saturation level in the high-sensitivity mode, and thus the emitted fluorescence cannot be favorably measured. But the emitted fluorescence can be favorably measured in the low-sensitivity mode. Therefore, by combining the high-sensitivity mode and the low-sensitivity mode, it is possible to achieve both high sensitivity and high dynamic range, unlike the case of the single mode (for example, one of the high-sensitivity mode and the low-sensitivity mode).

In Patent Literature 3, an asymmetric image splitting element is added to the multicolor-detection optical system. A fluorescence emitted from each light-emitting point is dispersed by wavelength and split to form a wavelength-dispersed image having strong fluorescence intensity (hereinafter, a strong split imaging) and a wavelength-dispersed image having weak fluorescence intensity (hereinafter, a weak split imaging), and these images are simultaneously measured. Bins are set for both wavelength-dispersed images. Under a condition that the amount of fluorescence emitted from the light-emitting point is constant, in the strong split imaging, each bin in the image sensor receives more fluorescence, so that sensitivity is improved. Conversely, in the weak split imaging, each bin in the image sensor receives less fluorescence, so that sensitivity is reduced, but the saturation level of the amount of fluorescence emitted from the light-emitting point is increased. That is, the strong split imaging functions as a high-sensitivity mode, and the weak split imaging functions as a low-sensitivity mode. When the amount of fluorescence emitted from the light-emitting point is small, the emitted fluorescence cannot be detected in the low-sensitivity mode, but the emitted fluorescence can be measured well in the high-sensitivity mode. On the other hand, when the amount of fluorescence emitted from the light-emitting point is large, the emitted fluorescence exceeds the saturation level in the high-sensitivity mode, and thus the emitted fluorescence cannot be favorably measured. But the emitted fluorescence can be favorably measured in the low-sensitivity mode. Therefore, by combining the high-sensitivity mode and the low-sensitivity mode, it is possible to achieve both high sensitivity and high dynamic range, unlike the case of the single mode (for example, one of the high-sensitivity mode and the low-sensitivity mode).

In Patent Literature 4, the signal intensity $X(f)$ of the bin $W(f)$ is obtained not only by hardware binning, but by appropriately switching between hardware binning and software binning. Based on the characteristics of hardware binning and software binning described above, hardware binning functions as a high-sensitivity mode, and software binning functions as a low-sensitivity mode. When the amount of fluorescence emitted from the light-emitting point is small, the emitted fluorescence cannot be detected in the low-sensitivity mode, but the emitted fluorescence can be measured well in the high-sensitivity mode. On the other hand, when the amount of fluorescence emitted from the light-emitting point is large, the emitted fluorescence exceeds the saturation level in the high-sensitivity mode, and thus the emitted fluorescence cannot be favorably measured. But the emitted fluorescence can be favorably measured in the low-sensitivity mode. Therefore, by combining the high-sensitivity mode and the low-sensitivity mode, it is possible to achieve both high sensitivity and high dynamic range, unlike the case of the single mode (for example, one of the high-sensitivity mode and the low-sensitivity mode).

In Patent Literature 5, a wavelength range of each bin $W(f)$ is not fixed but appropriately changed. Specifically, when none of the F signal intensities $X(f)$ ($f=1, 2, \ldots,$ and F) exceeds the saturation level, the F bin $W(f)$ ($f=1, 2, \ldots,$ and F) are set in the same manner as described above (hereinafter, referred to as full hardware binning). On the other hand, when any one of the F signal intensities $X(f)$ exceeds the saturation level, a width of the wavelength range of the corresponding bin $W(f)$ is changed to zero and the corresponding bin $W(f)$ is invalidated (hereinafter, referred to as partial hardware binning). For example, when the signal intensity $X(f_0)$ in the bin $W(f_0)$ exceeds the saturation level, all the G elements $Y(f_0)(g)$ ($g=1, 2, \ldots,$ and G) of the $f_0$-th row of the matrix Y in Expression (3) are set to zero. Under a condition where the amount of fluorescence from the light-emitting point is constant, full hardware binning provides improved sensitivity because each bin receives more fluorescence. Conversely, in partial hardware binning, each bin receives less fluorescence, thus reducing sensitivity, but increasing the saturation level of the amount of fluorescence emitted from the light-emitting point. That is, full hardware binning functions as a high-sensitivity mode, and partial hardware binning functions as a low-sensitivity mode. When the amount of fluorescence emitted from the light-emitting point is small, the emitted fluorescence cannot be detected in the low-sensitivity mode, but the emitted fluorescence can be measured well in the high-sensitivity mode. On the other hand, when the amount of fluorescence emitted from the light-emitting point is large, the emitted fluorescence exceeds the saturation level in the high-sensitivity mode, and thus the emitted fluorescence cannot be favorably measured. But the emitted fluorescence can be favorably measured in the low-sensitivity mode. Therefore, by combining the high-sensitivity mode and the low-sensitivity mode, it is possible to achieve both high sensitivity and high dynamic range, unlike the case of the single mode (for example, one of the high sensitivity mode and the low sensitivity mode).

Each of Patent Literatures 2 to 5 described above realizes high dynamic range while maintaining high sensitivity by combining a high-sensitivity mode and a low-sensitivity mode. Although there are differences in how to combine both modes, such as switching the modes alternately, switching both modes as appropriate based on measured signal, or implementing both modes at the same time, basic characteristics are common. Combining a high-sensitivity mode and a low-sensitivity mode is effective not only for capillary electrophoresis instruments for DNA analysis, but also for all of analysis methods and analysis instruments in which electrophoresis is performed using a single or a plurality of capillaries, and fluorescence of a plurality of types of fluorophores, light scattering of a plurality of types of scatterers, or light absorption of a plurality of types of absorbers is measured and identified by an image sensor or a line sensor.

On the other hand, in many commercially available digital cameras such as digital cameras used in smartphones, a high dynamic range can be realized while maintaining high sensitivity by combining a high-sensitivity mode and a low-sensitivity mode. In general, it is called high dynamic range (HDR) imaging. Typically, similarly to Patent Literature 2, a high dynamic range image is synthesized by capturing an image with a long exposure time in the high-sensitivity mode, capturing an image with a short exposure time in the low-sensitivity mode, and combining these images.

CITATION LIST

Patent Literature

PTL 1: JP 6820907 B1
PTL 2: JP 4823522 B1
PTL 3: JP 6286028 B1
PTL 4: JP 6093274 B1
PTL 5: U.S. Pat. No. 10,902,593

SUMMARY OF INVENTION

Technical Problem

The method for achieving both high sensitivity and high dynamic range by combining a high-sensitivity mode and a low-sensitivity mode as disclosed in Patent Literatures 2 to 5 functions when a fluorescence of only one type of fluorophore (G=1) is measured. Alternatively, even if fluorescences of a plurality of types of fluorophores (G≥2) are measured, and if it is not necessary to identify the plurality of types of fluorophores, the method also functions. However, as will be described below, it has been clarified by detailed studies by the present inventors that the method does not function if fluorescences of a plurality of types of fluorophores (G≥2) are measured and it is necessary to identify the plurality of types of fluorophores.

The following is assumed as the simplest example. E=1: one capillary is used for capillary electrophoresis. F=2: a wavelength-dispersed image of fluorescence emitted from a light-emitting point on the capillary is measured in two bins W(1) and W(2), that is, two-color detection is performed. G=2: a fluorophore D(1) and a fluorophore D(2) are measurement targets. Due to the difference in the fluorescence spectra of the fluorophore D(1) and the fluorophore D(2), the emitted fluorescence of the fluorophore D(1) is measured in the bin W(1) and the bin W(2) at a ratio of 3:2, and the emitted fluorescence of the fluorophore D(2) is measured in the bin W(1) and the bin W(2) at a ratio of 2:3. Suppose that, the measurable range of the signal intensities of the bin W(1) and the bin W(2) is 10 to 100 in a high-sensitivity mode, and 100 to 1000 in a low-sensitivity mode. The exposure time in the low-sensitivity mode is $\frac{1}{10}$ times the exposure time in the high-sensitivity mode. Here, in order to match each signal intensity to the amount of emitted fluorescence, each signal intensity obtained in the low-sensitivity mode is multiplied by 10 on the computer. Each signal intensity is an arbitrary unit. Dynamic range in both the high-sensitivity mode and the low-sensitivity mode is only 1 digit (10 to 100 and 100 to 1000, respectively). On the contrary, by combining these modes, it is expected that the dynamic range can be expanded to 2 digits (10 to 1000) while maintaining the sensitivity (lower limit of detection is 10).

First, when the amounts of emitted fluorescences of the fluorophore D(1) and the fluorophore D(2) are 50 and 0, respectively, the signal intensities of the bin W(1) and the bin W(2) are 30 and 20 in the high-sensitivity mode, whereas both 0 in the low-sensitivity mode. At this time, by performing color conversion, the amount of emitted fluorescence (corresponding to the concentration) of the fluorophore D(1) is obtained to be 50 in the high-sensitivity mode, but is not obtained correctly (obtained to be 0) in the low-sensitivity mode because the signal intensities are less than or equal to the lower limit of detection (the signal intensities are 0) in the low-sensitivity mode. Of course, the amount of emitted fluorescence (corresponding to the concentration) of the fluorophore D(2) is obtained to be 0 in the both modes.

Next, when the amounts of emitted fluorescences of the fluorophore D(1) and the fluorophore D(2) are 500 and 0, respectively, the signal intensities of the bin W(1) and the bin W(2) are both saturated in the high-sensitivity mode, whereas 300 and 200 in the low-sensitivity mode. At this time, by performing color conversion, the amount of emitted fluorescence (corresponding to the concentration) of the fluorophore D(1) cannot be obtained correctly in the high-sensitivity mode because the signal intensities of the bin W(1) and the bin W(2) are both saturated (the amount of emitted fluorescence is unknown). On the contrary, the amount of emitted fluorescence (corresponding to the concentration) of the fluorophore D(1) is obtained to be 500 in the low-sensitivity mode. Similarly, the amount of emitted fluorescence of the fluorophore D(2) cannot be obtained correctly in the high-sensitivity mode because the signal intensities of the bin W(1) and the bin W(2) are both saturated (the amount of emitted fluorescence is unknown), whereas is obtained to be 0 in the low-sensitivity mode.

On the other hand, when the amounts of emitted fluorescences of the fluorophore D(1) and the fluorophore D(2) are 500 and 50, respectively, the signal intensities of the bin W(1) and the bin W(2) are both saturated in the high-sensitivity mode, whereas 300 and 200 (because the amount of emitted fluorescence of the fluorophore D(2) of 50 is below the lower limit of detection, it does not contribute to the both signal intensities) in the low-sensitivity mode. At this time, by performing color conversion, the amount of emitted fluorescence (corresponding to the concentration) of the fluorophore D(1) cannot be obtained correctly in the high-sensitivity mode because the signal intensities of the bin W(1) and the bin W(2) are both saturated (the amount of emitted fluorescence is unknown). On the contrary, the amount of emitted fluorescence (corresponding to the concentration) of the fluorophore D(1) is obtained to be 500 in the low sensitivity mode. Similarly, the amount of emitted fluorescence of the fluorophore D(2) cannot be obtained correctly in the high-sensitivity mode because the signal intensities of the bin W(1) and the bin W(2) are both saturated (the amount of emitted fluorescence is unknown). Moreover, the amount of emitted fluorescence of the fluorophore D(2) cannot be obtained correctly even in the low-sensitivity mode because the signal intensities of the bin W(1) and the bin W(2) by the amount of emitted fluorescence of the fluorophore D(2) of 50 are below the lower limit of detection in the low-sensitivity mode (the amount of emitted fluorescence is obtained to be 0).

As described above, when the amount of emitted fluorescence of the fluorophore D(1) is 500, the same measurement results are obtained in the cases where the amount of emitted fluorescence of the fluorophore D(2) is 0 and 50. That is, the both cases cannot be distinguished. In general, when the amount of emitted fluorescence of the fluorophore D(1) is between 100 and 1000 and the amount of emitted fluorescence of the fluorophore D(2) is between 10 and 100, the fluorophore D(2) cannot be measured. Similarly, when the amount of emitted fluorescence of the fluorophore D(2) is between 100 and 1000 and the amount of emitted fluorescence of the fluorophore D(1) is between 10 and 100, the fluorophore D(1) cannot be measured. That is, when only one of the fluorophore D(1) and the fluorophore D(2) is the measurement target, the amount of emitted fluorescence of the one fluorophore between 10 and 1000 can be measured. However, when both the fluorophore D(1) and the fluorophore D(2) are the measurement targets, only the amount of emitted fluorescence of the fluorophores between 100 and 1000 (or between 10 and 100) can be measured. Therefore, it has become clear that the method for achieving both high sensitivity and high dynamic range by combining the high-sensitivity mode and the low-sensitivity mode as disclosed in Patent Literature 2 to 5 functions in a case where a single fluorophore (G=1) is the measurement target, but does not function in a case where a plurality of fluorophores (G≥2) are the measurement targets and these fluorophores are identified and analyzed.

Meanwhile, when using a digital camera of a smartphone equipped with HDR imaging function, since a wide variety of light emitters, light absorbers, and scatterers are measurement targets, G≥2 can hold true. However, these measurement targets are not usually identified and analyzed. For example, in a case where a landscape containing a yellow car is captured by the digital camera, yellow light enters a pixel in the image of the car on the image sensor, and it is recognized that the color of the car is yellow. However, it does not matter what kind of light emitters, light absorbers, and light scatterers the yellow light is composed of, and what ratio they are combined with to form the yellow light. For example, it is not identified whether the yellow light is a combination of red light and green light or pure yellow light. Therefore, in the case of the digital camera equipped with HDR imaging function, although G≥2 can hold true, expansion of dynamic range is not hindered since a plurality of measurement targets are not identified and analyzed.

Therefore, the present disclosure proposes a method for achieving both high sensitivity and high dynamic range in an analysis method and an analysis instrument, including a capillary electrophoresis instrument for DNA analysis, that perform electrophoresis using a single or a plurality of capillaries and measure fluorescence emitted by a plurality of types of fluorophores, scattered light scattered by a plurality of types of scatterers, or absorption absorbed by a plurality of types of absorbers, while identifying each of them using an image sensor or a line sensor. Instead of a method of combining a high-sensitivity mode and a low-sensitivity mode as in Patent Literatures 2 to 5, a method to achieve the above using a single mode is proposed.

Solution to Problem

Specifically, in a multi-capillary electrophoresis instrument of the present disclosure, composition of measured noises is set to a predetermined condition by controlling composition of a electrophoresis separation medium filled in each capillary, a composition of each sample, wavelength and intensity of a laser beam, a configuration of a multicolor-detection optical system, an exposure time, a bin setting, type of an image sensor, temperature, or the like. Number of pixels corresponding to each bin W(f) is denoted by $B_m(f)$ and number of pixels subjected to software binning performed in the bin W(f) is denoted by $B_s(f)$. It is possible to achieve both high sensitivity and high dynamic range by setting $B_m(f)$ and $B_s(f)$ within predetermined optimal ranges.

Other features of the present disclosure will be apparent from the description and the accompanying drawings of this specification. Embodiments of the present disclosure are achieved and realized by elements, combinations of various elements, the following detailed description, and the attached claims. The description of this specification is given only as a typical example, and does not limit the scope of claims or applications of the present disclosure.

Advantageous Effects of Invention

According to the present disclosure, it is possible to achieve both high sensitivity and high dynamic range in an analysis method and an analysis instrument that perform electrophoresis using a single or a plurality of capillaries, including a capillary electrophoresis instrument for DNA analysis, and measure fluorescence emitted by a plurality of types of fluorophores, scattered light scattered by a plurality of types of scatterers, or absorption absorbed by a plurality of types of absorbers, while identifying each of them using an image sensor or a line sensor. This makes it possible to analyze samples with a wide concentration range without concentration adjustment. Alternatively, it is possible to analyze samples including a plurality of components with widely varying concentrations.

Objects, configurations, and effects besides the above description will be apparent through the explanation on the following embodiments.

DESCRIPTION OF EMBODIMENTS

<Study on Sensitivity and Dynamic Range>

Figure 1:
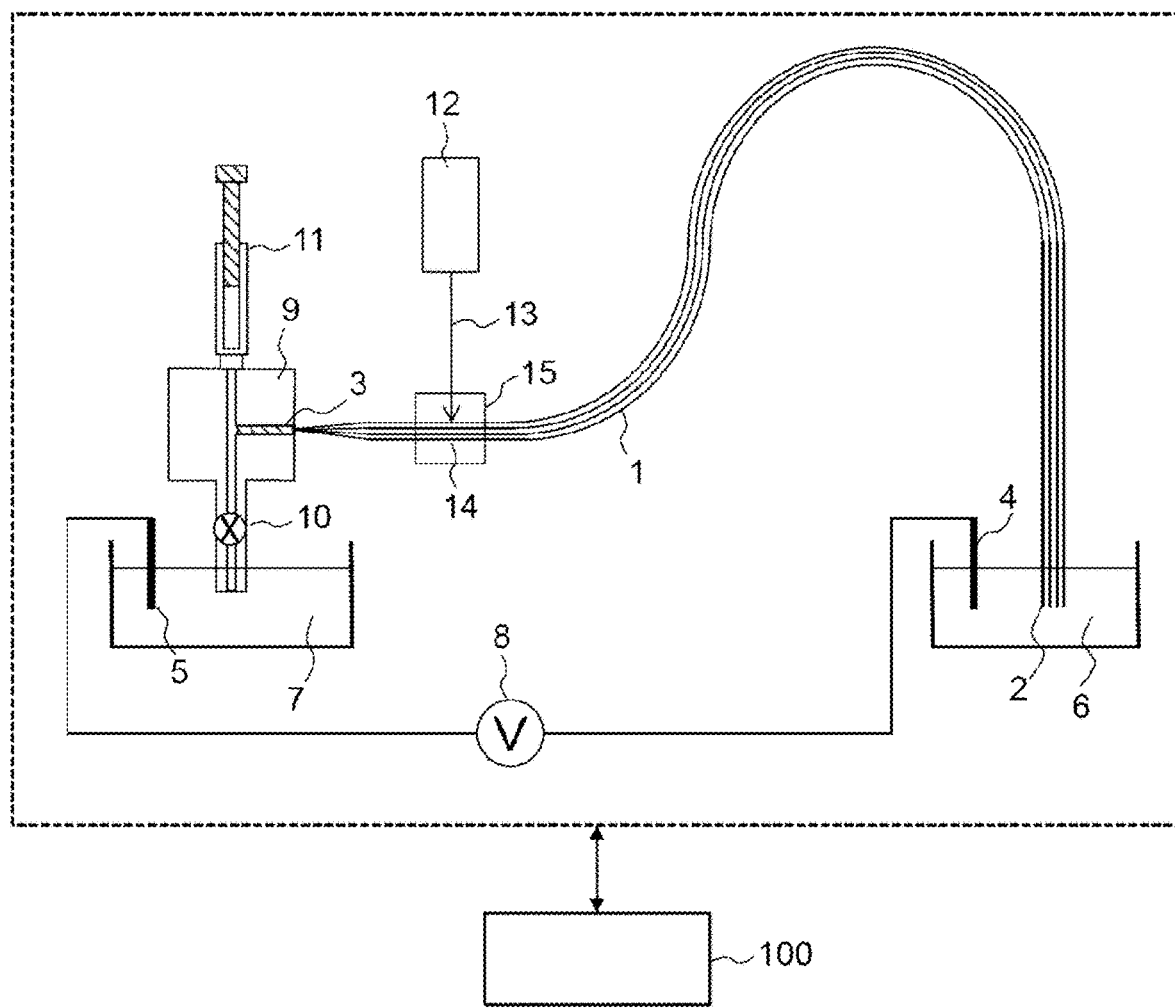
FIG. 1 is a configuration diagram of a multi-capillary electrophoresis instrument.

An embodiment of the present disclosure will be described with the above-described capillary electrophoresis instrument for DNA analysis as an example. In the present instrument, each of the bin W(f) (f=1, 2, ..., and F) for each light-emitting point is designed measure fluorescences incident on a region corresponding to a desired specific wavelength band in the wavelength-dispersed image at a constant exposure time. For example, the bin W(1) is designed to correspond to the wavelength band of 500 to 510 nm, the bin W(2) is designed to correspond to the wavelength band of 510 to 520 nm, etc. . . . Here, in each wavelength-dispersed image, there may be a region (pixel) not corresponding to any bin. Alternatively, the same region (pixel) may be corresponding to a plurality of bins depending on a binning condition (a bin setting) to be described later. That is, a plurality of different bins (or, corresponding regions) may overlap each other on the image sensor. On the other hand, the size and shape of the wavelength-dispersed image of the fluorescences emitted from each light-emitting point or the wavelength-dispersed image of the fluorescences with a specific wavelength band can be changed by the configuration of the multicolor-detection optical system. For example, by making the focal length of the second camera lens longer (alternatively, shorter) than the focal length of the first camera lens, each wavelength-dispersed image can be enlarged (alternatively, reduced). When both focal lengths are equal, each wavelength-dispersed image is formed with 1× magnification. By increasing (alternatively, decreasing) the grating frequency of the transmission-type diffraction grating, the wavelength-dispersion distance on the image sensor can be expanded (alternatively, reduced). That is, on the image sensor, it is possible to change size and shape of a wavelength-dispersion image of a fluorescence with a specific wavelength band emitted from each light-emitting point by the configuration of the multicolor-detection optical system. By using an image sensor having a large pixel size (alternatively, a small pixel size), the wavelength width per pixel on the wavelength-dispersed image can be increased (alternatively, decreased). As described above, by controlling the configuration of the multicolor-detection optical system, it is possible to change the pixel region and the number of pixels $B_m(f)$ onto which the wavelength-dispersion image of the fluorescence with the specific wavelength band, i.e., the bin W(f) is projected, on the image sensor. Such a study has not been made so far, and is unique to the present disclosure. Hereinafter, for the sake of simplicity, (f) of the bin W(f) and the number of pixels $B_m(f)$ is omitted, but the meanings thereof are the same.

In the present disclosure, any image sensor on which pixels are two-dimensionally arranged can be used. As a representative example, a CCD image sensor or a CMOS image sensor can be used. Furthermore, any AD conversion that converts an amount of electric charges accumulated in one or more pixels according to an amount of incident light into a digital signal can be used regardless of a binning condition described below. In general, when the number of bits of AD conversion to be used is small, the resolution or accuracy of the digital signal becomes insufficient, and there is a possibility that the dynamic range becomes small. On the other hand, when the number of bits of AD conversion is large, the resolution or accuracy of the digital signal can be improved, but the time required for the AD conversion becomes long, so that high-speed analysis becomes difficult. When the number of bits of AD conversion increases, power consumption of the image sensor and the control board increases, and there is a problem that manufacturing costs thereof increase. As described below, the present disclosure proposes a method for improving the sensitivity and dynamic range of analysis by optimizing the binning condition. This means that the resolution or accuracy of the digital signal can be increased by optimizing the binning condition. Therefore, by using the present method, it is possible to overcome the above-described disadvantage due to the small number of bits of AD conversion, and at the same time, it is possible to enjoy the above-described advantages. The number of bits of AD conversion of an image sensor used for various analyses is usually 16 bits or more. On the other hand, according to the present disclosure, it is possible to achieve both sensitivity and dynamic range in analysis, enable high-speed analysis, and further reduce power consumption and manufacturing cost of the image sensor and the control board while using AD conversion of 14 bits or less, furthermore, using AD conversion of 12 bits or less and further AD conversion of 10 bits or less.

As described above, binning for integrating signal of the $B_m$ pixels in the bin W is classified into hardware binning and software binning. It is defined that the number of hardware-binning regions in the bin W is $B_s$, and the number of pixels in each hardware-binning region is $B_h$. Here, the number of pixels of hardware binning is $B_h$, the number of pixels of software binning is $B_s$, and $B_m = B_h \times B_s$ holds true. That is, the number of pixels $B_s$ of software binning does not necessarily represent the number of physical pixels in the bin W, but represents the number of pieces of pixel information (the number of times to read pixel information) output from the image sensor with respect to the bin W. Further, $1 \leq B_h \leq B_m$ and $1 \leq B_s \leq B_m$ hold true, and both $B_h$ and $B_s$ are integers. Here, it is assumed that each of the $B_s$ hardware-binning regions consists of the same $B_h$ pixels. In general, the $B_s$ hardware-binning regions may consist of different numbers of pixels, and in this case, an average number of pixels constituting the $B_s$ hardware-binning regions is defined as $B_h$. Furthermore, in this case, the number of pixels $B_h$ is not necessarily an integer. The following mathematical expressions and the like are also established in this case. In the following description, unless otherwise specified, a case where each of the $B_s$ hardware-binning regions consists of the same $B_h$ pixels is assumed.

Based on the above, noise analysis and sensitivity analysis are performed. The following description holds true for any bin W. In light measurement using an image sensor, noise is classified into three types of readout noise, dark-current noise, and shot noise. In addition, when a sample is analyzed as in capillary electrophoresis, sample noise derived from a sample is also present, but the sample noise is ignored here. It is assumed that imaging by an image sensor is repeatedly performed with a constant exposure time. The readout noise per a single pixel is denoted by $N_r$. The dark-current noise per a single pixel is denoted by $N_d$. The shot noise of the background light emitted from the light-emitting point and measured in the bin W is denoted by $N_s$. Here, the background light is the light emitted from the light-emitting point and measured, minus the fluorescence to be measured. Since the above noises do not depend on the binning method, each of the noises does not change even if the binning method is changed. When the number of pixels in the bin W is denoted by $B_m$, the number of pixels of hardware binning in the bin W is denoted by $B_h$, the number of pixels of software binning in the bin W is denoted by $B_s$, and $B_m = B_h \times B_s$, the total noise N of the signal intensity X integrated in the bin W is expressed by Expression (8).

[Expression 8]
$$N^2 = B_s \times N_r^2 + B_h \times B_s \times N_d^2 + N_s^2 \qquad (8)$$

When $B_m=B_h=B_s=1$, that is, when the bin W is composed of a single pixel, the total noise will be, as is well known, the square root of the sum of the squares of each of the three types of noises. However, when $B_m=B_h=B_s=1$ is not satisfied, each noise is multiplied by a unique coefficient, respectively, as represented by Expression (8). First, the readout noise is added every time pixel information is read from the image sensor. Therefore, regardless of the number of pixels $B_h$ of the hardware binning, the readout noise is added for each hardware-binning region. For this reason, the term of $N_r^2$ in Expression (8) is multiplied by the number of pixels $B_s$ of software binning corresponding to "the number of hardware-binning regions"="the number of times of reading pixel information", but is not multiplied by the number of pixels $B_h$ of hardware binning irrelevant to the number of times of reading pixel information. Then, the dark-current noise is added by the number of pixels to be binned, regardless of hardware binning or software binning. Therefore, the term of $N_d^2$ in Expression (8) is multiplied by both $B_h$ and $B_s$. Finally, the shot noise is irrelevant to binning, i.e., irrelevant to both hardware binning and software binning, because the shot noise is inherent in the light that is emitted from the light-emitting point and measured. For example, in a case where a light with a specific wavelength band emitted from a light-emitting point is incident on one pixel (e.g., $B_m=B_h=B_s=1$) and in a case where the light with the specific wavelength band is incident on 100 pixels (e.g., $B_m=B_h \times B_s=10\times10=100$), the total amount of light and the inherent noise of the light should be the same. Therefore, the term of $N_s^2$ in Expression (8) is not multiplied by both $B_h$ and $B_s$.

Another important point is that, as described above, the amount of light with the specific wavelength band measured in the bin W is constant, that is, the signal S in the bin W is constant, regardless of the number of pixels $B_m$ of the bin W. Here, the signal S indicates the amount of light (fluorescence) with the specific wavelength band that is emitted from a measurement target and measured with a constant exposure time. As described above, the relationship between the total noise N and the signal S of the signal intensity X in the bin W, the number of pixels $B_m$ of the bin w, the number of pixels $B_h$ of hardware binning and the number of pixels $B_s$ of software binning among the number of pixels $B_m$ of the bin W was formulated for the first time in the present disclosure.

Here, the dark-current-noise ratio b is expressed by Expression (9).

[Expression 9]
$$b = N_d/N_r \qquad (9)$$

The shot-noise ratio c is expressed by Expression (10).

[Expression 10]
$$c = N_s/N_r \qquad (10)$$

At this time, Expression (8) is expressed by the following Expression (11).

[Expression 11]
$$N^2 = (B_s + b^2 \times B_h \times B_s + c^2) \times N_r^2 = (B_s + b^2 \times B_m + c^2) \times N_r^2 \qquad (11)$$

As is clear from Expressions (8) and (11), when $B_m=B_h=B_s=1$, the total noise becomes the smallest, the S/N becomes the largest, and the sensitivity becomes the highest. The S/N of the signal intensity X integrated in the bin W is expressed by the following Expression (12) from Expression (11).

[Expression 12]
$$\frac{S}{N} = \frac{1}{\sqrt{B_s + b^2 \cdot B_m + c^2}} \cdot \frac{S}{N_r} \qquad (12)$$

Here, S indicates a constant amount light (fluorescence) obtained by integration in the bin W as described above. Of course, the formulation of the S/N in this way has been made for the first time by the present disclosure. Here, when the amount of light S at which S/N=3 is set as a lower limit of detection, LLOD for the bin W, LLOD is expressed by the following Expression (13).

[Expression 13]
$$LLOD = \sqrt{B_s + b^2 \cdot B_m + c^2} \times 3 \cdot N_r \qquad (13)$$

Next, dynamic range analysis is performed. When the saturation-light amount per a single pixel of the image sensor is defined as M, the saturation-light amount of the bin W is $B_s \times M$. That is, the saturation-light amount increases in proportion to the number of times of reading pixel information, that is, the number of pixels $B_s$ of software binning, but is irrelevant to the number of pixels $B_h$ of hardware binning. This is because regardless of the number of pixels of hardware binning, the saturation-light amount when performing hardware binning is M. Note that, this shall not be applied to a case where the saturation-light amount when reading pixel information is larger than the saturation-light amount per a single pixel depending on the type of the image sensor. For example, as for a CCD image sensor, the saturation amount of electric charges per a single pixel on the horizontal shift register or on the summing gate may be set to about k=1 to 10 times larger than the saturation amount of electric charges per a single pixel on the vertical shift register. Then, a saturation-light-amount ratio k ($k \geq 1$) is defined so that a maximum value of a ratio of a saturation-light amount when reading pixel information after performing hardware binning to a saturation-light amount per a single pixel. The saturation light amount of the bin W is $B_s \times M$ when $B_h=1$, $B_h \times B_s \times M$ when $1 < B_h < k$, and $k \times B_s \times M$ when $k \leq B_h$. When the above is generalized, the saturation-light amount of the bin W is set to $\alpha \times B_s \times M$, where $\alpha$ is referred to as a saturation-light-amount coefficient, $\alpha=1$ when $B_h=1$, $\alpha=B_h$ when $1 < B_h < k$, and $\alpha=k$ when $k \leq B_h$. However, when the saturation-light-amount ratio is k=1, $\alpha=1$ regardless of the number of pixels $B_h$ of hardware binning. The above also applies to all subsequent mathematical expressions including a. Since the k is not an integer in general, the k may be replaced with an integer closest to the k. The upper limit of detection, ULOD for the bin W is the same as the saturation-light amount for the bin W, and is expressed by the following Expression (14).

[Expression 14]
$$ULOD = B_s \cdot \alpha \cdot M \qquad (14)$$

Therefore, a dynamic range DR is defined as ULOD/LLOD and is represented by Expression (15).

[Expression 15]
$$DR = \frac{B_s}{\sqrt{B_s + b^2 \cdot B_m + c^2}} \cdot \frac{\alpha \cdot M}{3 \cdot N_r} \quad (15)$$

When the number of bits of the AD conversion of the image sensor is denoted by BN, the resolution of the digital signal is improved to $B_s \times BN$, that is, the accuracy increases proportionally to $B_s$.

<Conditions for High Sensitivity and High Dynamic Range>

As described above, the highest sensitivity is obtained when $(B_m=) B_h = B_s = 1$. However, it is generally difficult to set $B_h = B_s = 1$ depending on the configuration of the multicolor-detection optical system. Therefore, it is important not to significantly lower the sensitivity as compared with the case of $B_h = B_s = 1$. In order to obtain a practical sensitivity, it is necessary to obtain an S/N of ⅓ or more of the S/N obtained when $B_h = B_s = 1$, and a condition therefor is set as a first high-sensitivity condition. The first high-sensitivity condition is expressed by Expression (16) from Expression (12).

[Expression 16]
$$B_s \leq (9 - B_m) \cdot b^2 + 8 \cdot c^2 + 9 \quad (16)$$

Here, when $B_h = 1$, Expression (16) is expressed as Expression (17).

[Expression 17]
$$B_s \leq \frac{9 \cdot b^2 + 8 \cdot c^2 + 9}{b^2 + 1} \quad (17)$$

When $B_s = 1$, Expression (16) is expressed as Expression (18).

[Expression 18]
$$B_h \leq \frac{9 \cdot b^2 + 8 \cdot c^2 + 8}{b^2} \quad (18)$$

Furthermore, in order to obtain a more practical sensitivity, it is necessary to obtain an S/N of ⅔ or more of the S/N obtained when $B_h = B_s = 1$, and a condition therefor is set as a second high-sensitivity condition. The second high-sensitivity condition is expressed by Expression (19) from Expression (12).

[Expression 19]
$$B_s \leq \frac{(9 - 4 \cdot B_m) \cdot b^2 + 5 \cdot c^2 + 9}{4} \quad (19)$$

Here, when $B_h = 1$, Expression (19) is expressed as Expression (20).

[Expression 20]
$$B_s \leq \frac{9 \cdot b^2 + 5 \cdot c^2 + 9}{4 \cdot (b^2 + 1)} \quad (20)$$

When $B_s = 1$, Expression (19) is expressed as Expression (21).

[Expression 21]
$$B_h \leq \frac{9 \cdot b^2 + 5 \cdot c^2 + 5}{4 \cdot b^2} \quad (21)$$

On the other hand, it is possible to expand the dynamic range DR as compared with the case of $B_h = B_s = 1$ by devising the configuration of the multicolor-detection optical system and the settings of binning, i.e., hardware binning, and software binning. In order to obtain a practical dynamic range DR, it is necessary to obtain a dynamic range DR three times or more the dynamic range DR obtained when $B_h = B_s = 1$, and a condition therefor is set as a first high-dynamic-range condition. The first high-dynamic-range condition is expressed by Expression (22) from Expression (15).

[Expression 22]
$$B_s \geq \frac{9 + \sqrt{81 + 36 \cdot \alpha^2 \cdot (b^2 + c^2 + 1) \cdot (B_m \cdot b^2 + c^2)}}{2 \cdot \alpha^2 \cdot (b^2 + c^2 + 1)} \quad (22)$$

Here, when $B_h = 1$, Expression (22) is expressed as Expression (23). When $B_s = 1$, Expression (22) has no solution.

[Expression 23]
$$B_s \geq \frac{9 \cdot (b^2 + 1) + \sqrt{81 \cdot (b^2 + 1)^2 + 36 \cdot \alpha^2 \cdot (b^2 + c^2 + 1) \cdot c^2}}{2 \cdot \alpha^2 \cdot (b^2 + c^2 + 1)} \quad (23)$$

Furthermore, in order to obtain a more practical dynamic range DR, it is necessary to obtain a dynamic range DR of 10 times or more the dynamic range DR obtained when $B_h = B_s = 1$, and a condition therefor is set as a second high-dynamic-range condition. The second high-dynamic-range condition is expressed by Expression (24) from Expression (15).

[Expression 24]
$$B_s \geq \frac{100 + \sqrt{10000 + 400 \cdot \alpha^2 \cdot (b^2 + c^2 + 1) \cdot (B_m b^2 + c^2)}}{2 \cdot \alpha^2 \cdot (b^2 + c^2 + 1)} \quad (24)$$

Here, when $B_h = 1$, Expression (24) is expressed as Expression (25). When $B_s = 1$, Expression (24) has no solution.

[Expression 25]
$$B_s \geq \frac{100 \cdot (b^2 + 1) + \sqrt{10000 \cdot (b^2 + 1)^2 + 400 \cdot \alpha^2 \cdot (b^2 + c^2 + 1) \cdot c^2}}{2 \cdot \alpha^2 \cdot (b^2 + c^2 + 1)} \quad (25)$$

By satisfying both one of the above high-sensitivity conditions and one of the above high-dynamic-range conditions, it is possible to achieve both high sensitivity and high dynamic range. For example, the first high-sensitivity condition and the first high-dynamic-range condition are both satisfied by satisfying Expressions (16) and (22), that is, by satisfying the following Expression (26).

[Expression 26]

$$\frac{9 + \sqrt{81 + 36 \cdot \alpha^2 \cdot (b^2 + c^2 + 1) \cdot (B_m \cdot b^2 + c^2)}}{2 \cdot \alpha^2 \cdot (b^2 + c^2 + 1)} \leq$$
$$B_s \leq (9 - B_m) \cdot b^2 + 8 \cdot c^2 + 9 \quad (26)$$

Alternatively, the second high-sensitivity condition and the second high-dynamic-range condition are both satisfied by satisfying Expressions (19) and (24), that is, by satisfying the following Expression (27).

[Expression 27]

$$\frac{100 + \sqrt{10000 + 400 \cdot \alpha^2 \cdot (b^2 + c^2 + 1) \cdot (B_m \cdot b^2 + c^2)}}{2 \cdot \alpha^2 \cdot (b^2 + c^2 + 1)} \leq$$
$$B_s \leq \frac{(9 - 4 \cdot B_m) \cdot b^2 + 5 \cdot c^2 + 9}{4} \quad (27)$$

It is a matter of course that an effect can be obtained by satisfying both Expression (16) and Expression (24) or both Expression (19) and Expression (22). Note that, depending on the conditions of the dark-current-noise ratio b, the shot-noise ratio c, and the number of pixels $B_m$, there may be no solution that satisfies both of these conditions.

Suitable ranges of $B_h$ and $B_s$ for obtaining high sensitivity or high dynamic range are represented by the above Expressions (16) to (27). At the same time, "$1 \leq B_h \leq B_m$ and $B_h$ is an integer", "$1 \leq B_s \leq B_m$ and $B_s$ is an integer", and "$B_m = B_h \times B_s$," need to be satisfied.

Next, a case where $B_h = 1$ will be considered. Expression (8) is transformed into the following expression (28).

[Expression 28]

$$N^2 = B_s \times (N_r^2 + N_d^2) + N_s^2 \quad (28)$$

Here, the mixed noise $N_x$ of the readout noise and the dark-current noise per a single pixel is defined as Expression (29).

[Expression 29]

$$N_x^2 = N_r^2 + N_d^2 \quad (29)$$

The shot-noise-mixing ratio a is expressed by Expression (30).

[Expression 30]

$$a = N_s/N_x \quad (30)$$

Here, $a^2$ is expressed by Expression (31).

[Expression 31]

$$a^2 = \frac{c^2}{1 + b^2} \quad (31)$$

Expression (28) is transformed into Expression (32).

[Expression 32]

$$N^2 = (B_s + a^2) \times N_x^2 \quad (32)$$

Therefore, the S/N in Expression (12) is expressed by Expression (33).

[Expression 33]

$$\frac{S}{N} = \frac{1}{\sqrt{B_s + a^2}} \cdot \frac{S}{N_x} \quad (33)$$

The dynamic range DR of Expression (15) is expressed by Expression (34).

[Expression 34]

$$DR = \frac{B_s}{\sqrt{B_s + a^2}} \cdot \frac{\alpha \cdot M}{3 \cdot N_x} \quad (34)$$

Consequently, the first high-sensitivity condition of Expression (17) is expressed by Expression (35).

[Expression 35]

$$B_s \leq 9 + 8 \cdot a^2 \quad (35)$$

The second high-sensitivity condition of Expression (20) is expressed by Expression (36).

[Expression 36]

$$B_s \leq \frac{5 \cdot a^2 + 9}{4} \quad (36)$$

On the other hand, the first high-dynamic-range condition of Expression (23) is expressed by Expression (37).

[Expression 37]

$$B_s \geq \frac{9 + \sqrt{81 + 36 \cdot \alpha^2 \cdot (a^2 + 1) \cdot a^2}}{2 \cdot \alpha^2 \cdot (a^2 + 1)} \quad (37)$$

The second high-dynamic-range condition of Expression (25) is expressed by Expression (38).

[Expression 38]

$$B_s \geq \frac{100 + \sqrt{10000 + 400 \cdot \alpha^2 \cdot (a^2 + 1) \cdot a^2}}{2 \cdot \alpha^2 \cdot (a^2 + 1)} \quad (38)$$

<Bin Merging>

In the above, the conditions to achieve high sensitivity and high dynamic range have been examined for each of the F bins W(f) (f=1, 2, . . . , and F) that measure components of fluorescence emitted from one light-emitting point in different wavelength bands. The signal intensity X(f) (f=1, 2, . . . , and F) in each bin W(f) is obtained by integrating the signal intensities of the individual pixels constituting the bin W(f) according to Expression (7). The obtained signal intensity X(f) constitutes X in Expression (2). The concentration Z(g) (g=1, 2, . . . , and G) of the G types of fluorophores is derived by the operation (color conversion) of Expression (6). Expression (6) indicates that the concentration Z(g) is a linear combination of the signal intensities X(1), X(2), . . . , and X(F), that is, the concentration Z(g) is a kind of integration of the signal intensities X(1), X(2), . . . , and X(F). In a case where a plurality of signal intensities among the signal intensities X(1), X(2), . . . , and X(F) has values close to each other when the fluorescence emission of the fluorophore D(g) is measured, the plurality of signal intensities are equivalently integrated by Expression (6). Therefore, it may be more appropriate to consider conditions for obtaining high sensitivity and high dynamic range based on each merged bin WW resulting from merging a plurality of bins W(f) (or a plurality of pixels) than based on each individual bin W(f) (or each individual pixel). A merged bin WW may be simply referred to as a bin W. Next, a bin-merging method which bins W(f) (or which pixels) are incorporated into the merged bin WW will be considered. Note that the same bin W(f) may be incorporated into each of different merged bins WW for a plurality of different fluorophores.

The elements Y(1)(g), Y(2)(g), . . . , and Y(F)(g) of the g-th column of the matrix Y of Expression (3) indicate the ratios at which the light emission of the fluorophore D(g) contributes to the signal intensities X(1), X(2), . . . , and X(F) of the respective bins W(f). These elements are normalized so that the sum is 1 according to Expression (5), but here, these elements are normalized so that the maximum value of these elements is 1. The elements normalized in this way is expressed as [Y(1)(g)], [Y(2)(g)], . . . , and [Y(F)(g)].

In a first bin-merging method, for each fluorophore D(g), when [Y(f$_1$)(g)]=1, only the bin W(f$_1$) is incorporated into the merged bin WW. This is a method following the above-described method of not introducing the merged bin WW. Unlike the above, as for an arbitrary bin W(f$_0$) with [Y(f$_0$)(g)]≠1, it is not necessary to consider a condition for obtaining high sensitivity and high dynamic range.

In a second bin-merging method, for each fluorophore D(g), when [Y(f$_j$)(g)]≥0.9 (j=1, 2, . . . , and J), the bins W(f$_j$) (j=1, 2, . . . , and J) are incorporated into the merged bin WW. Similarly, as for an arbitrary bin W(f$_0$) satisfying [Y(f$_0$)(g)]<0.9, it is not necessary to consider a condition for obtaining high sensitivity and a high dynamic range.

In a third bin-merging method, for each fluorophore D(g), when [Y(f$_j$)(g)]≥0.8 (j=1, 2, . . . , and J), the bins W(f$_j$) (j=1, 2, . . . , and J) are incorporated into the merged bin WW. Similarly, as for an arbitrary bin W(f$_0$) satisfying [Y(f$_0$)(g)]<0.8, it is not necessary to consider a condition for obtaining high sensitivity and a high dynamic range.

In a fourth bin-merging method, for each fluorophore D(g), when [Y(f$_j$)(g)]≥0.5 (j=1, 2, . . . , and J), the bins W(f$_j$) (j=1, 2, . . . , and J) are incorporated into the merged bin WW. Similarly, as for an arbitrary bin W(f$_0$) satisfying [Y(f$_0$)(g)]<0.5, it is not necessary to consider a condition for obtaining high sensitivity and a high dynamic range. That is, in the first bin-merging method to the fourth bin-merging method, any bin W(f) having a higher ratio of contribution to the signal intensities X(1), X(2), . . . , and X(f) by the fluorescence emission of the fluorophore D(g) is incorporated into the merged bin WW.

In contrast, a fifth bin-merging method, for each fluorophore D(g), all bins W(f) (f=1, 2, . . . , and F) are incorporated into the merged bin WW. In any of the first to the fifth bin-merging methods, it is only required to satisfy Expressions (8) to (38) as they are, to satisfy both the high-sensitivity condition and the high-dynamic-range condition. Here, it is appropriate to virtually consider a merged bin WW as a single bin W. That is, the number of pixels constituting the merged bin WW is denoted by $B_m$. The average value of the number of pixels of (a plurality of) hardware binning regions in the merged bin WW is denoted by $B_h$. The number of pixels of software binning in the merged bin WW is denoted by $B_s$. $B_m = B_h \times B_s$ holds true. Thereby, both the high-sensitivity condition and the high-dynamic-range condition can be achieved similarly to the above. The following describes the foregoing for the fifth bin-merging method.

For each of the light-emitting point P(e) (e=1, 2, . . . , and E), the number of pixels in the bin W(f) (f=1, 2, . . . and F) is denoted by $B_m(f)$, the number of pixels of hardware binning in the bin W(f) is denoted by $B_h(f)$, and the number of pixels of software binning in the bin W(f) is denoted by $B_s(f)$. Similarly to the above, $B_m(f)=B_h(f) \times B_s(f)$, $1 \leq B_h(f) \leq B_m(f)$, $1 \leq B_s(f) \leq B_m(f)$, and both $B_h(f)$ and $B_s(f)$ are integers. Assuming the signal intensity XX integrated in the merged bin WW consisting of a combination of the bins W(1), W(2), . . . , and W(f), the total noise N is expressed by Expression (39) by modifying Expression (11).

[Expression 39]

$$N^2 = \left\{ \sum_{f=1}^{F} B_s(f) + b^2 \times \sum_{f=1}^{F} B_m(f) + c^2 \right\} \times N_r^2 \quad (39)$$

Here, the dark-current-noise ratio b, the shot-noise ratio c, and the readout noise $N_r$ follow the same definitions and have the same values as described above. When the total amount of light measured in the merged bin WW is defined as signal S, S/N in the merged bin WW is expressed by Expression (40) obtained by modifying Expression (12).

[Expression 40]

$$\frac{S}{N} = \frac{1}{\sqrt{\sum_{f=1}^{F} B_s(f) + b^2 \times \sum_{f=1}^{F} B_m(f) + c^2}} \cdot \frac{S}{N_r} \quad (40)$$

When the amount of light S at which S/N=3 is set as the lower limit of detection, LLOD for the merged bin WW, LLOD is expressed by Expression (41) obtained by modifying Expression (13).

[Expression 41]
$$LLOD = \sqrt{\sum_{f=1}^{F} B_s(f) + b^2 \times \sum_{f=1}^{F} B_m(f) + c^2} \times 3 \cdot N_r \quad (41)$$

The upper limit of detection, ULOD for the bin WW, i.e., the saturation-light amount for the bin WW, is expressed by Expression (42), which is a modification of Expression (14).

[Expression 42]
$$ULOD = \sum_{f=1}^{F} B_s(f) \cdot \alpha \cdot M \quad (42)$$

Here, the saturation-light-amount coefficient α and the saturation-light amount M per single pixel follow the same definition and have the same value as described above. Then, the dynamic range DR is expressed by ULOD/LLOD, and is expressed by Expression (43) by modifying Expression (15).

[Expression 43]
$$DR = \frac{\sum_{f=1}^{F} B_s(f)}{\sqrt{\sum_{f=1}^{F} B_s(f) + b^2 \times \sum_{f=1}^{F} B_m(f) + c^2}} \cdot \frac{\alpha \cdot M}{3 \cdot N_r} \quad (43)$$

By defining Expressions (44) to (47) as follows, Expressions (8) to (38) are established as they are. In fact, when Expressions (44) to (47) are used, Expressions (11) and (39) are the same, Expressions (12) and (40) are the same, Expressions (13) and (41) are the same, Expressions (14) and (42) are the same, and Expressions (15) and (43) are the same. These expressions, as well as other expressions, are merely examples. That is, in a case where a combination of a plurality of bins W(f) (or a plurality of pixels) is a merged bin WW, conditions for the merged bin WW to satisfy the high-sensitivity condition and the high-dynamic-range condition are indicated by Expressions (8) to (38) by defining Expressions (44) to (47).

[Expression 44]
$$B_m(f) = B_h(f) \times B_s(f) \quad (44)$$

[Expression 45]
$$B_h = \sum_{f=1}^{F} B_h(f) \quad (45)$$

[Expression 46]
$$B_s = \sum_{f=1}^{F} B_s(f) \quad (46)$$

[Expression 47]
$$B_m = \sum_{f=1}^{F} B_m(f) = \sum_{f=1}^{F} \{B_h(f) \times B_s(f)\} \quad (47)$$

Also for the first bin-merging method to the fourth bin-merging method, only the merging range of the bins W(f) (f=1, 2, . . . , and F) is changed, and if the merging ranges of Expressions (44) to (47) are changed accordingly, Expressions (8) to (38) hold true as they are.

<Consideration of Exposure Time>

In the above description, in a case where the fluorescence measurement by the image sensor is repeatedly performed with a constant exposure time, sensitivity and dynamic range are studied and conditions for achieving both high sensitivity and high dynamic range have been clarified. In this study, by controlling the exposure time, it is further easy to achieve both high sensitivity and high dynamic range, and the range of suitable conditions is expanded. In general, shortening the exposure time allows for an increase in the upper limit of detection, ULOD for the bin W, and thus a higher emission intensity can be measured without saturation. On the other hand, when the exposure time is shortened, the number of times of reading of pixel information increases, and accordingly noise increases and thus the lower limit of detection, LLOD for the bin W also increases. Alternatively, if the number of times of reading of pixel information is not increased while the exposure time is shortened, the measured signal decreases, and thus the lower limit of detection, LLOD also increases. That is, when the exposure time is shortened, the sensitivity may decrease, and in some cases, the dynamic range may also decrease. Therefore, by selecting an optimum exposure time instead of simply shortening the exposure time, it is possible to achieve both high sensitivity and high dynamic range.

The constant exposure time assumed so far is defined as a standard exposure time T. The standard exposure time T is equally divided into μ (division number) shortened exposure time t. Alternatively, the standard exposure time T is increased to an extended exposure time t that is 1/μ times the standard exposure time. Here, assuming that the pixel-information reading time from the image sensor is 0 and there is no time loss due to division, the standard exposure time T is expressed by Expression (48) in both cases of the above shortening and extending.

[Expression 48]
$$T = \mu \times t \quad (48)$$

The division number μ is positive, but not necessarily an integer. When μ≥1, T≥t is satisfied, and thus t represents a shortened exposure time. When 0<μ<1, T<t is satisfied, and therefore t represents an extended exposure time. The following description holds true whether μ≥1 or 0<μ<1. For the sake of simplicity, t is referred to as a shortened exposure time. In the case of μ≥1, a signal equal to the signal measured with the standard exposure time T can be obtained by integrating the u signals measured with the shortened exposure time t by the computer. Here, in the unit exposure time, the readout noise per single pixel is denoted by $n_r$, the dark-current noise per single pixel is denoted by $n_d$, and the shot noise of the background light emitted from the light-emitting point and measured in the bin W is denoted by $n_s$. Furthermore, the dark-current-noise ratio $b_0$ in the unit exposure time is expressed by Expression (49).

[Expression 49]
$$b_0 = n_d/n_r \quad (49)$$

Similarly, the shot-noise ratio $c_0$ in the unit exposure time is expressed by Expression (50).

[Expression 50]
$$c_0 = n_s/n_r \quad (50)$$

Then, in the shortened exposure time t, the readout noise per single pixel is $n_r$, the dark-current noise per single pixel is $t \times n_d = t \times b_0 \times n_r$, and the shot noise of all the light emissions measured in the bin W is $t^{0.5} \times n_s = t^{0.5} \times c_0 \times n_r$. Accordingly, the total noise n in the shortened exposure time t for the bin W is expressed by Expression (51) by modifying Expressions (8) and (11).

[Expression 51]
$$n^2 = B_s \times n_r^2 + B_h \times B_s \times t^2 \times n_d^2 + t \times n_s^2 = \left(B_s + t^2 \times b_0^2 \times B_m + t \times c_0^2\right) \times n_r^2 \quad (51)$$

On the other hand, in the standard exposure time T, the readout noise per single pixel is $N_r = n_r$, the dark-current noise per single pixel is $N_d = T \times n_d$, and the shot noise of the entire light emission measured in the bin W is $N_s = T^{0.5} \times n_s$. Then, the dark-current-noise ratio b is expressed by Expression (52).

[Expression 52]
$$b = N_d / N_r = T \times b_0 \quad (52)$$

The shot-noise ratio c is expressed by Expression (53).

[Expression 53]
$$c = N_s / N_r = \sqrt{T} \times c_0 \quad (53)$$

Therefore, for the bin W, the total noise N of the signal obtained by integrating u signals measured with the shortened exposure time t by the computer, which corresponds to the signal obtained with the standard exposure time T is expressed by Expression (54) by modifying Expressions (8) and (11).

[Expression 54]
$$N^2 = \mu \times n^2 = \mu \times \left(B_s + t^2 \times b_0^2 \times B_m + t \times c_0^2\right) \times n_r^2 = \quad (54)$$
$$\left(\mu \times B_s + \frac{1}{\mu} \times b^2 \times B_m + c^2\right) \times N_r^2$$

Accordingly, the S/N for the bin W is expressed by Expression (55) by modifying Expression (12).

[Expression 55]
$$\frac{S}{N} = \frac{1}{\sqrt{\mu \cdot B_s + \frac{1}{\mu} \cdot b^2 \cdot B_m + c^2}} \cdot \frac{S}{N_r} \quad (55)$$

Therefore, the lower limit of detection, LLOD for the bin W is expressed by Expression (56) by modifying Expression (13).

[Expression 56]
$$LLOD = \sqrt{\mu \cdot B_s + \frac{1}{\mu} \cdot b^2 \cdot B_m + c^2} \times 3 \cdot N_r \quad (56)$$

On the other hand, the upper limit of detection, ULOD of the bin W is expressed by Expression (57) by modifying Expression (14).

[Expression 57]
$$ULOD = \mu \cdot B_s \cdot \alpha \cdot M \quad (57)$$

Therefore, the dynamic range DR is expressed by Expression (58) by modifying Expression (15).

[Expression 58]
$$DR = \frac{\mu \cdot B_s}{\sqrt{\mu \cdot B_s + \frac{1}{\mu} \cdot b^2 \cdot B_m + c^2}} \cdot \frac{\alpha \cdot M}{3 \cdot N_r} \quad (58)$$

Based on the above, conditions for achieving both high sensitivity and high dynamic range will be clarified by controlling the exposure time. Here, S/N and DR are evaluated by comparing the S/N and DR when $B_h = B_s = 1$ at the standard exposure time T. The first high-sensitivity condition is expressed by Expression (59) by modifying Expression (16).

[Expression 59]
$$B_s \le \frac{\left(9 - \frac{1}{\mu} \cdot B_m\right) \cdot b^2 + 8 \cdot c^2 + 9}{\mu} \quad (59)$$

The first high-sensitivity condition when $B_h = 1$ is expressed by Expression (60) by modifying Expression (17).

[Expression 60]
$$B_s \le \frac{9 \cdot b^2 + 8 \cdot c^2 + 9}{\frac{1}{\mu} \cdot b^2 + \mu} \quad (60)$$

The first high-sensitivity condition when $B_s = 1$ is expressed by Expression (61) by modifying Expression (18).

[Expression 61]
$$B_h \le \frac{9 \cdot b^2 + 8 \cdot c^2 + 9 - \mu}{\frac{1}{\mu} \cdot b^2} \quad (61)$$

The second high-sensitivity condition is expressed by Expression (62) by modifying Expression (19).

[Expression 62]
$$B_s \le \frac{\left(9 - \frac{4}{\mu} \cdot B_m\right) \cdot b^2 + 5 \cdot c^2 + 9}{4 \cdot \mu} \quad (62)$$

The second high-sensitivity condition when $B_h = 1$ is expressed by Expression (63) by modifying Expression (20).

[Expression 63]

$$B_s \leq \frac{9 \cdot b^2 + 5 \cdot c^2 + 9}{4 \cdot \left(\frac{1}{\mu} \cdot b^2 + \mu\right)} \quad (63)$$

The second high-sensitivity condition when $B_s=1$ is expressed by Expression (64) by modifying Expression (21).

[Expression 64]

$$B_h \leq \frac{9 \cdot b^2 + 5 \cdot c^2 + 9 - 4 \cdot \mu}{\frac{4}{\mu} \cdot b^2} \quad (64)$$

On the other hand, the first high-dynamic-range condition is expressed by Expression (65) by modifying Expression (22).

[Expression 65]

$$B_s \geq \frac{9 + \sqrt{81 + 36 \cdot \alpha^2 \cdot (b^2 + c^2 + 1) \cdot \left(\frac{1}{\mu} \cdot B_m \cdot b^2 + c^2\right)}}{2 \cdot \alpha^2 \cdot \mu \cdot (b^2 + c^2 + 1)} \quad (65)$$

The first high-dynamic-range condition when $B_h=1$ is expressed by Expression (66) by modifying Expression (23).

[Expression 66]

$$B_s \geq \frac{9 \cdot \left(\frac{1}{\mu} \cdot b^2 + \mu\right) + \sqrt{81 \cdot \left(\frac{1}{\mu} \cdot b^2 + \mu\right)^2 + 36 \cdot \alpha^2 \cdot \mu^2 \cdot (b^2 + c^2 + 1) \cdot c^2}}{2 \cdot \alpha^2 \cdot \mu^2 \cdot (b^2 + c^2 + 1)} \quad (66)$$

The second high-dynamic-range condition is expressed by Expression (67) by modifying Expression (24).

[Expression 67]

$$B_s \geq \frac{100 + \sqrt{10000 + 400 \cdot \alpha^2 + (b^2 + c^2 + 1) \cdot \left(\frac{1}{\mu} \cdot B_m \cdot b^2 + c^2\right)}}{2 \cdot \alpha^2 \cdot \mu \cdot (b^2 + c^2 + 1)} \quad (67)$$

Similarly to the above, by appropriately combining the above Expressions (59) to (67), the noise condition and the binning condition for achieving both high sensitivity and high dynamic range are derived.

<Modification of High-Dynamic-Range Condition>

In the above description, the first high-dynamic-range condition and the second high-dynamic-range condition have been examined. In addition to these, a method of defining the absolute value of the dynamic range is extremely effective in practical use. A currently commercially available capillary electrophoresis instrument for DNA analysis has a dynamic range DR of about 1000, and its application range is therefore limited. In order to obtain a practical dynamic range and expand the application range, a dynamic range DR of 3000 or more is required, and a condition therefor is set as a third high-dynamic-range condition. The third high-dynamic-range condition is expressed by Expression (68).

[Expression 68]

$$DR \geq 3000 \quad (68)$$

For example, when Expression (68) is satisfied in Expressions (15), (34), (43), or (58) described above and Expressions (81) or (85) described below, the third high-dynamic-range condition is satisfied. Furthermore, in order to obtain a more practical dynamic range DR and further expand the application range, a dynamic range DR of 10,000 or more is required, and a condition therefor is set as a fourth high-dynamic-range condition. The fourth high-dynamic-range condition is expressed by Expression (69).

[Expression 69]

$$DR \geq 10000 \quad (69)$$

For example, when Expression (69) is satisfied in Expressions (15), (34), (43), or (58) described above and Expressions (81) or (85) described below, the fourth high-dynamic-range condition is satisfied.

Example 1

<Basic Conditions>

FIG. 1 is a configuration diagram of a multi-capillary electrophoresis instrument which is an example of an analyzer. A multi-capillary electrophoresis instrument is widely used as an analytical instrument that performs DNA sequencing and DNA fragment analysis. The multi-capillary electrophoresis instrument includes a capillary 1, a cathode electrode 4, an anode electrode 5, a cathode-side-buffer solution 6, an anode-side-buffer solution 7, a power supply 8, a pump block 9, a valve 10, a syringe 11, a laser light source 12, a multicolor-detection optical system 15, and a computer 100. The computer 100 controls the entire operation of the multi-capillary electrophoresis instrument. The computer 100 includes a user interface and is configured to set a binning condition to be described later. The computer 100 is configured to analyze the time-series of signal intensities of the fluorescences detected by the multicolor-detection optical system 15 and analyze samples for DNA sequencing by executing a program stored in a memory (not illustrated).

In this Example, using E=4 capillaries 1, DNA sequencing of different four samples was performed in the capillaries 1. Each capillary 1 has an outer diameter of 360 μm and an inner diameter of 50 μm. Each sample for DNA sequencing is composed of DNA fragments labeled with G=4 fluorophores.

One analysis session with the following steps (1) to (6) is performed.

(1) First, sample-injection ends 2 of the E=4 capillaries 1 are immersed in the cathode-side-buffer solution 6. Sample-elution ends 3 are immersed in the anode-side-buffer solution 7 via a polymer solution Ω1 in the pump block 9.

(2) Next, the valve 10 of the pump block 9 is closed, then the polymer solution Ω1 in the pump block 9 is pressurized by pushing down the piston of the syringe 11 connected to the pump block 9. Thereby, the polymer solution Ω1 is filled into each capillary 1 from the sample elution end 3 toward the sample injection end 2.

(3) Subsequently, the valve 10 is opened, then a different sample is electrokinetically injected into each capillary 1 from the sample injection end 2. After that, a high voltage is applied across the cathode electrode 4 and the anode electrode 5 by the power supply 8 to perform capillary electrophoresis. The DNA fragments labeled with G=4 types of fluorophores in each sample is electrophoresed from the sample injection end 2 toward the sample elution end 3 in each capillary 1.

(4) A position of each capillary 1 at a certain electrophoresis distance from the sample injection end 2 is defined as a light-emitting point 14. In parallel to the step (3), each light-emitting point 14 is collectively irradiated with a laser beam 13 oscillated from the laser-light source 12 and having an output of 5 mW and a wavelength of 505 nm. Coating of each capillary 1 in the vicinity of the light-emitting point 14 is removed in advance. The capillaries 1 in the vicinity of the light-emitting points 14 are arranged on the same plane (an arrangement plane). The laser beam 13 is narrowed to about φ 50 μm and then introduced along the arrangement plane from the side of the arrangement plane.

(5) Then, the DNA fragments labeled with G=4 types of fluorophores are electrophoresed inside each capillary 1. The fluorophores are irradiated with the laser beam 13 when passing through each light-emitting point 14, thereby the fluorophores are excited to emit fluorescences. That is, from E=4 light-emitting points 14, G=4 types of fluorophores emit fluorescences, and intensity of each fluorescence changes from moment to moment with electrophoresis.

(6) Finally, the fluorescences emitted from each light-emitting point 14 are measured by the multicolor-detection optical system 15. The time-series of signal intensities of the fluorescences is obtained and analyzed by the computer 100 to perform DNA sequencing for the sample injected into each capillary 1. The size and shape of each light-emitting point 14 are 50-μm square because the inner diameter of each capillary 1 is 50 μm and the diameter of the laser beam is also 50 μm. The multicolor-detection optical system 15 is located on the back side of the light-emitting points 14 in FIG. 1.

Figure 2A:
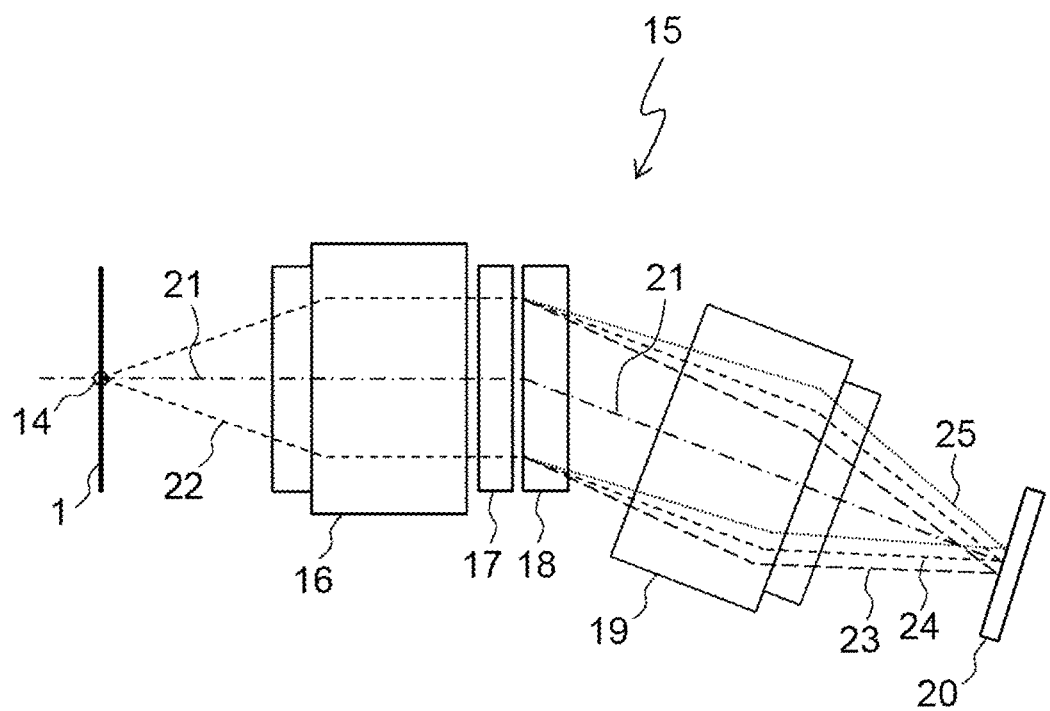
FIG. 2A is a diagram illustrating a configuration example of a multicolor-detection optical system using wavelength dispersion.

FIG. 2A is a diagram illustrating a configuration example of the multicolor-detection optical system 15. FIG. 2A depicts the multicolor-detection optical system 15 seen from the side of the arrangement plane of the four capillaries 1, that is, seen from the direction of the laser-light source 12 in FIG. 1. The multicolor-detection optical system 15 includes a first camera lens 16, a longpass filter 17, a transmission-type diffraction grating 18, a second camera lens 19, and an image sensor 20.

A fluorescence 22 emitted from each of the light-emitting points 14 is collimated by the first camera lens 16 having a focal length of $f_1=50$ mm. Light having a laser wavelength of 505 nm is cut by the longpass filter 17. Then, wavelength dispersion is performed by the transmission-type diffraction grating 18 having a grating frequency of N=600 lines/mm. An image of the fluorescence 22 is formed on the image sensor 20 at the same magnification by the second camera lens 19 having a focal length of $f_2=50$ mm. In the present Example, a CCD having a pixel size of 24 μm square is used as the image sensor 20. The saturation-light-amount ratio of the image sensor 20 is k=1. The direction of wavelength dispersion (the wavelength-dispersion direction) is a direction parallel to the long axis of each capillary 1, that is, a direction perpendicular to the direction in which the light-emitting points 14 are arranged (the light-emitting-point-arrangement direction). However, although an optical axis 21 of the multicolor-detection optical system 15 is bent in the direction of the first-order diffraction by the transmission-type diffraction grating 18 as illustrated in FIG. 2A, the above directions are based on the optical axis 21. Different wavelength components of the collimated fluorescence 22, are dispersed by wavelength like dispersed fluorescences 23, 24, and 25.

Figure 2B:
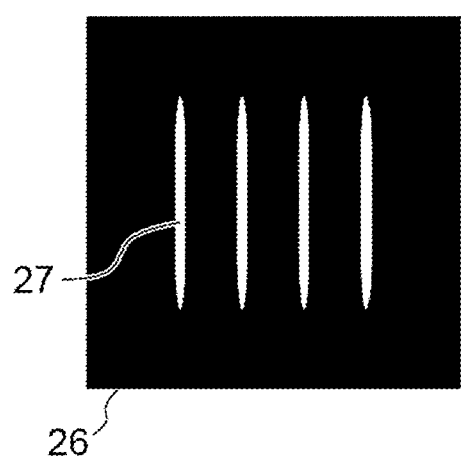
FIG. 2B is a schematic diagram of an overall image captured by an image sensor.

FIG. 2B is a schematic diagram of an overall image 26 captured by the image sensor 20. FIG. 2B illustrates four wavelength-dispersed images 27 of the fluorescences emitted from the E=4 light-emitting points 14 on the image sensor 20. The wavelength-dispersed images 27 are arranged in parallel to each other without being mixed with each other. Therefore, the fluorescence 22 from each light-emitting point 14 can be spectrally measured independently. Furthermore, the image sensor 20 is positioned such that one axis of the two-dimensional lattice arrangement of the pixels of the image sensor 20 and the wavelength-dispersion direction are parallel to each other, and the other axis and the light-emitting-point-arrangement direction are parallel to each other. In FIG. 2B, the vertical direction is the wavelength-dispersion direction, and the horizontal direction is the light-emitting-point-arrangement direction. As a result, a signal-intensity distribution of the pixel array along each wavelength-dispersed image 27 provides a fluorescence spectrum of the fluorescence 22. Hereinafter, an analysis method of one wavelength-dispersed image 27 among the plurality of wavelength-dispersed images 27 to be simultaneously measured will be described. The same analysis method is applied to the other wavelength-dispersed images 27.

In general, the dispersion angle θ of the light with the wavelength λ (nm) is expressed by Expression (70) using the grating frequency (the grating constant) N (lines/mm).

[Expression 70]

$$\theta = \sin^{-1}(N \cdot \lambda \cdot 10^{-6}) \tag{70}$$

The dispersion angle per wavelength of 1 nm is given by Expression (71).

[Expression 71]

$$\frac{d\theta}{d\lambda} = \frac{N}{10^6 \cdot \cos\theta} \tag{71}$$

Then, the dispersion distance (mm) per wavelength of 1 nm on the image sensor 20 is given by Expression (72) from Equations (70) and (71).

[Expression 72]

$$f_2 \cdot \frac{d\theta}{d\lambda} = \frac{N \cdot f_2}{10^6 \cdot \cos\{\sin^{-1}(N \cdot \lambda)\}} \tag{72}$$

In the present Example, the dispersion distance of the light with λ=600 nm on the image sensor 20 per 1 nm is 0.032 mm, i.e., 32 μm by Expression (72) where N=600 lines/mm and $f_2=50$ mm. Since the pixel size of the image sensor 20 is 24 μm, wavelength resolution of 0.75 nm/pixel is obtained.

A 180-nm-width wavelength region of 520 to 700 nm of the wavelength-dispersed image 27 is set as a measurement target. This wavelength region is divided into 20 wavelength bands with a 9-nm width at equal intervals, and the 20 wavelength bands are respectively set to F=20 bins W(f)

(f=1, 2, ..., and 20). Since the wavelength resolution is 0.75 nm/pixel, a light with a 9-nm-width wavelength band is received by 12 pixels in the wavelength-dispersion direction. Since the light-emitting point 14 with the 50-μm-square size are imaged at the same magnification and the pixel size is 24-μm square, the light with the 9-nm-width wavelength band is received by 3 pixels in the light-emitting-point-arrangement direction. Therefore, as a binning condition, each bin W(f) is set to a region of 12 pixels in the wavelength-dispersion direction and 3 pixels in the light-emitting-point-arrangement direction, and the number of pixels constituting each bin W(f) is set to $B_m=12\times3=36$ on the image sensor 20. For each bin W(f), the number of pixels of hardware binning is set to $B_h=36$, and the number of pixels of software binning is set to $B_s=1$. Since the pixel size of the image sensor 20 used in the present Example is 24-μm square, the size of each bin W(f) on the image sensor 20 is 0.288 mm×0.072 mm.

Figure 3:
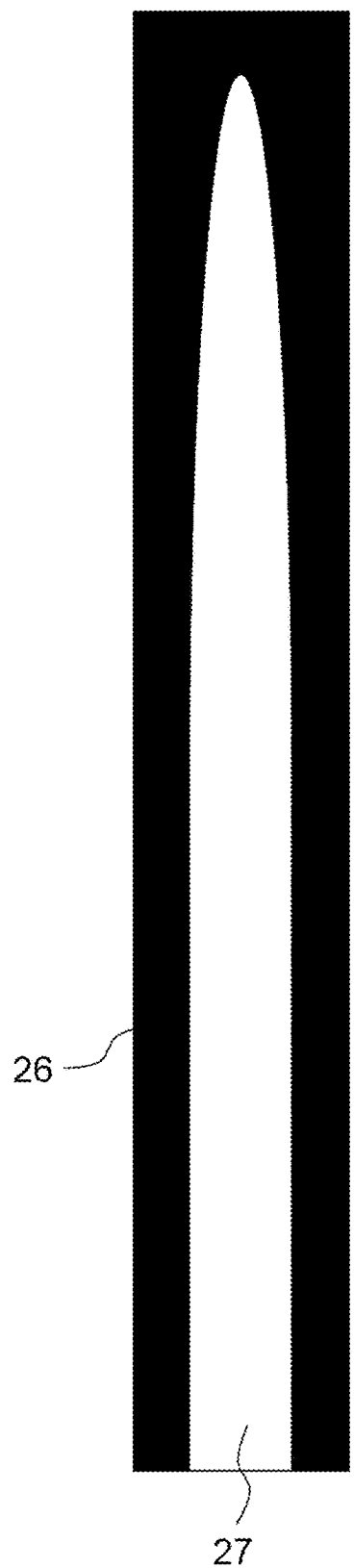
FIG. 3 is an enlarged view of a wavelength-dispersed image.
Figure 4:
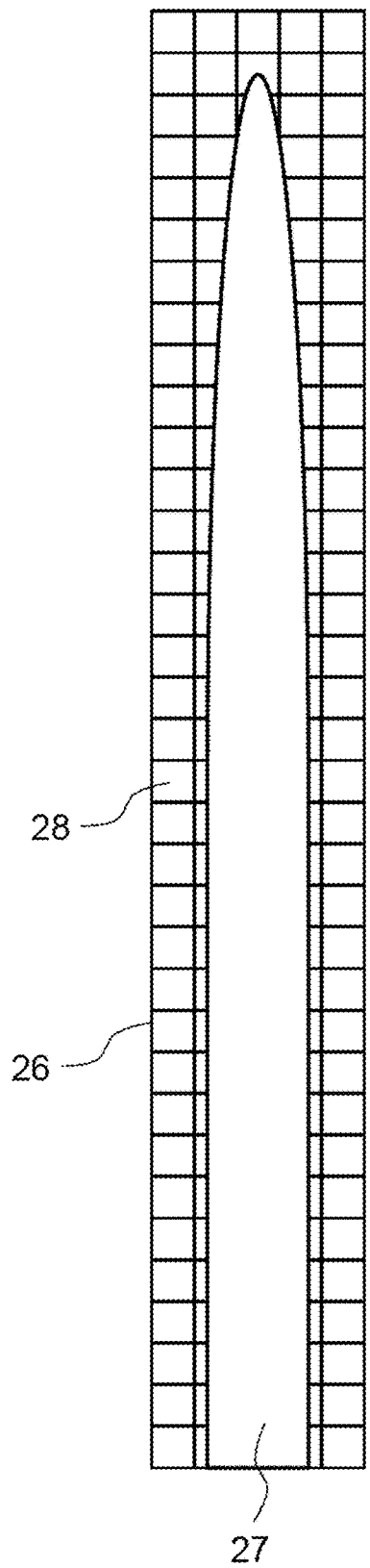
FIG. 4 is an enlarged view of a wavelength-dispersed image and a pixel configuration around the wavelength-dispersed image.
Figure 5:
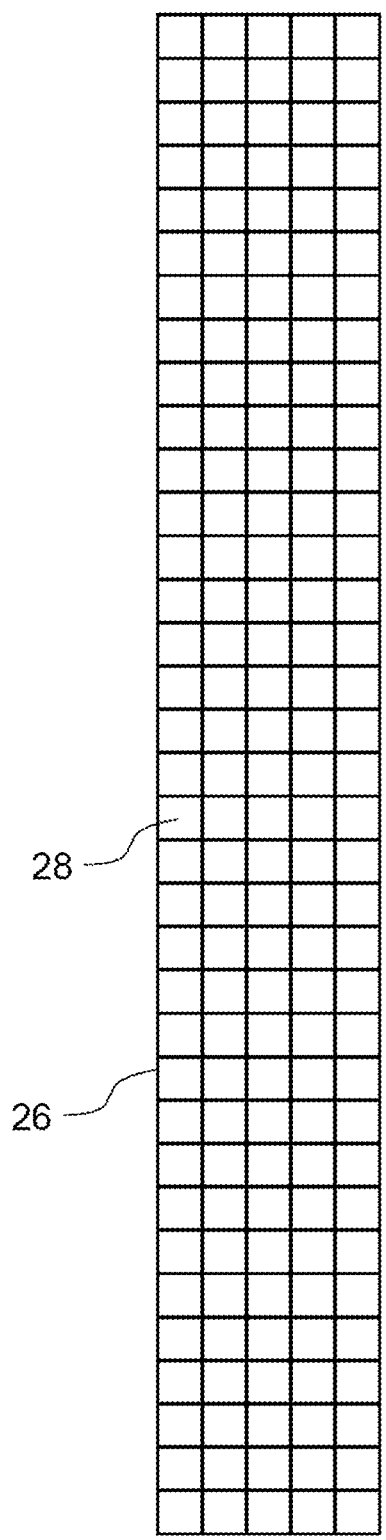
FIG. 5 is an enlarged view of a pixel configuration around a wavelength-dispersed image.
Figure 6:
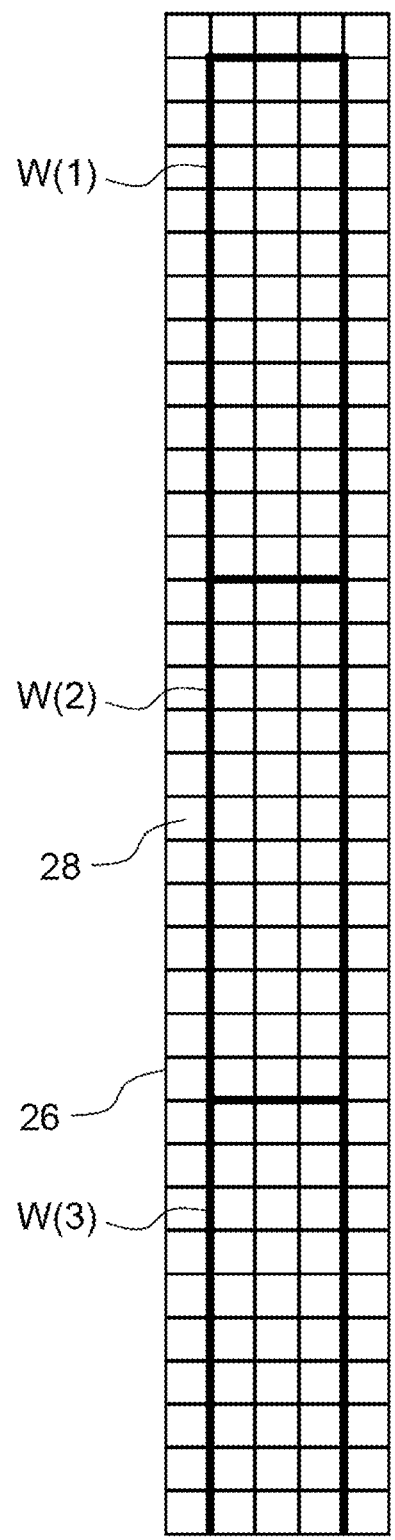
FIG. 6 is an enlarged view of a bin configuration around a wavelength-dispersed image.
Figure 7:
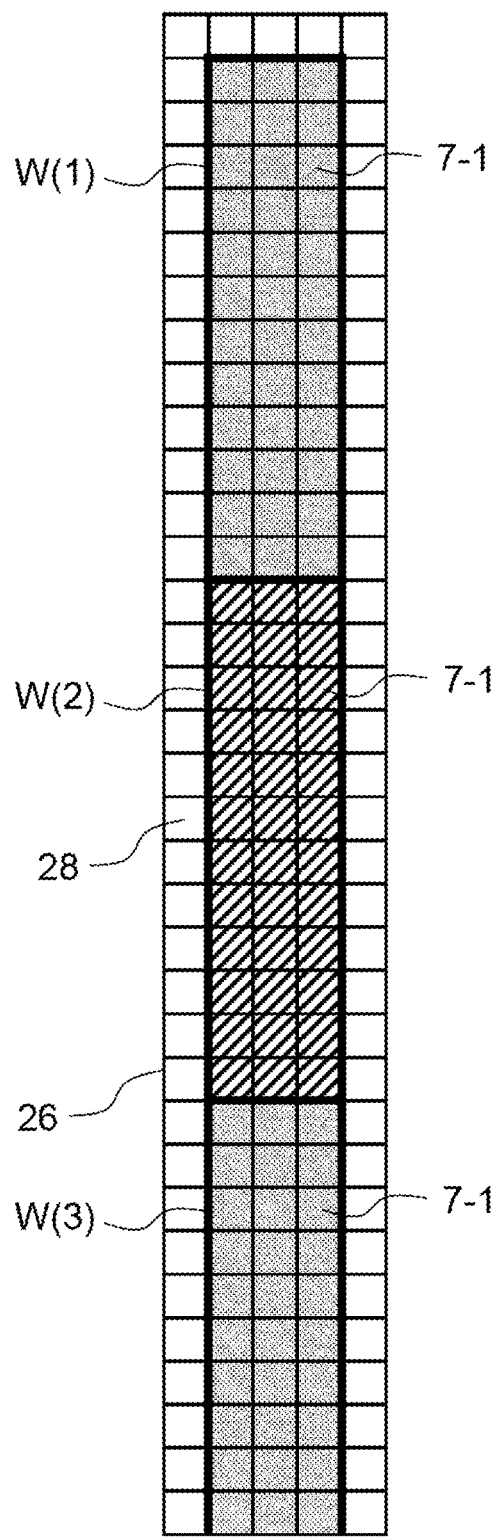
FIG. 7 is an enlarged view of a hardware-binning configuration 1 around a wavelength-dispersed image.

FIG. 3 is an enlarged view of an upper-end portion of one wavelength-dispersed image 27 in the overall image 26 in FIG. 2B. Hereinafter, FIGS. 4 to 10 illustrate the same region as FIG. 3 on the same scale. In each figure, only a small part of the overall image 26 acquired by the image sensor 20 is illustrated. FIG. 4 illustrates a configuration of pixels 28 in the same region as FIG. 3. FIG. 5 illustrates the pixel configuration excluding the wavelength-dispersed image 27 in FIG. 4. A total of 175 pixels 28 with 5 pixels in the horizontal direction (the light-emitting-point-arrangement direction) and 35 pixels in the vertical direction (the wavelength-dispersion direction) are drawn. In FIG. 6, the regions of the bins W(f) are added to FIG. 5 with thick lines; the bin W(1), the bin W(2), and a part of the bin W(3) are illustrated. In accordance with the binning conditions described above, each bin W(f) is composed of 36 pixels 28 with $B_m=12\times3$ pixels, that is, 12 pixels in the vertical direction (the wavelength-dispersion direction)×3 pixels in the horizontal direction (the light-emitting-point-arrangement direction). FIG. 7 illustrates hardware binning regions 7-1 in gray or oblique lines added to FIG. 6 according to the above binning condition. The binning condition for each bin W(f) with $B_m=36$ pixels 28 are represented by one hardware binning region 7-1 with $B_h=36$ pixels 28 and software binning with $B_s=1$ pixel 28.

Figure 8:
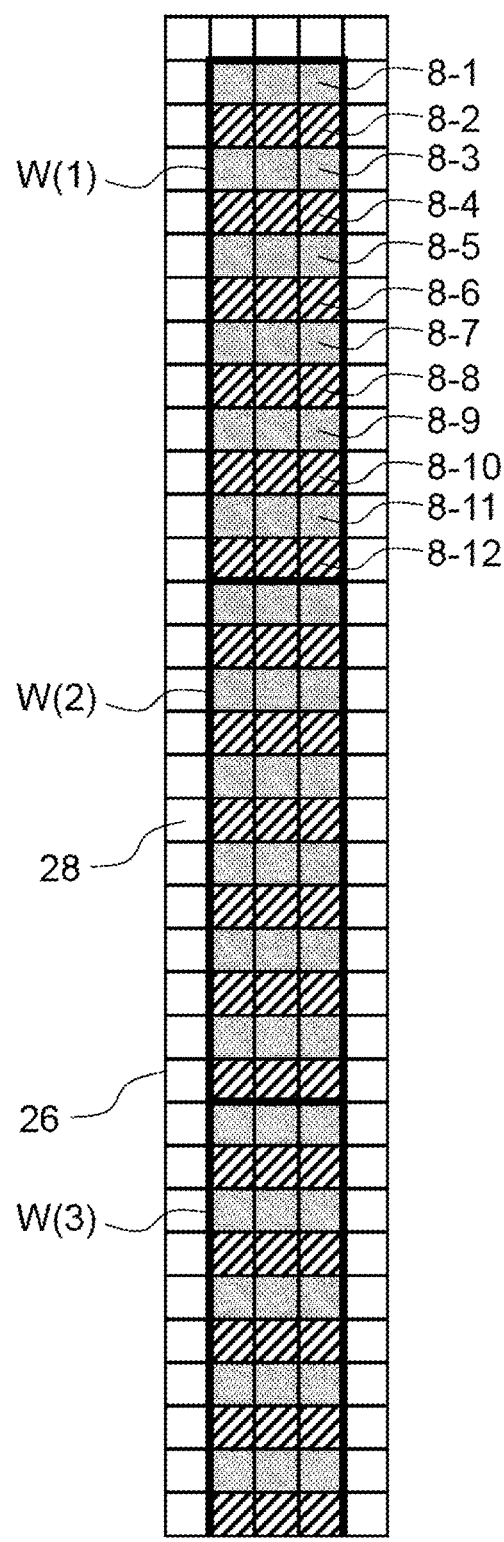
FIG. 8 is an enlarged view of a hardware-binning configuration 2 around a wavelength-dispersed image.
Figure 9:
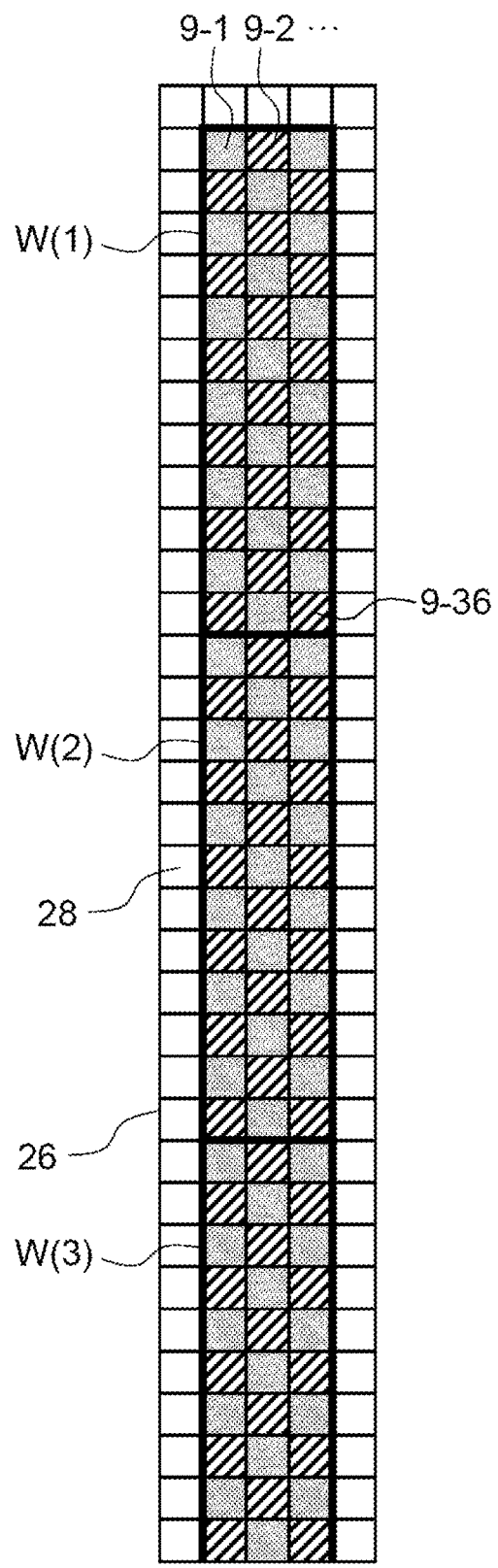
FIG. 9 is an enlarged view of a hardware-binning configuration 3 around a wavelength-dispersed image.
Figure 10:
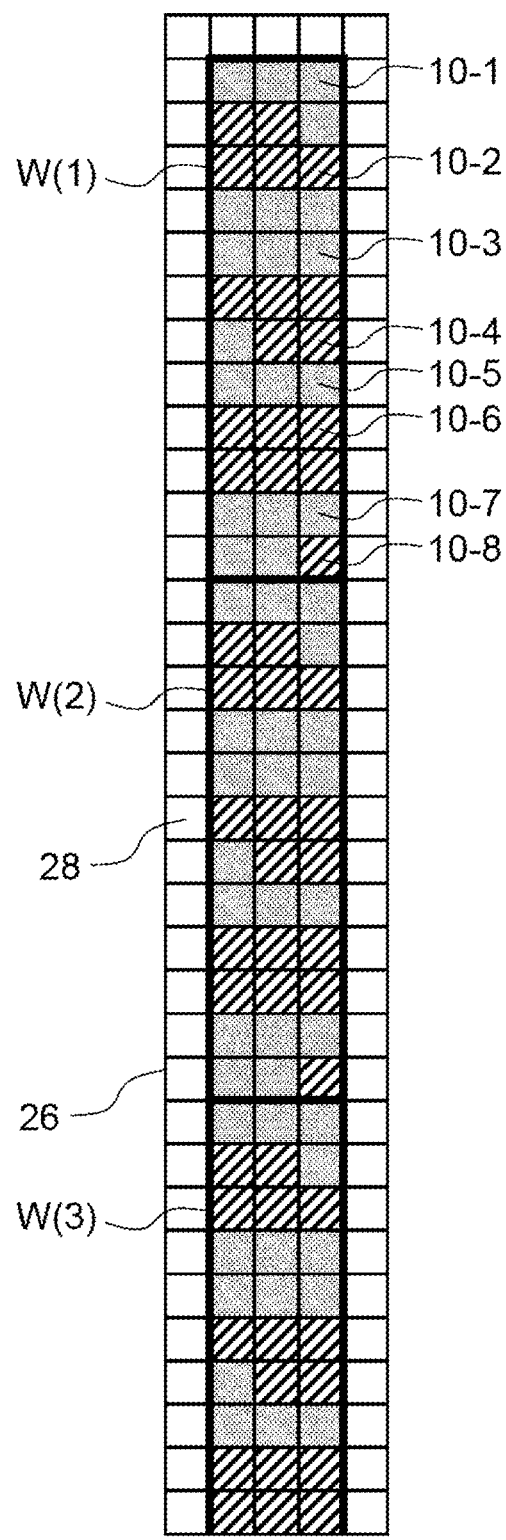
FIG. 10 is an enlarged view of a hardware-binning configuration 4 around a wavelength-dispersed image.

On the other hand, FIGS. 8 to 10 illustrate different binning conditions than the above binning condition. In FIG. 8, each bin W(f) is represented by 12 hardware binning regions 8-1 to 8-12 with $B_h=3$ pixels 28 and software binning with $B_s=12$ pixels 28. In FIG. 9, each bin W(f) is represented by 36 hardware binning regions 9-1 to 9-36 with $B_h=1$ pixel 28 and software binning with $B_s=36$ pixels 28. In FIGS. 8 and 9, the number of pixels $B_h$ of each of the plurality of hardware binning regions for each bin W(f) is constant ($B_h=3$ in FIG. 8, and $B_h=1$ in FIG. 9). However, the number of pixels $B_h$ is not necessarily constant, as illustrated in the example in FIG. 10. In FIG. 10, each bin W(f) is represented by 8 hardware binning regions 10-1 to 10-8 with $B_h=4, 5, 6, 5, 4, 6, 5,$ and one pixels 28 and software binning with $B_s=8$ pixels 28. In such a case, an average value of the number of pixels of the plurality of hardware binning regions may be denoted by $B_h$. In the case of FIG. 10, $B_h=(4+5+6+5+4+6+5+1)/8=36/8=4.5$.

FIGS. 7 to 10 illustrate four types of binning conditions for each bin W(f) with $B_m=36$. These binning conditions are merely examples, and various other binning conditions can be set. Furthermore, the number of pixels 28 constituting each bin W(f) is not limited to $B_m=36$, and can be set to any value.

Since the setting of the binning conditions as described above is performed by software or firmware, the current binning condition can be revealed. Even if the setting is unknown, the current binning condition can be revealed. For example, it is assumed that only X(f) that is the signal intensity of the bin W(f) can be referred to, or that only the concentration Z(g) of the fluorophore D(g) can be referred to. It is possible to examine the response of the signal intensity X(f) or the concentration Z(g) to the amount of light incident on each pixel by allowing the light to be incident on each pixel and changing the incident light intensity. Examples of means for allowing the light to be incident on each pixel include a method in which a laser beam is narrowed and made incident on an image sensor, and a method in which a light with a single wavelength is emitted from a very small light-emitting point to form an image on the image sensor. As a result, each pixel can be classified into each bin W(f), and the number of pixels $B_m$ in each bin W(f) can be identified. The number of pixels $B_h$ of hardware binning and the number of pixels $B_s$ of software binning in each bin W(f) can be identified from the response of the signal intensity X(f) or the concentration Z(g) when the number of pixels on which the light is incident is increased to two pixels, three pixels, etc. Of course, the binning condition may be examined by other means. From the above results, it is possible to determine whether the current binning condition is appropriate for achieving both high sensitivity and high dynamic range, and change the binning condition to an appropriate binning condition as necessary.

Imaging by the image sensor 20 is repeated with an exposure time of 100 ms and a sampling interval of 150 ms. By obtaining the signal intensities X(f) (f=1, 2, ..., and 20) integrated in the bins W(f) at each time (at each sampling), the matrix X with 20 rows and 1 column represented by Expression (2) is obtained at each time. The matrix Y with 20 rows and 4 columns represented by Expression (3) is obtained in advance. Then, the matrix Z with 4 rows and 1 column represented by Expression (4) is obtained at each time by Expression (6). That is, temporal changes of the concentration Z(g) (g=1, 2, 3, 4) of the G=4 types of fluorophores are obtained. DNA sequencings of the sample injected into each capillary 1 is performed by analyzing the obtained the temporal changes.

Noise analysis was performed under the above measurement conditions and the binning condition of $B_m=36$, $B_h=36$, and $B_s=1$ illustrated in FIG. 7. The noise composition is the same for each bin W(f). When the same measurement as described above is performed in a state where no light is incident on the image sensor, that is, under the condition of $N_s=0$ count in Expression (8), the standard deviation of the time-series data of the signal intensity X(f) is obtained. The "count" used in the present application is a unit of signal intensity digitally output by the image sensor.

In addition, when the exposure time is changed stepwise in the range of 0 ms to 1000 ms, the standard deviation is obtained for each exposure time in the same manner. A relationship between the exposure time and the standard deviation is plotted and an approximate curve for the relationship is obtained. As a result, the vertical axis intercept of the approximate curve is 1.5 counts. The vertical intercept, that is, the standard deviation at the exposure time of 0 ms corresponds to the readout noise per the bin W(f). On the other hand, the readout noise per the bin W(f) is given by the root of the first term $B_s \times N_r^2$ on the right side of Expression (8). Therefore, since $B_s=1$ under the current binning condition, the readout noise per single pixel is obtained as $N_r=1.5$ counts.

Next, the value of the approximate curve at an exposure time of 100 ms is determined to be 1.55 counts. Then, the left side of Expression (8) is $N^2=1.55^2$, while the first term on the right side is $B_s \times N_r^2=1.5^2$, and the third term on the right side is $N_s^2=0$. Accordingly, the second term on the right side that gives the dark-current noise per the bin W(f) is $B_h \times B_s \times N_d^2=1.55^2-1.5^2=0.39^2$. Since $B_h=36$ and $B_s=1$ under the current binning condition, the dark-current noise per single pixel is obtained as $N_d=0.065$ counts.

Finally, when the background light at the time of electrophoresis analysis is incident on the image sensor, the standard deviation of the background light, that is, the total noise is determined to be $N=1.6$ counts. Then, the left side of Expression (8) is $N^2=1.6^2$, while the first term of the right side is $B_s \times N_r^2=1.5^2$, and the second term of the right side is $B_h \times B_s \times N_d^2=0.39^2$. Accordingly, the third term of the right side giving the shot noise per the bin W(f) is $N_s^2=1.6^2-1.5^2-0.39^2=0.40^2$. Therefore, the shot noise of the background light emitted from the light-emitting point and measured in the bin W(f) is obtained as $N_s=0.40$ counts. From the above, the dark-current-noise ratio in Expression (9) is obtained as $b=0.043$, and the shot-noise ratio in Expression (10) is obtained as $c=0.27$.

For the above setting, sensitivity and dynamic-range performances were examined. When $b=0.043$ and $c=0.27$ are substituted into Expression (18) under the condition of "$1 \leq B_h \leq B_m$", $B_h \leq 36$ is obtained. Thus, the current binning condition ($B_h=36$, $B_s=1$) satisfies the first high-sensitivity condition. When $b=0.043$ and $c=0.27$ are substituted into Expression (21) under the condition of "$1 \leq B_h \leq B_m$", $B_h \leq 36$ is obtained. Thus, the current binning condition ($B_h=36$, $B_s=1$) also satisfies the second high-sensitivity condition. On the other hand, since $B_s=1$, the current conditions do not satisfy both the first high-dynamic-range condition and the second high-dynamic-range condition. That is, it is found that both the high-sensitivity condition and the high-dynamic-range condition cannot be achieved under the current binning condition. In the above description, since the saturation-light-amount ratio of the image sensor 20 is $k=1$, $\alpha=1$ is set.

In the above description, $N_r$, b, and c indicating the noise composition were derived by the means of changing the exposure time. The noise composition can be obtained even in a case where the exposure time is not changed. It is found that the shot noise for each bin W(f) is proportional to the root of the amount of light incident on the bin W(f). Therefore, the shot noise can be controlled by changing the amount of incident light. When the square of the total noise $N^2$ of the signal intensity X(f) for the bin W(f) is plotted against the square of the shot-noise ratio $c^2$, an approximate straight line having a slope of $N_r^2$ and a vertical intercept of $(B_s+b^2 \times B_m) \times N_r^2$ is obtained by Expression (11). Thereby, $N_r$ and the dark-current-noise ratio b can be derived. The shot-noise ratio c can be derived from the total noise N under the actual measurement conditions and the straight line.

<Modification of Various Conditions>

Based on the above, it was examined whether both the high-sensitivity condition and the high-dynamic-range condition can be satisfied by changing the binning condition, specifically by changing the number of pixels $B_h$ of hardware binning and the number of pixels $B_s$ of software binning while fixing the settings of the multicolor-detection optical system and $B_m=36$. Substituting $B_m=36$, $b=0.043$, and $c=0.27$ into Expression (16) under the condition of "$1 \leq B_s \leq B_m$ and $B_s$ is an integer" gives $B_s \leq 9$. Alternatively, substituting $B_m=36$, $b=0.043$, and $c=0.27$ into Expression (22) under the same condition gives $B_s \geq 9$. Therefore, by setting the conditions of $B_h=4$ and $B_s=9$, Expression (26) is satisfied, that is, the first high-sensitivity condition and the first high-dynamic-range condition are both satisfied. On the other hand, when $B_m=36$, $b=0.043$, and $c=0.27$ are substituted into Expression (19) under the same condition, $B_s \leq 2$ is obtained. Further, when $B_m=36$, $b=0.043$, and $c=0.27$ are substituted into Expression (24) on the same condition, there is no solution. Therefore, Expression (27) is not satisfied, that is, both the second high-sensitivity condition and the second high-dynamic-range condition are not satisfied.

Next, the measurement conditions is changed. The separation medium filled in the capillary 1 is changed from the polymer solution Ω1 to the polymer solution Ω2. The power of the laser beam is increased from 5 mW to 20 mW. When the same noise analysis as described above is performed under the above conditions, the noise composition is changed. The noise composition is different depending on the bin W(f). The total noise for the bin W(20) is the smallest: $N=4$ counts. Meanwhile, the total noise for the bin W(10) is the largest: $N=16$ counts. In either case, the readout noise per single pixel is $N_r=1.5$ counts, and the dark-current noise per single pixel is $N_d=0.065$ counts. From the above, it is found that the shot noise of the background light emitted from the light-emitting point and measured in the bin W(f) is $N_s=3.7$ counts in the bin W(20) and $N_s=16$ counts in the bin W(10). That is, in each bin W(f), $N_r$ and $N_d$ are constant, but $N_s$ is different and changes from 3.7 to 16 counts. Therefore, the dark-current-noise ratio b in Expression (9) is 0.043, and the shot-noise ratio c in Expression (10) changes from 2.5 to 10.7.

When these are substituted into Expression (18) under the condition of "$1 \leq B_h \leq B_m$", $B_h \leq 36$ is obtained for an arbitrary shot-noise ratio c of $c=2.5$ to 10.7, and thus the current binning condition ($B_h=36$, $B_s=1$) satisfies the first high-sensitivity condition. When these are substituted into Expressions (21) under the condition of "$1 \leq B_h \leq B_m$", $B_h \leq 36$ is also obtained for an arbitrary shot-noise ratio c of $c=2.5$ to 10.7, and thus the current binning condition ($B_h=36$, $B_s=1$) also satisfy the second high-sensitivity condition. On the other hand, since $B_s=1$, the current binning condition does not satisfy both the first high-dynamic-range condition and the second high-dynamic-range condition. That is, it is found that both the high-sensitivity condition and the high-dynamic-range condition cannot be achieved under the current binning condition. In the above description, since the saturation-light-amount ratio of the image sensor 20 is $k=1$, $\alpha=1$ is set. On the other hand, the saturation-light amount per single pixel of the image sensor is $M=65000$. When $c=2.5$, $DR=5340$ is obtained from Expression (15). Therefore, it is found from Expressions (68) and (69) that the current binning condition satisfies the third high-dynamic-range condition but does not satisfy the fourth high-dynamic-range condition. On the other hand, when $c=10.7$, $DR=1344$ is obtained from Expression (15). Therefore, it is found from Expressions (68) and (69) that the current binning condition does not satisfy both the third high-dynamic-range condition and the fourth high-dynamic-range condition.

Subsequently, in the same manner as described above, it was examined whether both the high-sensitivity condition and the high-dynamic-range condition can be satisfied by changing the number of pixels $B_h$ of hardware binning and the number of pixels $B_s$ of software binning while fixing the settings of the multicolor-detection optical system and $B_m=B_h \times B_s=36$. Here, the number of pixels $B_h$ of hardware binning is an integer. First, the shot-noise ratio is set to c=2.5. Substituting $B_m=36$ and b=0.043 into Expressions (16) and (19) results in $B_s \leq 36$ and $B_s \leq 10$, respectively, under the condition of "$1 \leq B_s \leq B_m$ and $B_s$ is an integer". Meanwhile, substituting $B_m=36$ and b=0.043 into Expressions (22) and (24) results in $B_s \geq 4$ and $B_s \geq 19$, respectively, under the same condition.

The above is summarized as follows. When ($B_h$, $B_s$) is (36, 1), (18, 2), or (12, 3), the second high-sensitivity condition is satisfied. When ($B_h$, $B_s$) is (9, 4), (6, 6), or (4, 9), both the second high-sensitivity condition and the first high-dynamic-range condition are satisfied. When ($B_h$, $B_s$) is (3, 12) or (2, 18), both the first high-sensitivity condition and the first high-dynamic-range condition are satisfied. When ($B_h$, $B_s$) is (1, 36), both the first high-sensitivity condition and the second high-dynamic-range condition are satisfied. Therefore, there is no solution satisfying both the second high-sensitivity condition and the second high-dynamic-range condition. On the other hand, from Expressions (15), (68), and (69), it is found that both the third high-dynamic-range condition and the fourth high-dynamic-range condition are satisfied in any of cases that ($B_h$, $B_s$) is (18, 2), (12, 3), (9, 4), (6, 6), (4, 9), (3, 12), (2, 18), and (1, 36).

Next, the shot-noise ratio is set to c=10.7. When $B_m=36$ and b=0.043 are substituted into Expressions (16) and (19), $B_s \leq 36$ is obtained under the condition of "$1 \leq B_s \leq B_m$ and $B_s$ is an integer". Meanwhile, when $B_m=36$ and b=0.043 are substituted into Expressions (22) and (24) under the same condition, $B_s \geq 3$ and $B_s \geq 11$ are obtained, respectively. The above is summarized as follows. When ($B_h$, $B_s$) is (36, 1) or (18, 2), the second high-sensitivity condition is satisfied. When ($B_h$, $B_s$) is (12, 3), (9, 4), (6, 6), or (4, 9), both the second high-sensitivity condition and the first high-dynamic-range condition are satisfied. When ($B_h$, $B_s$) is (3, 12), (2, 18), or (1, 36), both the second high-sensitivity condition and the second high-dynamic-range condition are satisfied. In the above description, since the saturation-light-amount ratio of the image sensor 20 is k=1, α=1 is derived. Incidentally, FIG. 7 illustrates a case where ($B_h$, $B_s$) is (36, 1), FIG. 8 illustrates a case where ($B_h$, $B_s$) is (3, 12), and FIG. 9 illustrates a case where ($B_h$, $B_s$) is (1, 36). As described above, there is a plurality of solutions in which both the high-sensitivity condition and the high-dynamic-range condition are satisfied at the same level. In such a case, it may be better to select a solution having a larger number of pixels $B_h$ Of hardware binning from the plurality of solutions, because it is advantageous in that the data (pixel information) reading speed from the image sensor can be improved. On the other hand, from Expressions (15), (68), and (69), it is found that the third high-dynamic-range condition is satisfied but the fourth high-dynamic-range condition is not satisfied in any cases that ($B_h$, $B_s$) is (12, 3), (9, 4), and (6, 6). It is also found that both the third high-dynamic-range condition and the fourth high-dynamic-range condition are satisfied in any cases that ($B_h$, $B_s$) is (4, 9), (3, 12), (2, 18), and (1, 36).

As described above, it has become apparent that both the high-sensitivity condition and the high-dynamic-range condition can be achieved by modifying the binning condition. Note that, the binning conditions satisfying both the high-sensitivity condition and the high-dynamic-range condition change depending on the noise composition represented by the dark-current-noise ratio b and the shot-noise ratio c. Therefore, depending on the noise composition, the binning conditions satisfying both may be widened, or there may be no binning condition satisfying both.

<Modification of Saturation-Light-Amount Ratio>

Subsequently, in a case where the image sensor 20 having the saturation-light-amount ratio of k=1 is replaced with the image sensor 20 having the saturation-light-amount ratio of k=3, the performances of sensitivity and dynamic range are similarly examined. Here, since the number of pixels $B_h$ of hardware binning is a positive integer, α=1 when $B_h$=1, α=2 when $B_h$=2, and α=3 when $B_h \geq 3$. Hereinafter, $1 \leq B_s \leq B_m$ and $B_s$ is an integer.

First, the case of $B_m=36$, b=0.043, and c=0.27 was examined. Since Expression (16) and Expression (19) do not include α, the high-sensitivity condition satisfied by each binning condition does not change from the case of k=1. That is, the first high-sensitivity condition is satisfied by setting $B_s \leq 9$, and the second high-sensitivity condition is satisfied by setting $B_s \leq 2$. On the other hand, since Expression (22) and Expression (24) include α, the high-dynamic-range condition satisfied by each binning condition changes from the case of k=1. When $B_h$=1, α=1, and $B_s \geq 9$ is obtained from Expression (22). When $B_h$=2, α=2, and $B_s \geq 3$ is obtained from Expression (22). When $B_h \geq 3$, α=3, and $B_s \geq 1$ is obtained from Expression (22). Therefore, all combinations of ($B_h$, $B_s$) with (1, 36), (2, 18), (3, 12), (4, 9), (6, 6), (9, 4), (12, 3), (18, 2), and (36, 1) satisfy the first high-dynamic-range condition.

On the other hand, when $B_h$=1, α=1, and $B_s \geq 36$ is obtained from Expression (24). When $B_h$=2, α=2, and $B_s \geq 24$ is obtained from Expression (24). When $B_h \geq 3$, α=3, and $B_s \geq 11$ is obtained from Expression (24). Therefore, combinations of ($B_h$, $B_s$) with (1, 36) and (3, 12) satisfy the second high-dynamic-range condition. As described above, by setting the ($B_h$, $B_s$) to any one of (4, 9), (6, 6), (9, 4), (12, 3), (18, 2), and (36, 1), both the first high-sensitivity condition and the first high-dynamic-range condition are satisfied. It is found that there is no binning condition satisfying both the second high-sensitivity condition and the second high-dynamic-range condition simultaneously.

Next, the case of $B_m=36$, b=0.043, and c=2.5 was examined. Since Expression (16) and Expression (19) do not include α, the high-sensitivity condition satisfied by each binning condition does not change from the case of k=1. That is, the first high-sensitivity condition is satisfied when $B_s \leq 36$, and, the second high-sensitivity condition is satisfied when $B_s \leq 10$. On the other hand, since Expression (22) and Expression (24) include α, the high-dynamic-range condition satisfied by each binning condition changes from the case of k=1. When $B_h$=1, α=1, and $B_s \geq 4$ is obtained from Expression (22). When $B_h$=2, α=2, and $B_s \geq 2$ is obtained from Expression (22). When $B_h \geq 3$, α=3, and $B_s \geq 1$ is obtained from Expression (22). Therefore, all combinations of ($B_h$, $B_s$) with (1, 36), (2, 18), (3, 12), (4, 9), (6, 6), (9, 4), (12, 3), (18, 2), and (36, 1) satisfy the first high-dynamic-range condition.

On the other hand, when $B_h$=1, α=1, and $B_s \geq 18$ is obtained from Expression (24). When $B_h$=2, α=2, and $B_s \geq 7$ is obtained from Expression (24). When $B_h \geq 3$, α=3, and $B_s \geq 4$ is obtained from Expression (24). Therefore, combinations of ($B_h$, $B_s$) with (1, 36), (2, 18), (3, 12), (4, 9), (6, 6), and (9, 4) satisfy the second high-dynamic-range condition. From the above, by setting the ($B_h$, $B_s$) to any one of (1, 36), (2, 18), (3, 12), (4, 9), (6, 6), (9, 4), (12, (18, 2), and (36, 1), both the first high-sensitivity condition and the first high-dynamic-range condition are satisfied. Moreover, by setting ($B_h$, $B_s$) to any one of (4, 9), (6, 6), and (9, 4), both the second high-sensitivity condition and the second high-dynamic-range condition are satisfied.

Finally, the case of $B_m=36$, b=0.043, and c=10.7 was examined. Since Expression (16) and Expression (19) do not include α, the high-sensitivity condition satisfied by each binning condition does not change from the case of k=1. That is, both the first high-sensitivity condition and the second high-sensitivity condition are satisfied when $B_s \leq 36$. On the other hand, since Expression (22) and Expression (24) include α, the high-dynamic-range condition satisfied by each binning condition changes from the case of k=1. When $B_h=1$, α=1, and $B_s \geq 3$ is obtained from Expression (22). When $B_h=2$, α=2, and $B_s \geq 2$ is obtained from Expression (22). When $B_h \geq 3$, α=3, and $B_s \geq 1$ is obtained from Expression (22). Therefore, all combinations of $(B_h, B_s)$ with (1, 36), (2, 18), (3, 12), (4, 9), (6, 6), (9, 4), (12, 3), (18, 2), and (36, 1) satisfy the first high-dynamic-range condition.

On the other hand, when $B_h=1$, α=1, and $B_s \geq 11$ is obtained from Expression (24). When $B_h=2$, α=2, and $B_s \geq 6$ is obtained from Expression (24). When $B_h \geq 3$, α=3, and $B_s \geq 4$ is obtained from Expression (24). Therefore, combinations of $(B_h, B_s)$ with (1, 36), (2, 18), (3, 12), (4, 9), (6, 6), and (9, 4) satisfy the second high-dynamic-range condition. From the above, by setting the $(B_h, B_s)$ to any one of (1, 36), (2, 18), (3, 12), (4, 9), (6, 6), (9, 4), (12, 3), (18, 2), and (36, 1), both the first high-sensitivity condition and the first high-dynamic-range condition are satisfied. Moreover, by setting $(B_h, B_s)$ to any one of (1, 36), (2, 18), (3, 12), (4, 9), (6, 6), and (9, 4), both the second high-sensitivity condition and the second high-dynamic-range condition are satisfied. As described above, it is found that by changing the saturation-light-amount ratio from k=1 to k=3, the range of the binning condition that achieves both the high-sensitivity condition and the high-dynamic-range condition is expanded, that is, the effects of this invention are more easily obtained.

In the present Example, the noise condition and the binning condition that achieve both the high-sensitivity condition and the high-dynamic-range condition have been found. However, in a case where sensitivity is more important than dynamic range, it may be better to return to $(B_h, B_s)$ with (36, 1) (the original binning condition). Therefore, in the same multi-capillary electrophoresis instrument, depending on the application, it is effective to selectively use a mode in which high sensitivity is emphasized rather than high dynamic range or a mode in which both high sensitivity and high dynamic range are emphasized. That is, it is effective to be able to select an appropriate binning condition from among a plurality of binning conditions. The user may select a desired binning condition from a plurality of binning conditions using a user interface in the multi-capillary electrophoresis instrument. Alternatively, it is also effective that the software can select an appropriate binning condition from a plurality of binning conditions without consciously selecting the binning condition by the user.

<Change of Image Sensor>

Under the condition defined in <Basic condition> described above, the CCD image sensor was changed to a CMOS image sensor with pixel size of 3.63 μm square. AD conversion of the CCD image sensor is BN=16 bits, whereas AD conversion of the CMOS image sensor is BN=12 bits. Since the setting of the multicolor-detection optical system is not changed, the size of the image of the light in the wavelength band to be measured by each of the bins W(1) to W(20) on the image sensor remains 0.288 mm×0.072 mm. The number of pixels constituting each bin W(f) is set to $B_m=79 \times 20=1580$ so that each bin W(f) measures light in the same wavelength band. That is, the number of pixels for each bin W(f) is 40 times or more compared to the above. Since the CMOS image sensor cannot execute hardware binning, the number of pixels of hardware binning is set to $B_h=1$, and the number of pixels of software binning is set to $B_s=1580$ for each bin W(f). Since the saturation-light-amount ratio is k=1, α=1. Although AD conversion of the CMOS image sensor is only BN=12 bits per single pixel, since $B_s=1580$, the resolution of the digital signal is equivalent to $B_s \times BN=1580 \times 12$ bits=23 bits. Therefore the resolution far exceeding 16 bits can be substantially obtained.

Noise analysis under the above conditions gives the readout noise of $N_r=1.06$ counts per single pixel, the dark-current-noise ratio of b=0.21, and the shot-noise ratio of c=10. Based on these results, the binning condition satisfying the first high-sensitivity condition is $B_s \leq 775$ according to Expression (17). The binning condition satisfying the second high-sensitivity condition is $B_s \leq 121$ according to Expression (20). On the other hand, the binning condition satisfying the first high-dynamic-range condition is $B_s \geq 3$ according to Expression (23). The binning condition satisfying the second high-dynamic-range condition is $B_s \geq 11$ according to Expression (25). From the above, it is found that the binning condition of $B_m=B_s=1580$ satisfies both the first high-dynamic-range condition and the second high-dynamic-range condition, but does not satisfy both the first high-sensitivity condition and the second high-sensitivity condition.

Then, the measurement conditions are changed without changing the setting of the multicolor-detection optical system in the same way as <Modification of various conditions> described above. Noise analysis based on the above changes gives the readout noise of $N_r=1.06$ counts per single pixel, and the dark-current-noise ratio of b=0.21. These values are unchanged from the values above. In contrast, the shot-noise ratio c has increased to 24-52. Here, c=24 is obtained in the bin W(20) and c=52 is obtained in the bin W(10).

First, when the shot-noise ratio is c=24, the binning condition satisfying the first high-sensitivity condition is $B_s \leq 4422$ according to Expression (17). The binning condition satisfying the second high-sensitivity condition is $B_s \leq 652$ according to Expression (20). On the other hand, the binning condition satisfying the first high-dynamic-range condition is $B_s \geq 3$ according to Expression (23). The binning condition satisfying the second high-dynamic-range condition is $B_s \geq 11$ according to Expression (25). From the above, it is found that the binning condition of $B_m=B_s=1580$ satisfies both the first high-dynamic-range condition and the second high-dynamic-range condition. The binning condition of $B_m=B_s=1580$ also satisfies the first high-sensitivity condition, but does not satisfy the second high-sensitivity condition.

Next, when the shot-noise ratio is c=52, the binning condition satisfying the first high-sensitivity condition is $B_s \leq 21571$ according to Expression (17). The binning condition satisfying the second high-sensitivity condition is $B_s \leq 3312$ according to Expression (20). On the other hand, the binning condition satisfying the first high-dynamic-range condition is $B_s \geq 3$ according to Expression (23). The binning condition satisfying the second high-dynamic-range condition is $B_s \geq 10$ according to Expression (25). From the above, it is found that the binning condition of $B_m=B_s=1580$ satisfies all of the first high-sensitivity condition, the second high-sensitivity condition, the first high-dynamic-range condition, and the second high-dynamic-range condition.

As described above, by setting the noise composition to an appropriate condition, it is found possible to achieve both high sensitivity and high dynamic range while using the same binning condition. That is, depending on noise conditions, it is found that both high sensitivity and high dynamic range can be achieved, and conversely, both high sensitivity and high dynamic range cannot be achieved.

<Change in Configuration of Multicolor-Detection Optical System>

It was studied to achieve both high sensitivity and high dynamic range by changing the configuration of the multicolor-detection optical system described in <Basic Condition>. The image sensor is a CMOS image sensor with pixel size of 3.63 μm square. Since the saturation-light-amount ratio is k=1, α=1. First, the grating frequency of the transmission-type diffraction grating used in the multicolor-detection optical system is changed from N=600 lines/mm to N=200 lines/mm. According to Expression (72), since the dispersion distance per 1 nm on the image sensor is 10 μm, the size of the image of the light with the wavelength band of 9 nm width to be measured by each of the bins W(1) to W(20) is 0.10 mm×0.072 mm. That is, the number of pixels constituting each bin W(f) is set to $B_m$=25×20=500, i.e., 25 pixels in the wavelength-dispersion direction and 20 pixels in the light-emitting-point-arrangement direction. The number of pixels of hardware binning is set to $B_h$=1, and the number of pixels of software binning is set to $B_s$=500. When the measurement conditions are not changed from those in <Basic Condition>, the readout noise of $N_r$=1.06 counts per single pixel, the dark-current-noise ratio of b=0.21, and the shot-noise ratio of c=10 are also not changed. That is, the first high-sensitivity condition is satisfied when $B_s$≤775, the second high-sensitivity condition is satisfied when $B_s$≤121, the first high-dynamic-range condition is satisfied when $B_s$≥3, and the second high-dynamic-range condition is satisfied when $B_s$≥11. Therefore, the binning condition of $B_h$=1 and $B_s$=500 satisfies the first high-sensitivity condition, the first high-dynamic-range condition, and the second high-dynamic-range condition. As described above, by changing the configuration of the multicolor-detection optical system under the same measurement conditions, both the high-sensitivity condition and the high-dynamic-range condition can be achieved.

Next, it was examined to more favorably achieve both high sensitivity and high dynamic range by further changing the configuration of the multicolor-detection optical system. Specifically, in addition to changing the grating frequency of the transmission-type diffraction grating used in the multicolor-detection optical system from N=600 lines/mm to N=200 lines/mm, the focal length of the second camera lens is changed from $f_2$=50 mm to $f_2$=25 mm. As a result, the wavelength-dispersed image of the light emitted from the light-emitting point becomes a ½ times reduced image. Therefore, according to Expression (72), the dispersion distance per 1 nm on the image sensor is 5 μm, and the image size of the light-emitting point with a size of 50 μm square is 25 μm square when wavelength dispersion is not performed. Therefore, the size of the wavelength-dispersed image of the light with the wavelength band of 9 nm width to be measured by each of the bins W(1) to W(20) is 0.045 mm×0.025 mm. Then, each bin W(f) is set to 12 pixels in the wavelength-dispersion direction, 7 pixels in the light-emitting-point-arrangement direction, and $B_m$=12×7=84. The number of pixels of hardware binning is set to $B_h$=1. The number of pixels of software binning is set to $B_s$=84. When the measurement conditions are not changed from those in <Basic Condition>, the readout noise of $N_r$=1.06 counts per single pixel, the dark-current noise ratio of b=0.21, and the shot-noise ratio of c=10 are also not changed. As a result, all of the first high-sensitivity condition, the second high-sensitivity condition, the first high-dynamic-range condition, and the second high-dynamic-range condition are satisfied. As described above, by changing the configuration of the multicolor-detection optical system under the same measurement conditions, both the high-sensitivity condition and the high-dynamic-range condition can be achieved, and the range in which both the high-sensitivity condition and the high-dynamic-range condition is achieved can be expanded.

Example 2

In the present Example, conditions for achieving both the high-sensitivity condition and the high-dynamic-range condition are systematically clarified by generalizing the examination in Example 1. In Example 1, it is mainly studied to change the number of pixels $B_h$ of hardware binning and the number of pixels $B_s$ of software binning while fixing the number of pixels $B_m$ in the bin W(<Change in configuration of multicolor-detection optical system> in Example 1 is an exception). On the other hand, in the present Example, it is considered to change not only the number of pixels $B_h$ of hardware binning and the number of pixels $B_s$ of software binning but also the number of pixels $B_m$. Note that the change of $B_m$ is performed by controlling the configuration of the multicolor-detection optical system to change the pixel region of the image sensor on which the fluorescence image with the specific wavelength band corresponding to each bin W is projected.

In Example 1, not only the composition of the noise but also the amount of the total noise is changed by changing the measurement conditions. On the contrary, in the present Example, in order to avoid the influence of the change in the amount of the total noise, only the composition of the noise is changed by changing the measurement conditions while keeping the amount of the total noise constant. In the study of the present Example, Expressions (11), (13), (14), and (15) are used. Since the saturation-light-amount ratio of the image sensor is k=1, α=1. The total noise in the case of $B_h$=$B_s$=1 in Expression (11) is constant at N=1 count. The saturation-light amount per single pixel of the image sensor is M=10,000 counts. Hereinafter, the unit "count (s)" for noise and the amount of light is omitted.

Figure 11A:
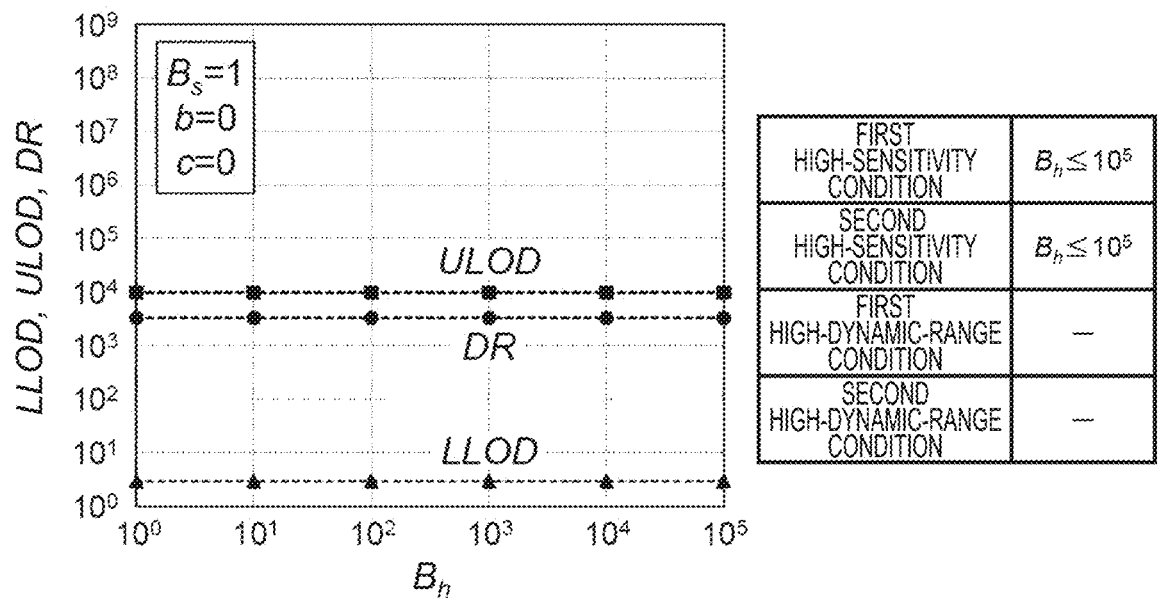
FIG. 11A illustrates a graph showing LLOD (lower limit of detection), ULOD (upper limit of detection), and DR (dynamic range) against $B_h$ (pixel number of hardware binning), and binning conditions for high sensitivity and high dynamic range, under conditions of $B_s$ (pixel number of software binning)=1, b (dark-current-noise ratio)=0, and c (shot-noise ratio)=0.
Figure 11B:
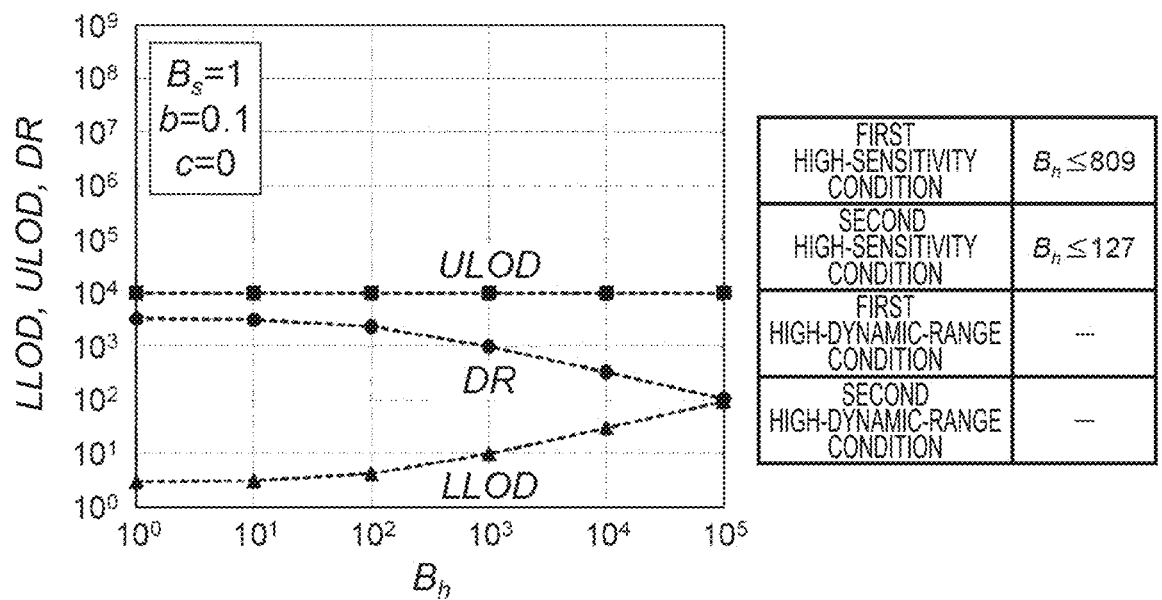
FIG. 11B illustrates a graph showing LLOD (lower limit of detection), ULOD (upper limit of detection), and DR (dynamic range) against $B_h$ (pixel number of hardware binning), and binning conditions for high sensitivity and high dynamic range, under conditions of $B_s$ (pixel number of software binning)=1, b (dark-current-noise ratio)=0.1, and c (shot-noise ratio)=0.
Figure 11C:
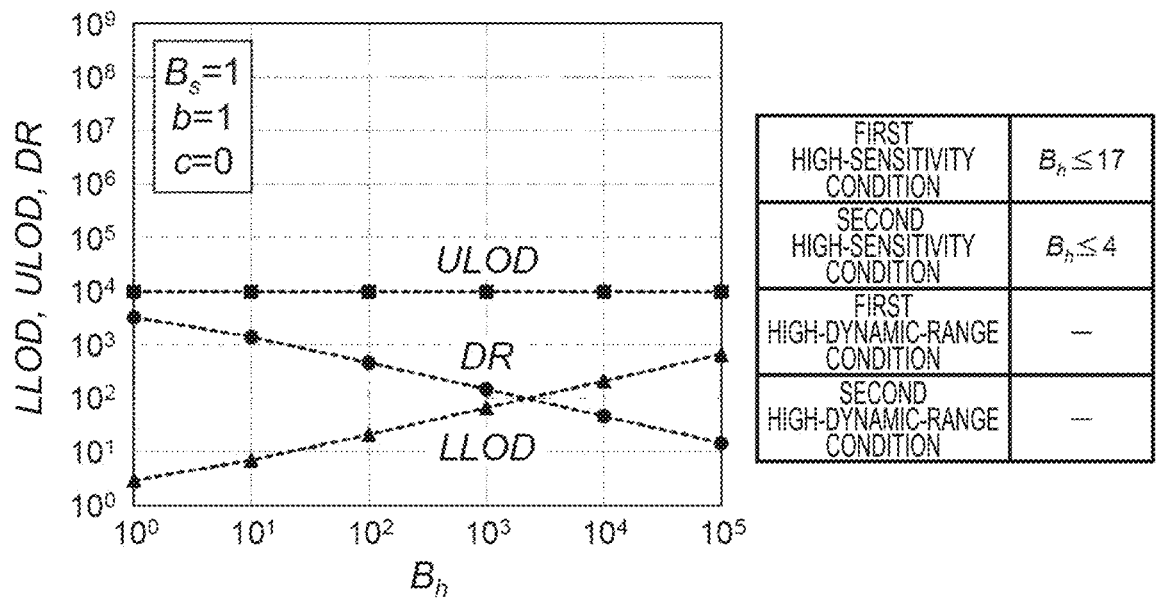
FIG. 11C illustrates a graph showing LLOD (lower limit of detection), ULOD (upper limit of detection), and DR (dynamic range) against $B_h$ (pixel number of hardware binning), and binning conditions for high sensitivity and high dynamic range, under conditions of $B_s$ (pixel number of software binning)=1, b (dark-current-noise ratio)=1, and c (shot-noise ratio)=0.

FIGS. 11A to 11C illustrate the lower limit of detection LLOD, the upper limit of detection ULOD, and dynamic range DR against the number of pixels $B_h$ of hardware binning under the condition of $B_s$=1 as dotted lines. Here, LLOD, ULOD, and DR are indicated by triangle plots, square plots, and circle plots, respectively. The noise compositions are set to b=0 and c=0 in FIG. 11A, b=0.1 and c=0 in FIG. 11B, and b=1 and c=0 in FIG. 11C. On the right side of each graph, a table summarizing binning conditions that satisfy the first high-sensitivity condition, the second high-sensitivity condition, the first high-dynamic-range condition, and the second high-dynamic-range condition. The first high-sensitivity condition is obtained by Expression (18), and the second high-sensitivity condition is obtained by Expression (21). When there is no solution, "-" is written in the column for the binning condition.

First, in the case of b=0 and c=0 in FIG. 11A, LLOD, ULOD, and DR (=ULOD/LLOD) are all constant regardless of the number of pixels $B_h$ of hardware binning and have the same values as when $B_h$=1. That is, LLOD=3, ULOD=10, 000, and DR=3333. Since b=0 and c=0, the total noise consists only of the readout noise and does not depend on the number of pixels $B_h$ of hardware binning. Therefore, LLOD does not change even when the number of pixels $B_h$ of hardware binning increases. As a result, the first high-sensitivity condition and the second high-sensitivity condition are satisfied for any number of pixels $B_h$ of hardware binning. In FIG. 11A, the binning condition satisfying the both high-sensitivity conditions is expressed as $B_h \leq 10^5$ according to the horizontal axis scale of the graph. Even when hardware binning is performed with increasing the number of pixels $B_h$ of hardware binning, the saturation-light amount remains M=10,000. Therefore, ULOD also does not change. Therefore, there is no solution for the binning condition that satisfies the high-dynamic-range condition.

Next, in the case of b=0.1 and c=0 in FIG. 11B, since the dark-current noise increases as the number of pixels $B_h$ of hardware binning increases, the total noise increases and LLOD also increases. LLOD, ULOD, and DR when $B_h$=1 are the same as those in FIG. 11A. As a result, as shown in the table, the first high-sensitivity condition is satisfied when $B_h \leq 809$ by Expression (18), and the second high-sensitivity condition is satisfied when $B_h \leq 127$ by Expression (21).

In the case of b=1 and c=0 in FIG. 11C, the increase rate of LLOD against $B_h$ is substantially higher than in FIG. 11B. LLOD increases against $B_h$ substantially along a straight line with a slope of ½. This can be explained as follows. As is clear from Expression (13), when the dark-current noise-ratio b becomes sufficiently large at c=0, LLOD increases in proportion to the root of $B_h$ (=$B_m$). Therefore, since FIG. 11 is a double logarithmic graph, $B_h$ and LLOD have a linear relationship with a slope of ½. As a result, as shown in the table, the first high-sensitivity condition is satisfied when $B_h \leq 17$ by Expression (18), and the second high-sensitivity condition is satisfied when $B_h \leq 4$ by Expression (21). On the other hand, according to Expression (14), since the saturation-light amount remains M=10,000 regardless of the dark-current-noise ratio b, the shot-noise ratio c, and the number of pixels $B_h$ of hardware binning, ULOD in FIGS. 11B and 11C does not change from that in FIG. 11A.

As described above, when the dark-current-noise ratio b increases, DR decreases against $B_h$. As illustrated in FIG. 11C showing the double logarithmic graph, when the dark-current-noise ratio b become sufficiently large, $B_h$ and DR have a linear relationship with a slope of −½. Therefore, there is no solution for the binning condition that satisfies the high dynamic-range condition. From the above, it is found that both the high-sensitivity condition and the high-dynamic-range condition cannot be achieved under the conditions in FIG. 11.

Figure 12A:
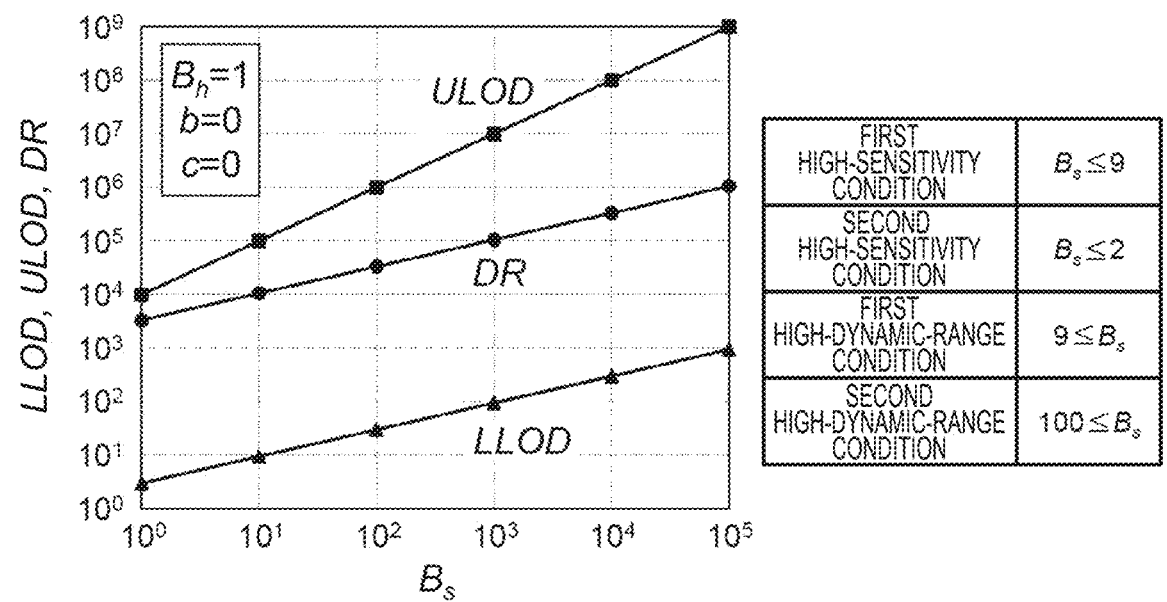
FIG. 12A illustrates a graph showing LLOD (lower limit of detection), ULOD (upper limit of detection), and DR (dynamic range) against $B_s$ (pixel number of software binning), and binning conditions for high sensitivity and high dynamic range, under conditions of $B_h$ (pixel number of hardware binning)=1, b (dark-current-noise ratio)=0, and c (shot-noise ratio)=0.
Figure 12B:
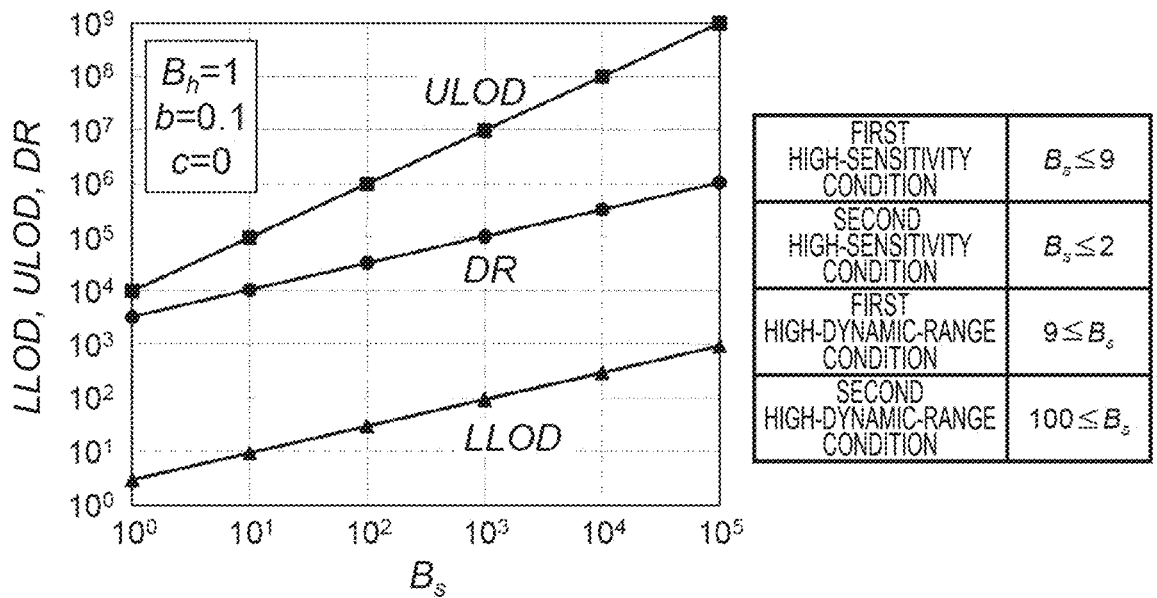
FIG. 12B illustrates a graph showing LLOD (lower limit of detection), ULOD (upper limit of detection), and DR (dynamic range) against $B_s$ (pixel number of software binning), and binning conditions for high sensitivity and high dynamic range, under conditions of $B_h$ (pixel number of hardware binning)=1, b (dark-current-noise ratio)=0.1, and c (shot-noise ratio)=0.
Figure 12C:
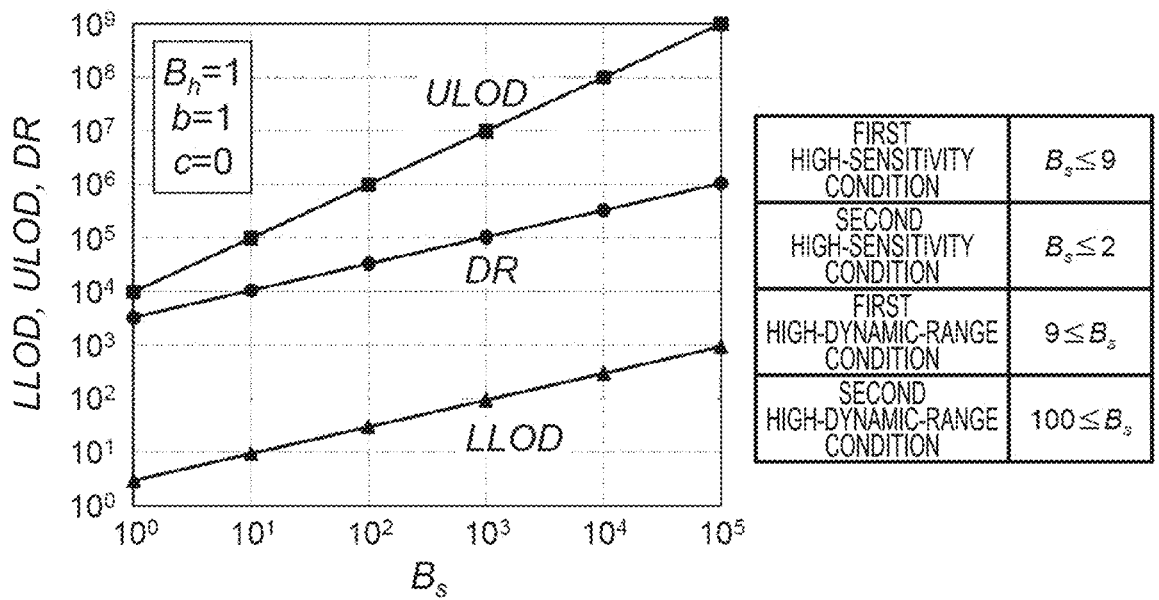
FIG. 12C illustrates a graph showing LLOD (lower limit of detection), ULOD (upper limit of detection), and DR (dynamic range) against $B_s$ (pixel number of software binning), and binning conditions for high sensitivity and high dynamic range, under conditions of $B_h$ (pixel number of hardware binning)=1, b (dark-current-noise ratio)=1, and c (shot-noise ratio)=0.

FIGS. 12A to 12C illustrate LLOD, ULOD, and DR against $B_s$ under the condition of $B_h$=1 as solid lines. Here, LLOD, ULOD, and DR are indicated by triangle plots, square plots, and circle plots, respectively. Similarly to FIGS. 11A to 11C, the noise compositions are set to b=0 and c=0 in FIG. 12A, b=0.1 and c=0 in FIG. 12B, and b=1 and c=0 in FIG. 12C. FIGS. 12A, 12B, and 12C show the same results. When $B_s$=1, as in the case of $B_h$=1 in FIGS. 11A to 11C, LLOD=3, ULOD=10,000, and DR=3333. Meanwhile, according to Expression (13), when c=0, LLOD increases in proportion to the root of $B_s$ regardless of b. Therefore, as illustrated in FIGS. 12A to 12C showing the double logarithmic graphs, the number of pixels $B_s$ of software binning and LLOD have a linear relationship with a slope of ½. As a result, as shown in the table, it is found that the first high-sensitivity condition is satisfied when $B_s \leq 9$ by Expression (17), and the second high-sensitivity condition is satisfied when $B_s \leq 2$ by Expression (20). On the other hand, according to Expression (14), ULOD increases in proportion to $B_s$ regardless of the dark-current-noise ratio b and the shot-noise ratio c. Therefore, as illustrated in FIGS. 12A to 12C showing the double logarithmic graphs, $B_s$ and ULOD have a linear relationship with a slope of 1.

As described above, DR increases in proportion to the root of $B_s$ regardless of the dark-current-noise ratio b and the shot-noise ratio c. As illustrated in FIGS. 12A to 12C showing the double logarithmic graphs, $B_s$ and DR have a linear relationship with a slope of ½. As a result, from Expressions (23) and (25), as shown in the table, it is found that the first high-dynamic-range condition is satisfied when $9 \leq B_s$, and the second high-dynamic-range condition is satisfied when $100 \leq B_s$. From the above, as represented by Expression (26), it become clear that by setting $B_s$=9, both the first high-sensitivity condition and the first high-dynamic-range condition can be achieved. However, as represented by Expression (27), it is found that both the second high-sensitivity condition and the second high-dynamic-range condition cannot be satisfied under the conditions of FIGS. 12A to 12C.

Figure 13A:
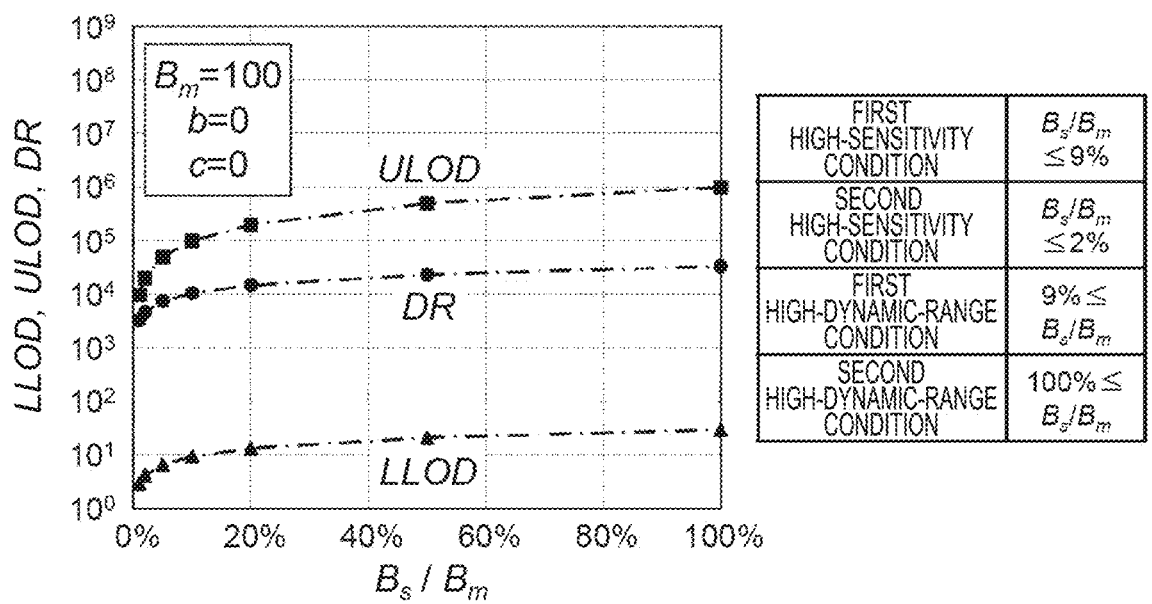
FIG. 13A illustrates a graph showing LLOD (lower limit of detection), ULOD (upper limit of detection), and DR (dynamic range) against $B_s/B_m$ (software-binning ratio), and binning conditions for high sensitivity and high dynamic range, under conditions of $B_m$ (pixel number of bin)=100, b (dark-current-noise ratio)=0, and c (shot-noise ratio)=0.
Figure 13B:
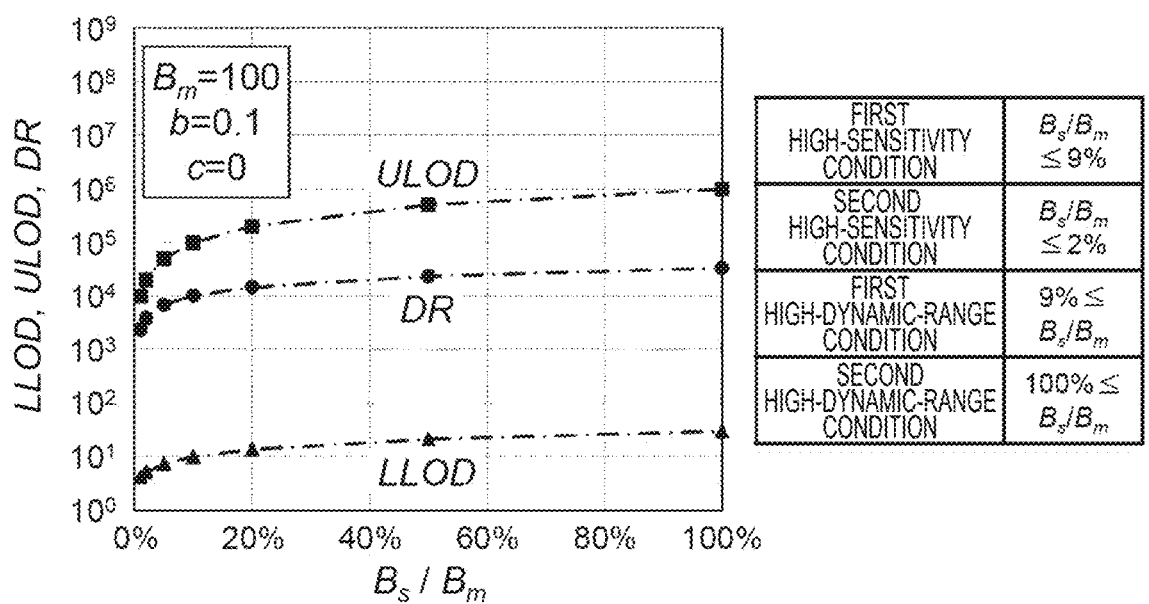
FIG. 13B illustrates a graph showing LLOD (lower limit of detection), ULOD (upper limit of detection), and DR (dynamic range) against $B_s/B_m$ (software-binning ratio), and binning conditions for high sensitivity and high dynamic range, under conditions of $B_m$ (pixel number of bin)=100, b (dark-current-noise ratio)=0.1, and c (shot-noise ratio)=0.
Figure 13C:
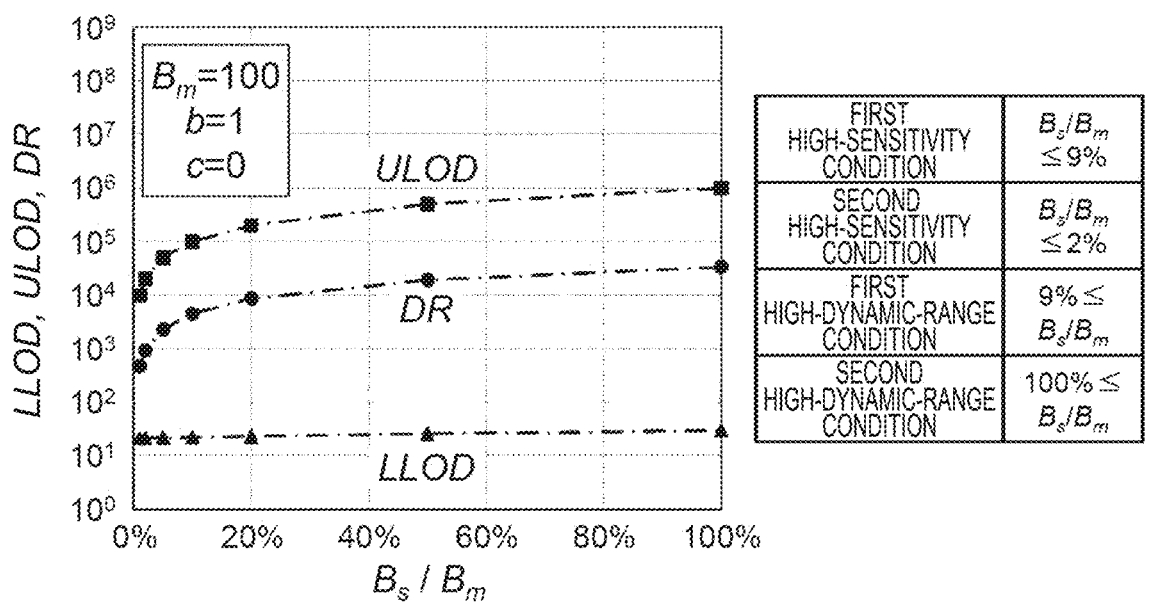
FIG. 13C illustrates a graph showing LLOD (lower limit of detection), ULOD (upper limit of detection), and DR (dynamic range) against $B_s/B_m$ (software-binning ratio), and binning conditions for high sensitivity and high dynamic range, under conditions of $B_m$ (pixel number of bin)=100, b (dark-current-noise ratio)=1, and c (shot-noise ratio)=0.

In FIGS. 11A to 11C, $B_h$ (=$B_m$) is changed under the condition of $B_s$=1, whereas in FIGS. 12A to 12C, $B_s$ (=$B_m$) is changed under the condition of $B_h$=1. On the other hand, in FIGS. 13A to 13C, both $B_h$ and $B_s$ are changed while fixing the pixel region for each bin, specifically, under the condition of $B_m$=100 and $B_m$=$B_h \times B_s$. $B_h$ and $B_s$ are both positive integers. Similarly to FIGS. 11A to 11C and FIGS. 12A to 12C, the noise compositions are set to b=0 and c=0 in FIG. 13A, b=0.1 and c=0 in FIG. 13B, and b=1 and c=0 in FIG. 13C. In FIGS. 13A to 13C, LLOD, ULOD, and DR are indicated by triangle plots, square plots, and circle plots, respectively. FIGS. 13A to 13C illustrate LLOD, ULOD, and DR against the software-binning ratio $B_s/B_m$ as one-dot chain lines. Here, LLOD is obtained by Expression (13), ULOD is obtained by Expression (14), DR is obtained from these ratios. On the horizontal axis, $B_s/B_m$ of 1%, 2%, 5%, 10%, 20%, 50%, and 100% represent ($B_h$, $B_s$) of (100, 1), (50, 2), (20, 5), (10, 10), (5, 20), (2, 50), and (1,100), respectively. The plots in FIGS. 13A to 13C are made under these binning conditions. Therefore, the plots at $B_s/B_m$=1% and 100% in FIG. 13 correspond to the plots at $B_h$=100 in FIG. 11 and the plots at $B_s$=100 in FIG. 12, respectively. Then, the plots from $B_s/B_m$=2% to 50% in FIG. 13 indicate intermediate results between the two above. The binning conditions that satisfy the high sensitivity-condition and the high-dynamic-range condition are the same as those in FIG. 12, but are shown by the range of $B_s/B_m$. By setting $B_s/B_m$=9%, both the first high-sensitivity condition and the first high-dynamic-range condition can be achieved. However, it is found that both the second high-sensitivity condition and the second high-dynamic-range condition cannot be achieved under the conditions in FIG. 13. Note that the examination is performed under the condition of $B_m$=100=$10^2$ as an example in FIG. 13. It goes without saying that the same examination can be performed for any $B_m$ Of $B_m$=$10^0$ to $10^5$.

Figure 14A:
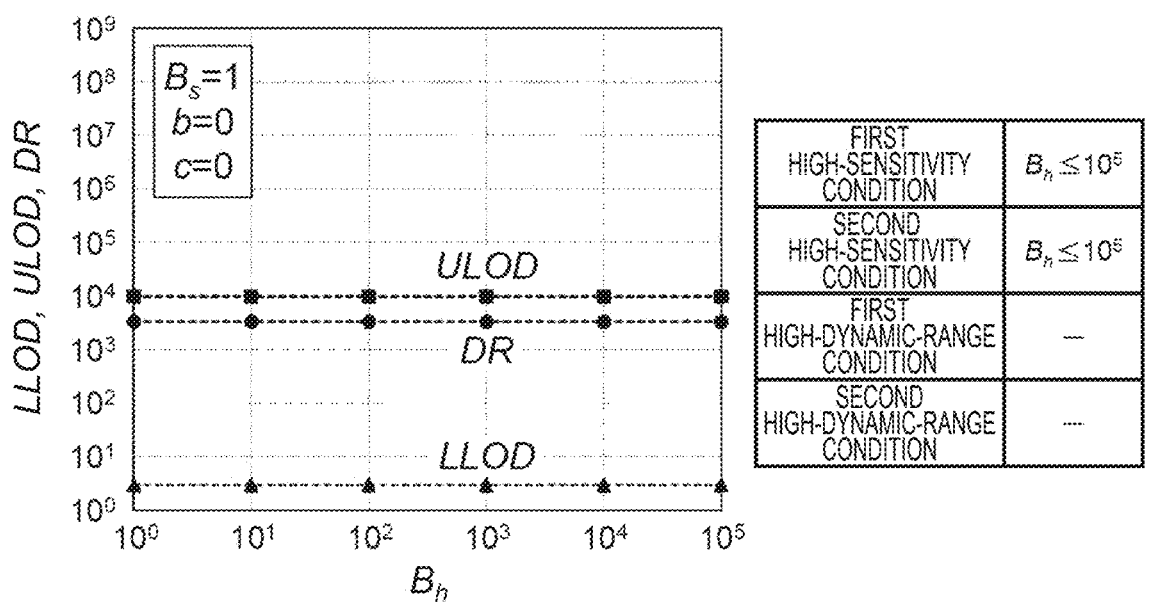
FIG. 14A illustrates a graph showing LLOD (lower limit of detection), ULOD (upper limit of detection), and DR (dynamic range) against $B_h$ (pixel number of hardware binning), and binning conditions for high sensitivity and high dynamic range, under other conditions of $B_s$ (pixel number of software binning)=1, b (dark-current-noise ratio)=0, and c (shot-noise ratio)=0.
Figure 14B:
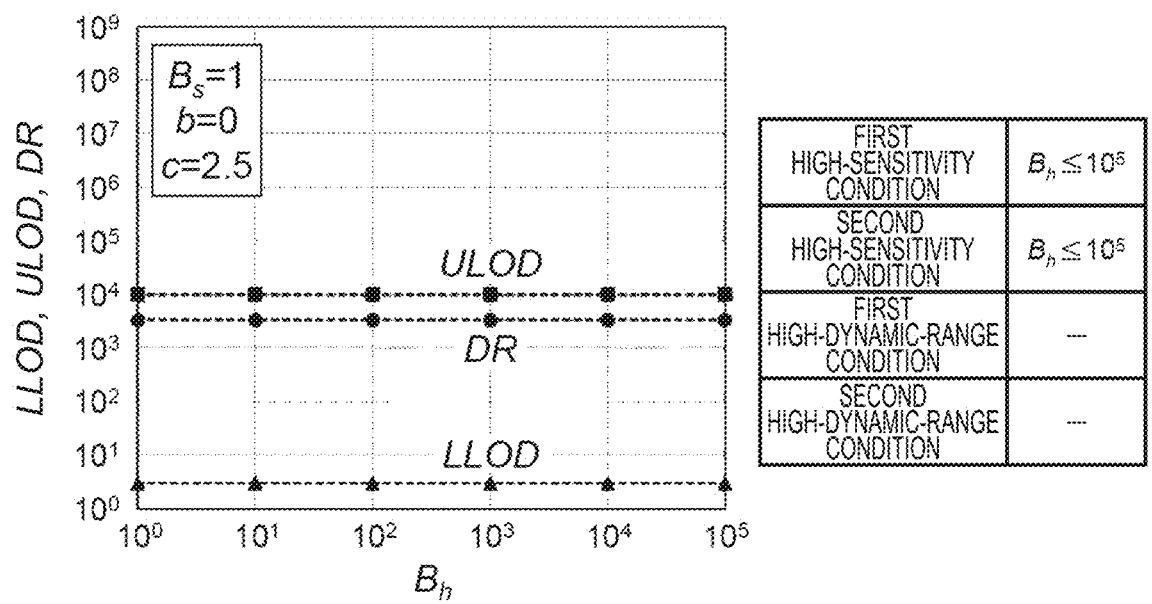
FIG. 14B illustrates a graph showing LLOD (lower limit of detection), ULOD (upper limit of detection), and DR (dynamic range) against $B_h$ (pixel number of hardware binning), and binning conditions for high sensitivity and high dynamic range, under other conditions of $B_s$ (pixel number of software binning)=1, b (dark-current-noise ratio)=0, and c (shot-noise ratio)=2.5.
Figure 14C:
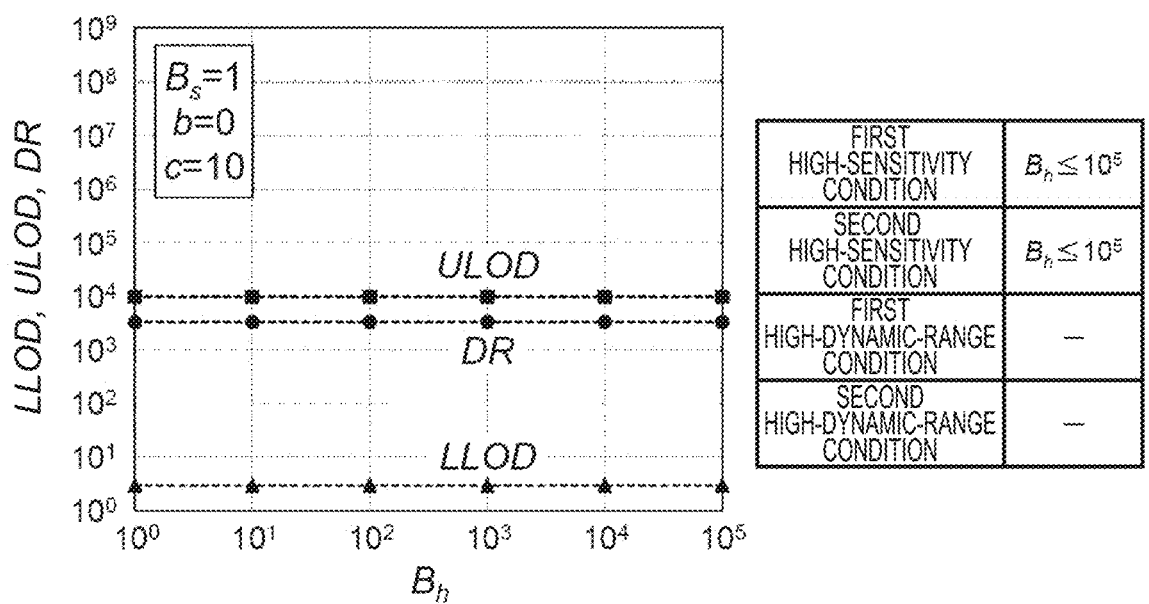
FIG. 14C illustrates a graph showing LLOD (lower limit of detection), ULOD (upper limit of detection), and DR (dynamic range) against $B_h$ (pixel number of hardware binning), and binning conditions for high sensitivity and high dynamic range, under other conditions of $B_s$ (pixel number of software binning)=1, b (dark-current-noise ratio)=0, and c (shot-noise ratio)=10.

In FIGS. 11 to 13, cases where the dark-current-noise ratio b is changed under the condition of c=0 are examined. On the contrary, in FIGS. 14 to 16 described below, cases where the shot-noise ratio c is changed under the condition of b=0 are examined. Similarly to FIGS. 11A to 11C, FIGS. 14A to 14C illustrate LLOD, ULOD, and DR against $B_h$ under the condition of $B_s$=1 as dotted lines. The noise compositions are set to b=0 and c=0 in FIG. 14A, b=0 and c=2.5 in FIG, and b=0 and c=10 in FIG. 14C. FIGS. 14A, 14B, and 14C show the same results, and LLOD, ULOD, and DR are all constant regardless of $B_h$. That is, LLOD=3, ULOD=10,000, and DR=3333, which are the same as those at $B_h=1$. These results are the same as those in FIG. 11A. This is because, as represented by Expression (13), under the condition of b=0, LLOD does not depend on $B_h$, and, as represented by Expression (14), ULOD does not depend on $B_h$ regardless of the conditions of the dark-current-noise ratio b and the shot-noise ratio c. Therefore, the first high-sensitivity condition and the second high-sensitivity condition are satisfied for any $B_h$. The binning conditions satisfying both conditions are expressed as $B_h \leq 10^5$ as in FIG. 11A. There is no solution for the binning condition satisfying the high-dynamic-range condition. From the above, it is found that both the high-sensitivity condition and the high-dynamic-range condition cannot be achieved under the conditions in FIGS. 14A to 14C.

Figure 15A:
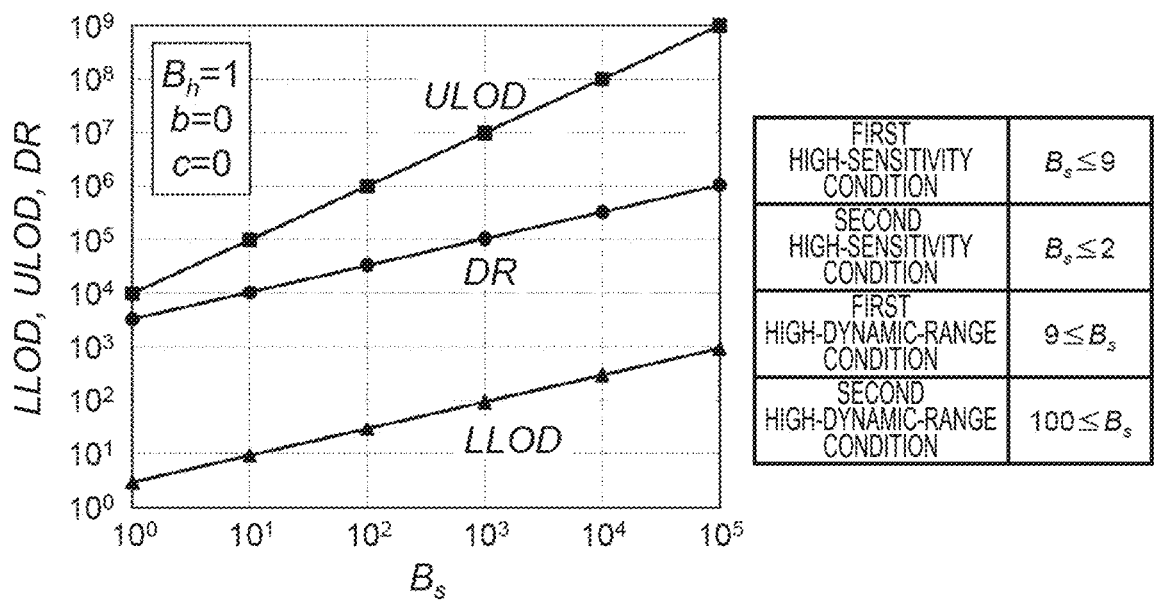
FIG. 15A illustrates a graph showing LLOD (lower limit of detection), ULOD (upper limit of detection), and DR (dynamic range) against $B_s$ (pixel number of software binning), and binning conditions for high sensitivity and high dynamic range, under other conditions of $B_h$ (pixel number of hardware binning)=1, b (dark-current-noise ratio)=0, and c (shot-noise ratio)=0.
Figure 15B:
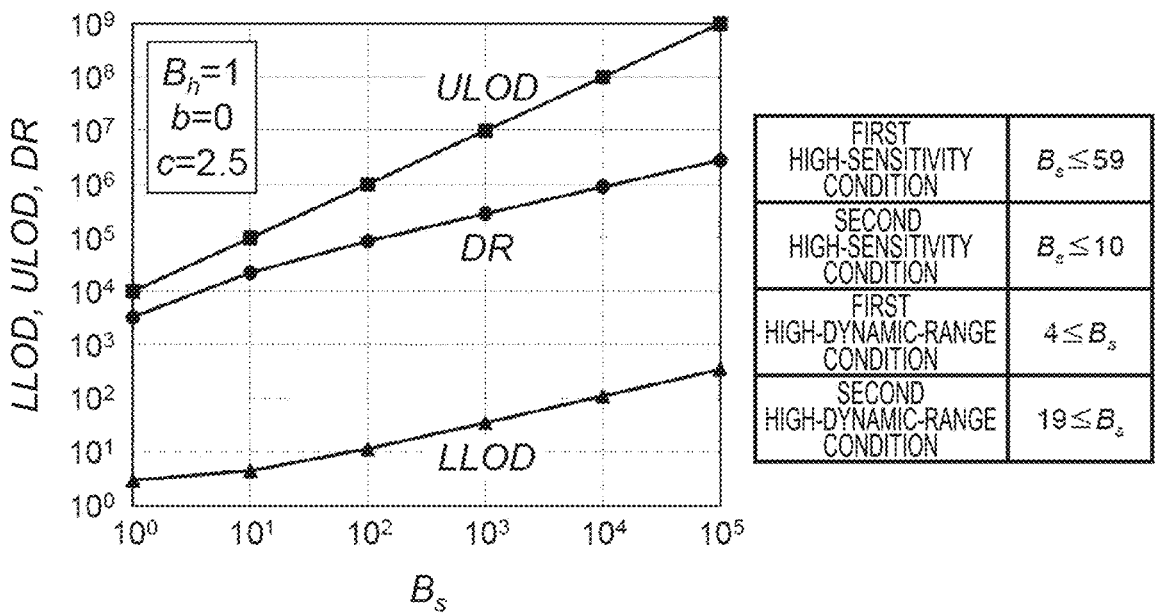
FIG. 15B illustrates a graph showing LLOD (lower limit of detection), ULOD (upper limit of detection), and DR (dynamic range) against $B_s$ (pixel number of software binning), and binning conditions for high sensitivity and high dynamic range, under other conditions of $B_h$ (pixel number of hardware binning)=1, b (dark-current-noise ratio)=0, and c (shot-noise ratio)=2.5.
Figure 15C:
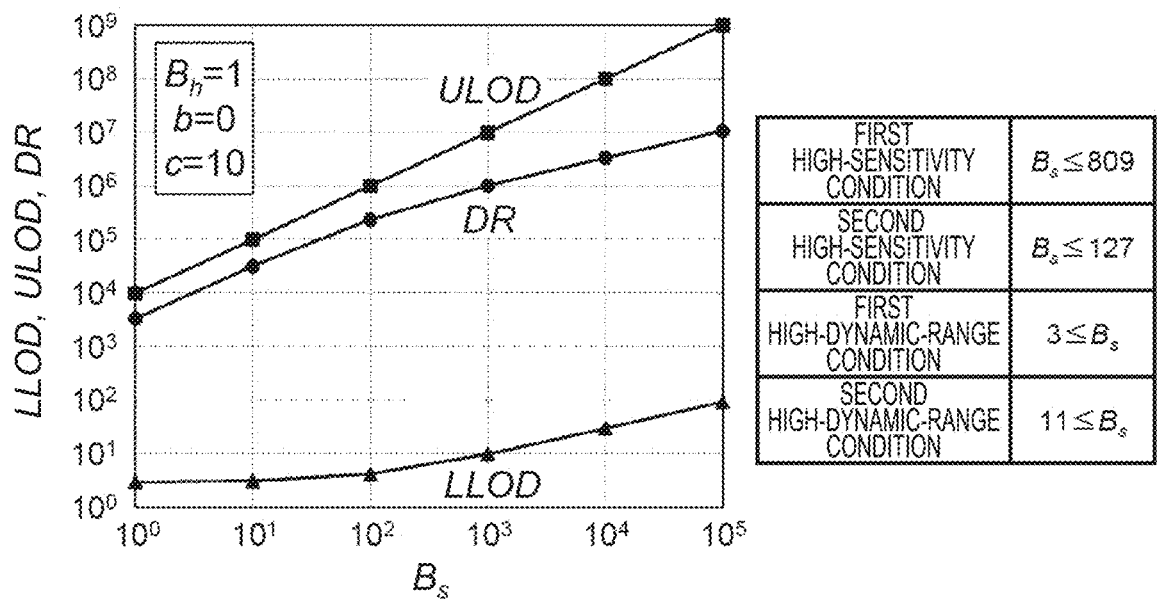
FIG. 15C illustrates a graph showing LLOD (lower limit of detection), ULOD (upper limit of detection), and DR (dynamic range) against $B_s$ (pixel number of software binning), and binning conditions for high sensitivity and high dynamic range, under other conditions of $B_h$ (pixel number of hardware binning)=1, b (dark-current-noise ratio)=0, and c (shot-noise ratio)=10.

FIGS. 15A to 15C illustrate LLOD, ULOD, and DR against $B_s$ under the condition of $B_h=1$. Similarly to FIGS. 14A to 14C, the noise compositions are set to b=0 and c=0 in FIG. 15A, b=0 and c=2.5 in FIG. 15B, and b=0 and c=10 in FIG. 15C. The conditions and results in FIG. 15A are the same as those in FIG. 12A. That is, the first high-sensitivity condition is satisfied when $B_s \leq 9$ according to Expression (17), and the second high-sensitivity condition is satisfied when $B_s \leq 2$ according to Expression (20). The first high-dynamic-range condition is satisfied when $9 \leq B_s$ by Expression (23), and the second high-dynamic-range condition is satisfied when $100 \leq B_s$ by Expression (25). Therefore, it is found that both the first high-sensitivity condition and the first high-dynamic-range condition can be achieved under the condition of $B_s=9$. But, both the second high-sensitivity condition and the second high-dynamic-range condition cannot be achieved.

In comparison with LLOD in FIG. 15A, LLOD is lower in FIG. 15B, and LLOD is further lower in FIG. 15C. This is because, as represented by Expression (13), as the shot-noise ratio c increases, since the contribution ratio of the readout noise and the dark-current noise to the total noise decreases, the contribution of $B_s$ to the total noise decreases. As is clear from the comparison of FIGS. 15A, 15B, and 15C, since ULOD does not change depending on the shot-noise ratio c, DR is improved by decreasing LLOD.

In FIG. 15B, the first high-sensitivity condition is satisfied when $B_s \leq 59$ according to Expression (17), and the second high-sensitivity condition is satisfied when $B_s \leq 10$ according to Expression (20). Meanwhile, the first high-dynamic-range condition is satisfied when $4 \leq B_s$ by Expression (23), and the second high-dynamic-range condition is satisfied when $19 \leq B_s$ by Expression (25). Therefore, by setting $4 \leq B_s \leq 59$, it is possible to achieve both the first high-sensitivity condition and the first high-dynamic-range condition. The range of the binning condition satisfying both the high-sensitivity condition and the high-dynamic-range condition is enlarged as compared with that in FIG. 15A. Therefore, it is found that the conditions in FIG. 15B are favorable for achieving both the high-sensitivity condition and the high dynamic range condition. However, it is found that both the second high-sensitivity condition and the second high-dynamic-range condition cannot be achieved. However, by setting $4 \leq B_s \leq 10$, it is possible to achieve both the second high-sensitivity condition and the first high-dynamic-range condition. Alternatively, by setting $19 \leq B_s \leq 59$, both the first high-sensitivity condition and the second high-dynamic-range condition can be achieved.

In FIG. 15C, the first high-sensitivity condition is satisfied when $B_s \leq 809$ according to Expression (17), and the second high-sensitivity condition is satisfied when $B_s \leq 127$ according to Expression (20). Meanwhile, the first high-dynamic-range condition is satisfied when $3 \leq B_s$ by Expression (23), and the second high-dynamic-range condition is satisfied when $11 \leq B_s$ by Expression (25). Therefore, by setting $3 \leq B_s \leq 809$, it is possible to achieve both the first high-sensitivity condition and the first high-dynamic-range condition. Furthermore, by setting $11 \leq B_s \leq 127$, it is possible to achieve both the second high-sensitivity condition and the second high-dynamic-range condition. Incidentally, by setting $3 \leq B_s \leq 127$, it is possible to achieve both the second high-sensitivity condition and the first high-dynamic-range condition. Alternatively, by setting $11 \leq B_s \leq 809$, both the first high-sensitivity condition and the second high-dynamic-range condition can be achieved. Therefore, it is found that the conditions in FIG. 15B is more favorable than those in FIG. 15A, and those in FIG. 15C is even more favorable than those in FIG. 15B, that is, the conditions with the larger shot-noise ratio c is more favorable, in terms of achieving both high sensitivity and high dynamic range.

Figure 16A:
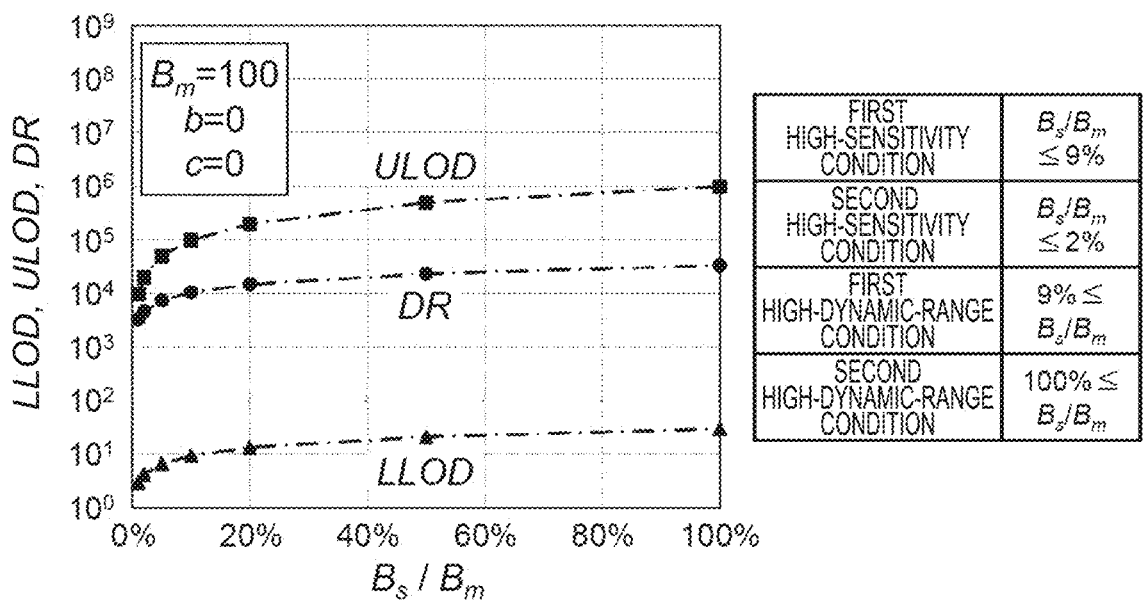
FIG. 16A illustrates a graph showing LLOD (lower limit of detection), ULOD (upper limit of detection), and DR (dynamic range) against $B_s/B_m$ (software-binning ratio), and binning conditions for high sensitivity and high dynamic range, under other conditions of $B_m$ (pixel number of bin)=100, b (dark-current-noise ratio)=0, and c (shot-noise ratio)=0.
Figure 16B:
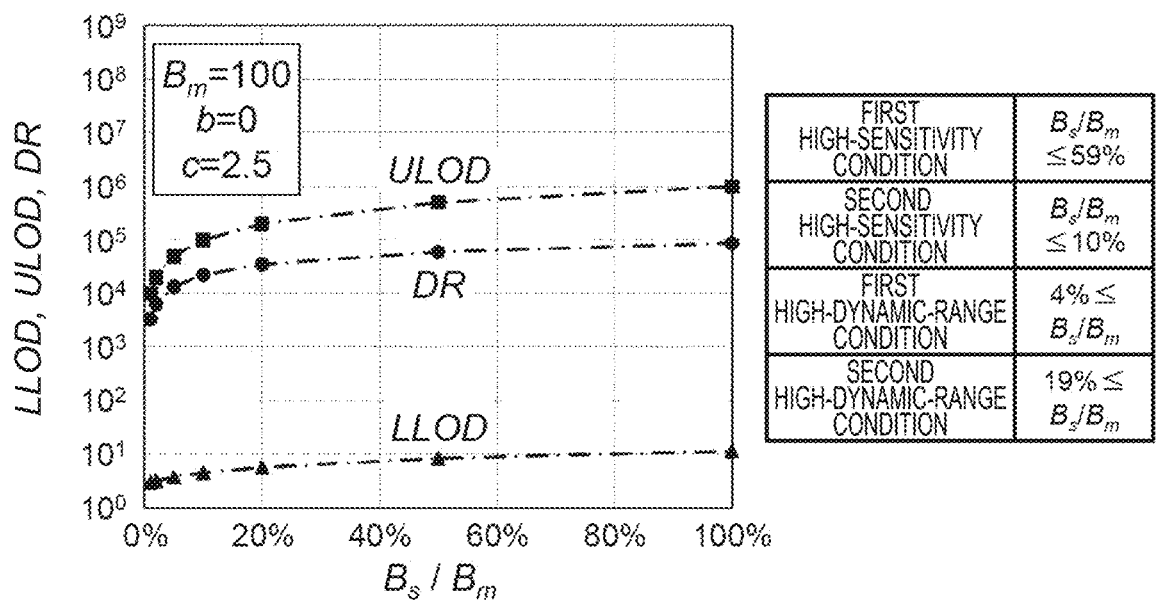
FIG. 16B illustrates a graph showing LLOD (lower limit of detection), ULOD (upper limit of detection), and DR (dynamic range) against $B_s/B_m$ (software-binning ratio), and binning conditions for high sensitivity and high dynamic range, under other conditions of $B_m$ (pixel number of bin)=100, b (dark-current-noise ratio)=0, and c (shot-noise ratio)=2.5.
Figure 16C:
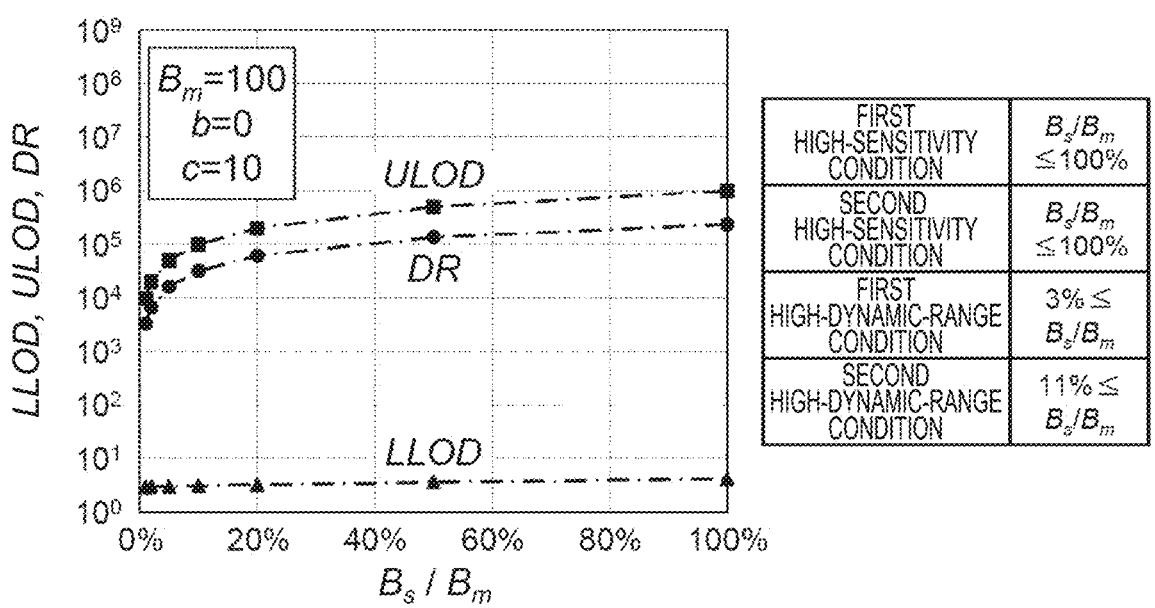
FIG. 16C illustrates a graph showing LLOD (lower limit of detection), ULOD (upper limit of detection), and DR (dynamic range) against $B_s/B_m$ (software-binning ratio), and binning conditions for high sensitivity and high dynamic range, under other conditions of $B_m$ (pixel number of bin)=100, b (dark-current-noise ratio)=0, and c (shot-noise ratio)=10.

In FIGS. 14A to 14C, $B_h$ ($=B_m$) is changed under the condition of $B_s=1$. In FIGS. 15A to 15C, $B_s$ ($=B_m$) is changed under the condition of $B_h=1$. On the other hand, in FIGS. 16A to 16C, similarly to FIGS. 13A to 13C, both $B_h$ and $B_s$ are changed while the pixel region of each bin is fixed, specifically, $B_m = B_h \times B_s$ is kept constant at $B_m=100$, where $B_h$ and $B_s$ are both positive integers. Similarly to FIGS. 14 and 15, the noise compositions are set to b=0 and c=0 in FIG. 16A, b=0 and c=2.5 in FIG. 16B, b=0 and c=10 in FIG. 16C. LLOD, ULOD, and DR are indicated by triangle plots, square plots, and circle plots, respectively. FIGS. 16A to 16C illustrate LLOD, ULOD, and DR against $B_s/B_m$ as one-dot chain lines. Here, LLOD is obtained by Expression (13), ULOD is obtained by Expression (14), and DR is obtained from these ratios. Similarly to FIGS. 13A to 13C, on the horizontal axis, $B_s/B_m$ of 1%, 2%, 5%, 10%, 20%, 50%, and 100% represent ($B_h$, $B_s$) of (100, 1), (50, 2), (20, 5), (10, 10), (5, 20), (2, 50), and (1,100), respectively. The plots in FIGS. 16A to 16C are made under these binning conditions. Therefore, the plots at $B_s/B_m=1\%$ and 100% in FIG. 16 correspond to the plots at $B_h=100$ in FIG. 14 and the plots at $B_s=100$ in FIG. 15A, respectively. Then, the plots from $B_s/B_m=2\%$ to 50% in FIG. 16 indicate intermediate results between the two above. The binning conditions that satisfy the high-sensitivity condition and the high-dynamic-range condition in FIGS. 16A, 16B, and 16C are the same as those in FIGS. 15A, 15B, and 15C, respectively. In FIG. 15C, the first high-sensitivity condition is satisfied when $B_s \leq 809$, and the second high-sensitivity condition is satisfied when $B_s \leq 127$. However, since $B_s \leq 100$ in FIG. 16, in FIG. 16C, the binning conditions that satisfy the first high-sensitivity condition and the second high-sensitivity condition are expressed as $B_s/B_m \leq 100\%$. Note that the examination is performed under the condition of $B_m=100=10^2$ as an example in FIG. 16. It goes without saying that the same examination can be performed for any $B_m$ of $B_m=10^0$ to $10^5$.

Figure 17A:
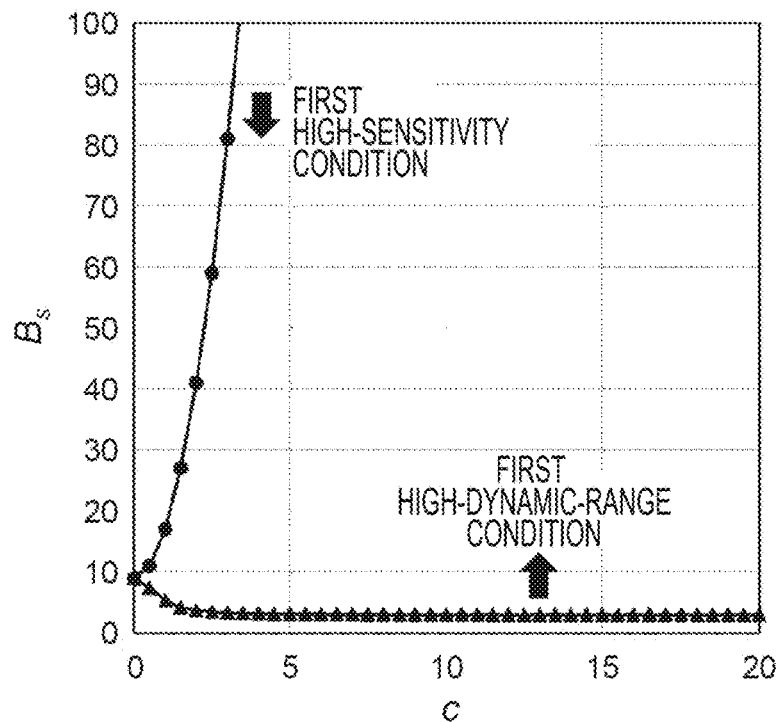
FIG. 17A is a diagram illustrating a relationship between c (shot-noise ratio) and $B_s$ (pixel number of software binning) satisfying first high-sensitivity condition and first high-dynamic-range condition.
Figure 17B:
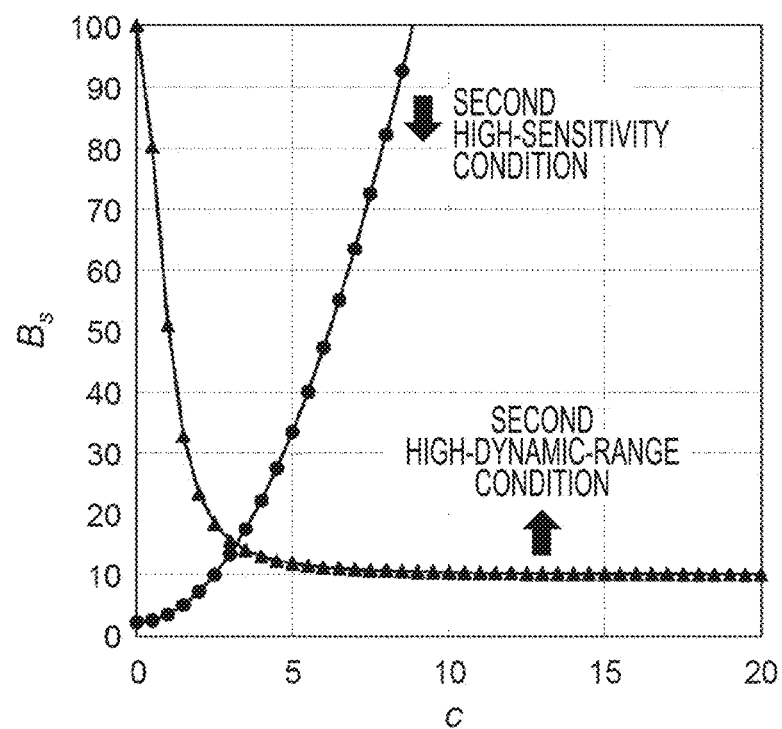
FIG. 17B is a diagram illustrating a relationship between c (shot-noise ratio) and $B_s$ (pixel number of software binning) satisfying second high-sensitivity condition and second high-dynamic-range condition.

From the above examination, it is found that the shot-noise ratio c is an important factor in order to achieve both the high-sensitivity condition and the high-dynamic-range condition. In FIGS. 14 to 16, only the cases of c=0, 2.5, and 10 are examined. In FIGS. 17A and 17B, the influence of the shot-noise ratio c on satisfying (or not satisfying) both the high-sensitivity condition and the high-dynamic-range condition is examined in more detail. FIG. 17A illustrates regions that respectively satisfy the first high-sensitivity condition and the first high-dynamic-range condition in a graph where the horizontal axis is the shot-noise ratio c and the vertical axis is $B_s$. FIG. 17B illustrates regions that respectively satisfy the second high-sensitivity condition and the second high-dynamic-range condition in a similar graph. In each of the graphs, the region below the curve with the circle plots satisfies the high-sensitivity condition, and the region above the curve with the triangle plots satisfies the high-dynamic-range condition. Therefore, in each of the graphs, the region where these two regions overlap satisfies both the high-sensitivity condition and the high-dynamic-range condition. As can be seen from FIG. 17A, at least when c≥0 and $B_s=9$, both the first high-sensitivity condition and the first high-dynamic-range condition are achieved. This corresponds to the results in FIGS. 12 and 15A. However, if the condition of $B_s=9$ is the only solution that satisfies both of them, the range of solutions is too narrow and impractical. In general, the wider the range of solution, the easier it is to satisfy both of them and the easier it is to obtain the effect.

Therefore, condition A in which the range of $B_s$ that is the solution is 30 pixels or more and condition B in which the range of $B_s$ that is the solution is 100 pixels or more are extracted from FIG. 17A. From FIG. 17A, it is found that the condition A is c≥1.75, and at least $4 \leq B_s \leq 34$. It is also found that the condition B is c≥3.43, and at least $3 \leq B_s \leq 103$. On the other hand, as can be seen from FIG. 17B, at least when c≥3.15 and $B_s=15$, both the second high-sensitivity condition and the second high-dynamic-range condition are achieved. Conversely, it is found that there is no solution when c<3.15. Similarly, the condition A and the condition B are also extracted from FIG. 17B. As can be seen from FIG. 17B, the condition A is c≥5.61, and at least $12 \leq B_s \leq 42$ and the condition B is c≥9.31, and at least $11 \leq B_s \leq 111$.

FIGS. 17C to 17E and 17F to 17H are further generalizations of the studies in FIGS. 17A and 17B, respectively. In FIGS. 17A and 17B, the relationships between the shot-noise ratio c and the $B_s$ satisfying the high-sensitivity condition and the high-dynamic-range condition under the condition of $B_h=1$ are clarified. On the other hand, in FIGS. 17C to 17E and FIGS. 17F to 17H, the relationships between $B_m$ and $B_s/B_m$ (=$1/B_h$) satisfying the high-sensitivity condition and the high-dynamic-range condition without fixing any of $B_m$, $B_h$, and $B_s$ are clarified. Here, $B_s/B_m$ is the software binning ratio and also used in FIGS. 13 and 16. Since $B_m=B_h \times B_s$, it can also be expressed as $B_s/B_m=1/B_h$.

Figure 17C:
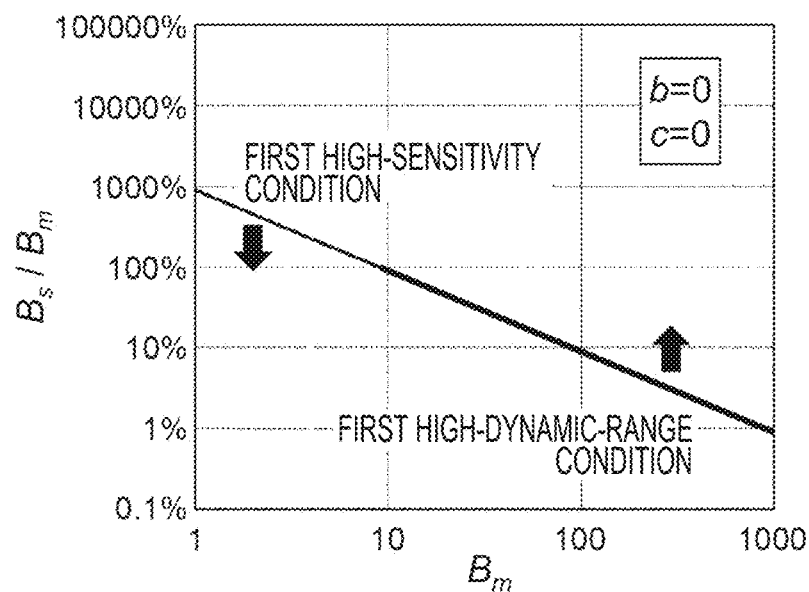
FIG. 17C is a diagram illustrating a relationship between $B_m$ (pixel number of bin) and $B_s/B_m$ (software-binning ratio) satisfying first high-sensitivity condition and first high-dynamic-range condition under conditions of b (dark-current-noise ratio)=0, and c (shot-noise ratio)=0.
Figure 17D:
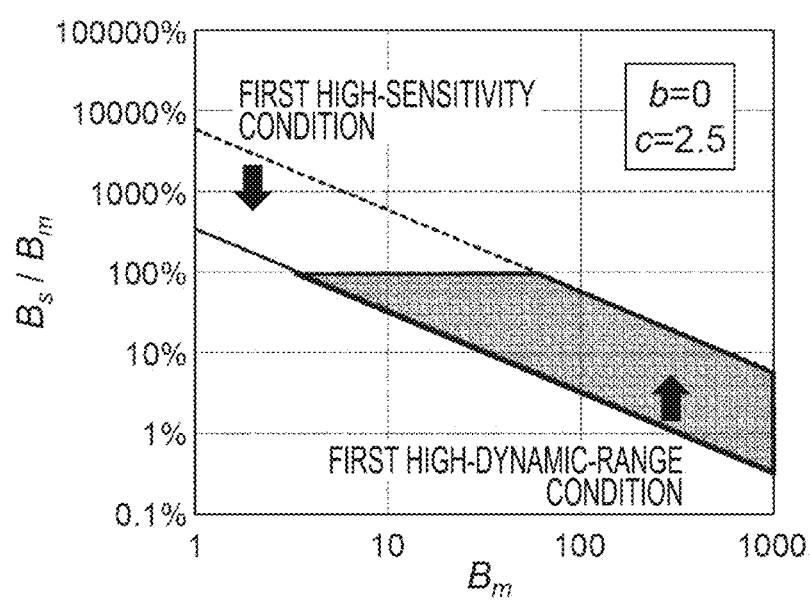
FIG. 17D is a diagram illustrating a relationship between $B_m$ (pixel number of bin) and $B_s/B_m$ (software-binning ratio) satisfying first high-sensitivity condition and first high-dynamic-range condition under conditions of b (dark-current-noise ratio)=0, and c (shot-noise ratio)=2.5.
Figure 17E:
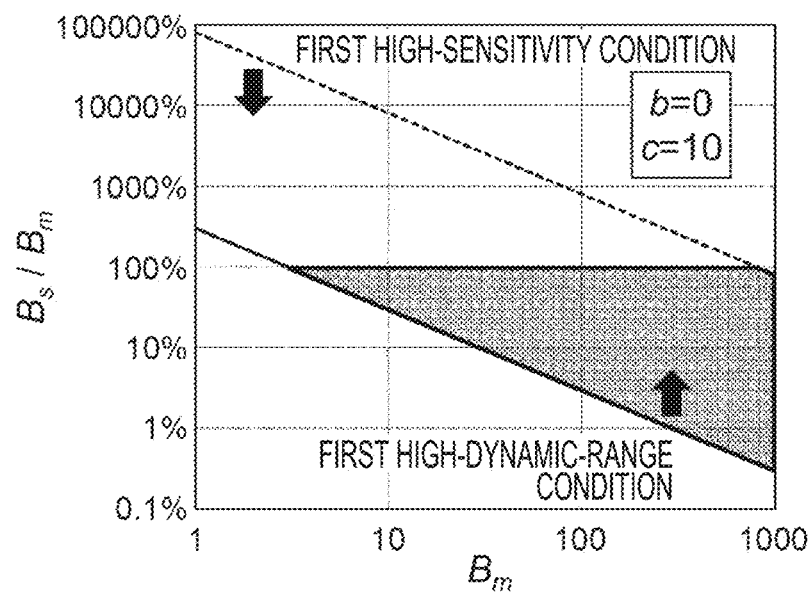
FIG. 17E is a diagram illustrating a relationship between $B_m$ (pixel number of bin) and $B_s/B_m$ (software-binning ratio) satisfying first high-sensitivity condition and first high-dynamic-range condition under conditions of b (dark-current-noise ratio)=0, and c (shot-noise ratio)=10.

FIGS. 17C to 17E illustrate the binning conditions (regions) that respectively satisfy the first high-sensitivity condition and the first high-dynamic-range condition in graphs where the horizontal axis is $B_m$ and the vertical axis is $B_s/B_m$. The noise compositions are set to b=0 and c=0 in FIG. 17C, b=0 and c=2.5 in FIG. 17D, and b=0 and c=10 in FIG. 17E. In each of the graphs, the region below the dotted line satisfies the first high-sensitivity condition and the region above the solid line satisfies the first high-dynamic-range condition. Therefore, in each of the graphs, the region sandwiched between both the straight lines satisfies both the first high-sensitivity condition and the first high-dynamic-range condition. Note that $B_s/B_m$ does not actually exceed 100%. Therefore, the thick-line portion in FIG. 17C and the shaded portions in gray in FIGS. 17D and 17E provide the binning conditions that achieves both the first high-sensitivity condition and the first high-dynamic-range condition. Similarly to the results in FIG. 17A, as the shot-noise ratio c increases, the region or the range of the binning conditions satisfying both of them expands. For example, at $B_s/B_m=100\%$, that is, at $B_h=1$ and $B_s=B_m$, both the first high-sensitivity condition and the first high-dynamic-range condition are satisfied under the conditions of $B_s=9$ when c=0, $4 \leq B_s \leq 59$ when c=2.5, and $3 \leq B_s \leq 809$ when c=10. These results can also be read from FIGS. 15A to 15C, FIGS. 16A to 16C, and FIG. 17A. Other rich information can also be read from FIGS. 17C to 17E. For example, at $B_s/B_m=50\%$, that is, at $B_h=2$ and $B_s=\frac{1}{2}*B_m$, the first high-sensitivity condition and the first high-dynamic-range condition are satisfied under the conditions of $B_s=18$ when c=0, $7 \leq B_s \leq 118$ when c=2.5, and $7 \leq B_s \leq 1618$ when c=10. Alternatively, at $B_s/B_m=33.33\%$, that is, at $B_h=3$, and $B_s=\frac{1}{3}*B_m$, the first high-sensitivity condition and the first high-dynamic-range condition are satisfied by setting $B_s=27$ when c=0, $11 \leq B_s \leq 177$ when c=2.5, and $10 \leq B_s \leq 2427$ when c=10. Furthermore, when α=k=3, the first high-sensitivity condition and the first high-dynamic-range condition are satisfied under the conditions of $3 \leq B_s \leq 27$ when c=0, $3 \leq B_s \leq 177$ when c=2.5, and $3 \leq B_s \leq 2427$ when c=10. Therefore, the range of the allowable binning conditions can be expanded.

Figure 17F:
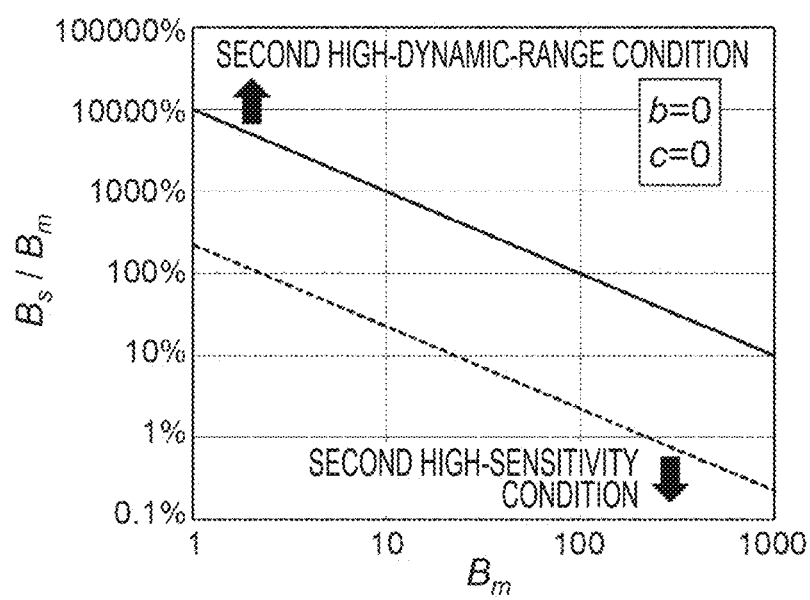
FIG. 17F is a diagram illustrating a relationship between $B_m$ (pixel number of bin) and $B_s/B_m$ (software-binning ratio) satisfying second high-sensitivity condition and second high-dynamic-range condition under conditions of b (dark-current-noise ratio)=0, and c (shot-noise ratio)=0.
Figure 17G:
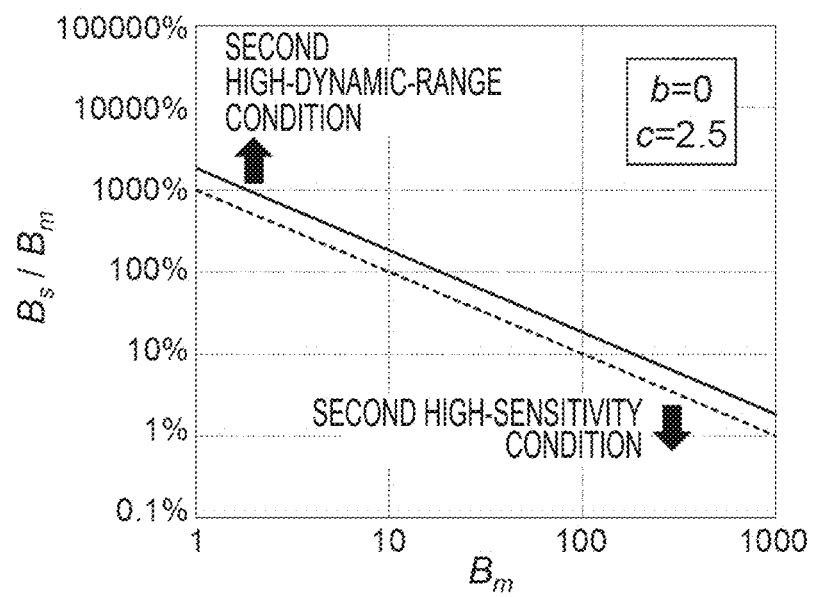
FIG. 17G is a diagram illustrating a relationship between $B_m$ (pixel number of bin) and $B_s/B_m$ (software-binning ratio) satisfying second high-sensitivity condition and second high-dynamic-range condition under conditions of b (dark-current-noise ratio)=0, and c (shot-noise ratio)=2.5.
Figure 17H:
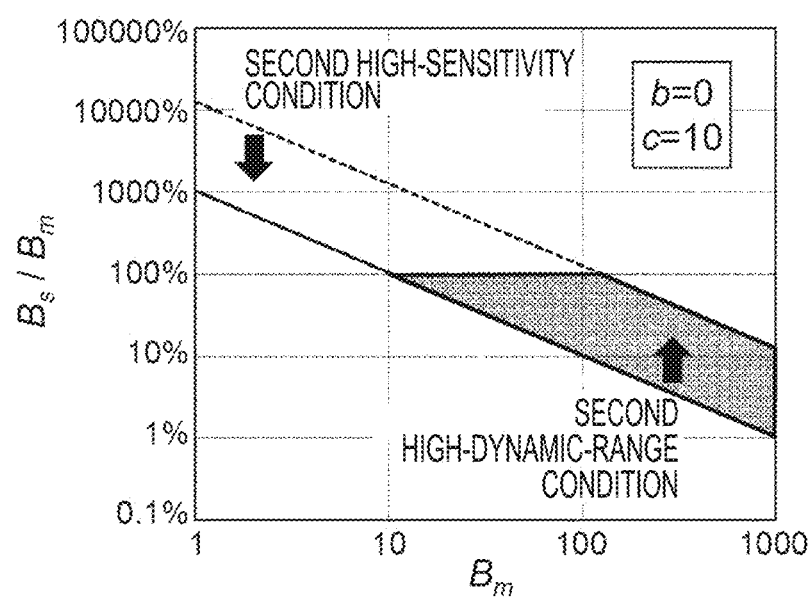
FIG. 17H is a diagram illustrating a relationship between $B_m$ (pixel number of bin) and $B_s/B_m$ (software-binning ratio) satisfying second high-sensitivity condition and second high-dynamic-range condition under conditions of b (dark-current-noise ratio)=0, and c (shot-noise ratio)=10.
Figure 18A:
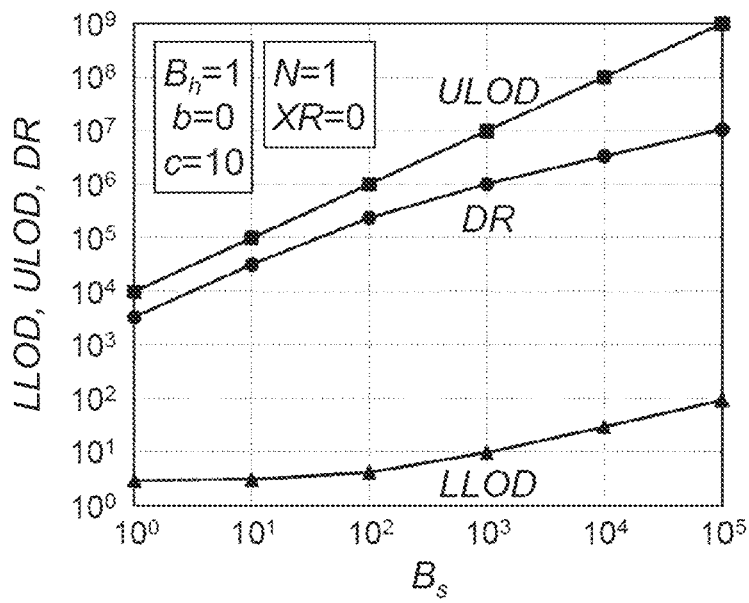
FIG. 18A illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=1, and XR (crosstalk ratio)=0.
Figure 18B:
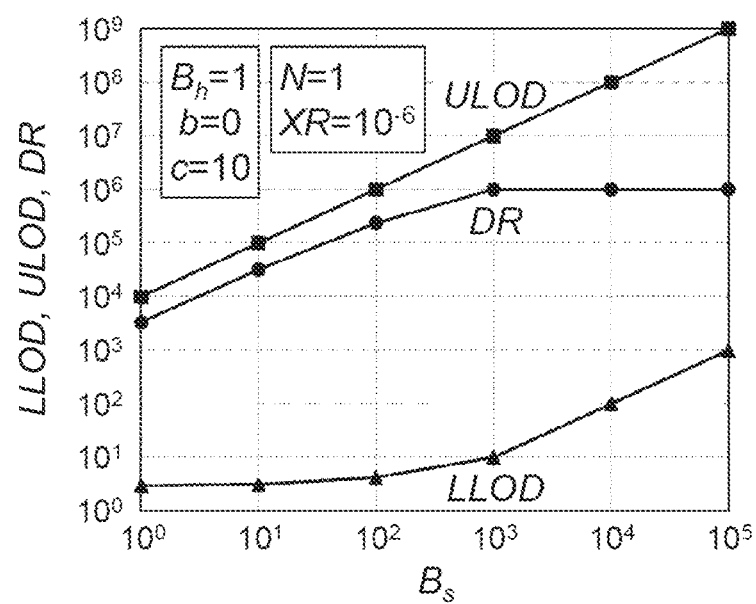
FIG. 18B illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=1, and XR (crosstalk ratio)=$10^{-6}$.
Figure 18C:
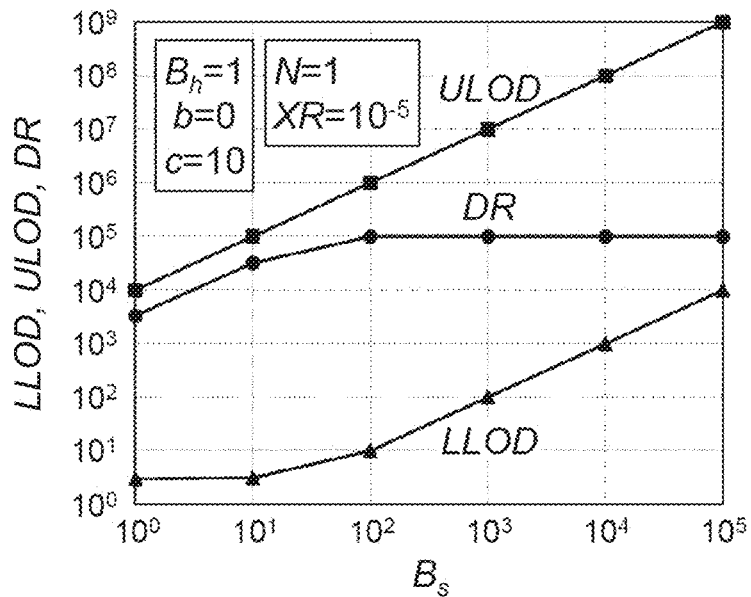
FIG. 18C illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=1, and XR (crosstalk ratio)=$10^{-5}$.
Figure 18D:
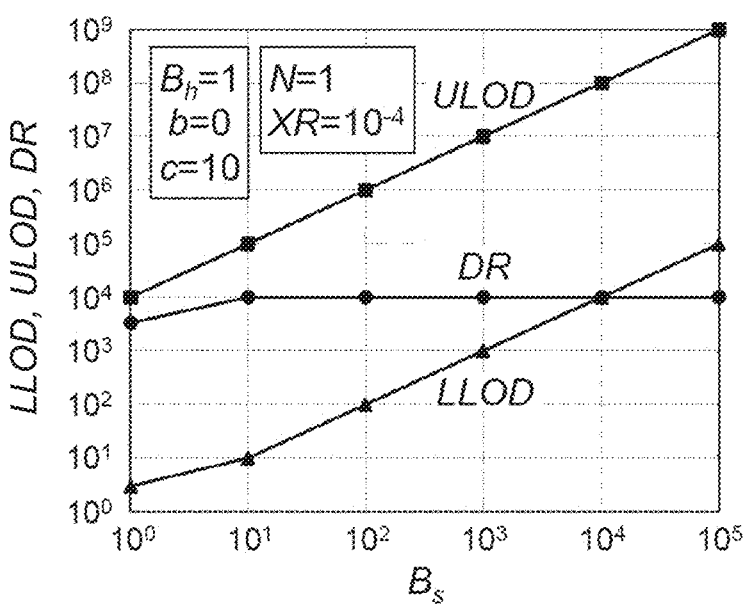
FIG. 18D illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=1, and XR (crosstalk ratio)=$10^{-4}$.
Figure 18E:
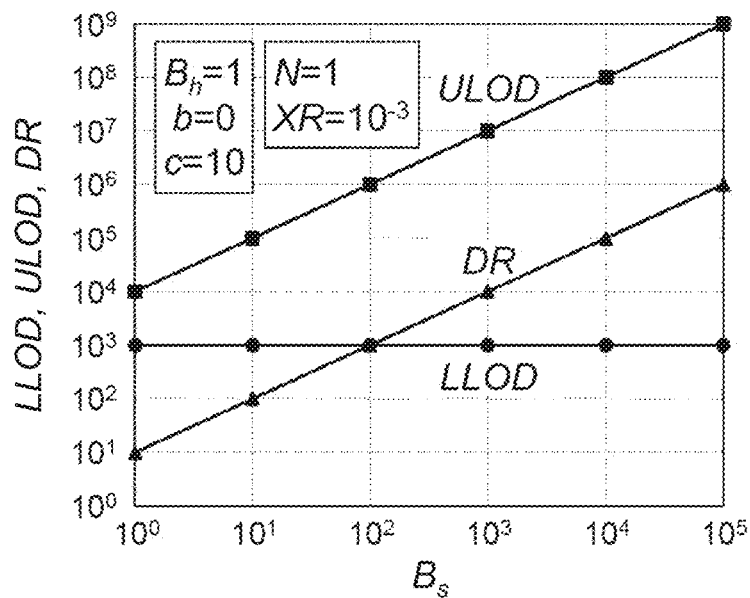
FIG. 18E illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=1, and XR (crosstalk ratio)=$10^{-3}$.
Figure 18F:
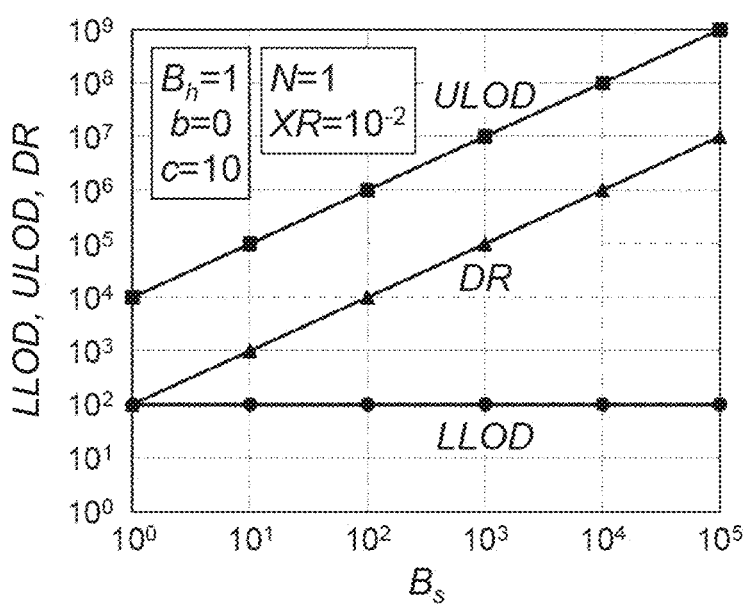
FIG. 18F illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=1, and XR (crosstalk ratio)=$10^{-2}$.

FIGS. 17F to 17H illustrate the binning conditions (regions) that respectively satisfy the second high-sensitivity condition and the second high-dynamic-range condition in graphs where the horizontal axis is $B_m$ and the vertical axis is $B_s/B_m$. The noise compositions are set to b=0 and c=0 in FIG. 17F, b=0 and c=2.5 in FIG. 17G, and b=0 and c=10 in FIG. 17H. In each of the graphs, the region below the dotted line satisfies the second high-sensitivity condition and the region above the solid line satisfies the second high-dynamic-range condition. Therefore, the region sandwiched between both the straight lines satisfies both the second high-sensitivity condition and the second high-dynamic-range condition. In FIG. 17F and FIG. 17G, clearly there is no solution. On the other hand, the portion shaded in gray in FIG. 17H provides the binning conditions for achieving both the second high-sensitivity condition and the second high-dynamic-range condition. Similar to the results in FIGS. 16A to 16C and 17B, the region or range of the binning conditions satisfying both of them are enlarged with the increase of the shot-noise ratio c. At $B_s/B_m=100\%$, that is, at $B_h=1$ and $B_s=B_m$, both the second high-sensitivity condition and the second high-dynamic-range condition are satisfied under the conditions of $11 \leq B_s \leq 127$ when c=10. These can also be read from FIGS. 15A to 15C and 17B. Other rich information can also be read from FIGS. 17F to 17H. For example, at $B_s/B_m=50\%$, that is, at $B_h=2$ and $B_s=\frac{1}{2}*B_m$, the second high-sensitivity condition and the second high-dynamic-range condition are satisfied under the conditions of $21 \leq B_s \leq 254$ when c=10. Alternatively, at $B_s/B_m=33.33\%$, that is, at $B_h=3$ and $B_s=\frac{1}{3}*B_m$, the second high-sensitivity condition and the second high-dynamic-range condition are satisfied under the conditions of $32 \leq B_s \leq 381$ when c=10. Furthermore, when α=k=3, the second high-sensitivity condition and the second high-dynamic-range condition are satisfied under the conditions of $11 \leq B_s \leq 381$ when c=10. Therefore, the range of the allowable binning conditions can be expanded.

As described above, sensitivity and dynamic range change depending on the configuration of the multicolor-detection optical system, the noise composition, and the binning condition. Therefore, it is effective to switch the binning condition according to what sensitivity or dynamic range is desired under given other conditions. For example, the optimum binning condition is different between the case where the sensitivity is prioritized and the case where the dynamic range is prioritized. In the multi-capillary electrophoresis instrument, it is convenient for the user to select a desired binning condition from a plurality of binning conditions.

Example 3

By the various methods of the present disclosure proposed above, both high sensitivity and high dynamic range can be achieved. However, it has become clear that expected sensitivity and dynamic range may not necessarily be obtained. Therefore, as a result of detailed studies by the present inventors, it was found that the spatial crosstalk inherent in the multicolor-detection optical system is the cause. Hereinafter, the present problem newly found will be described in detail.

As described in [Background Art], the multicolor-detection optical system includes a plurality of optical components. For example, a camera lens is a combination lens of a plurality of lenses. In order to suppress light reflections on the surfaces of these optical components, antireflection coating may be applied to the surfaces, but the light reflections cannot be zeroed. When multiple reflections of fluorescence occur between the surfaces of the plurality of optical components inside the multicolor-detection optical system, a false image such as a ghost or a flare of a light-emitting point (or more precisely, a false image of fluorescence emitted from a light-emitting point) may be projected on the image sensor due to the multiple reflections. Then, fluorescence measurement may be performed in a state where the true image and the false image of the light-emitting point overlap. Here, the true image may also be a wavelength-dispersed image of fluorescence emitted from the light-emitting point. The size of the false image for the light-emitting point is generally larger than the size of the true image for the light-emitting point. Therefore, the false image affects a wide area on the image sensor. For example, since the false image of the light-emitting point A can overlap not only the true image of the light-emitting point A but also the true image of the light-emitting point B, spatial crosstalk occurs from the light-emitting point A to the light-emitting point B. However, since the signal intensity of the false image is much lower than the signal intensity of the true image, the presence of the false image is not necessarily problematic. For example, when the signal intensity of the true image is small, the signal intensity of the false image is smaller than or equal to the lower limit of detection of the image sensor, and then there is no problem. On the contrary, when the signal intensity of the true image is high, the signal intensity of the false image exceeds the lower limit of detection, which can be problematic. Therefore, as the dynamic range in the fluorescence measurement by the image sensor increases, the present problem may become even more apparent. Since the main purpose of the present disclosure is to achieve both high sensitivity and high dynamic range, the greater the effect is, the more serious the problem may become. Therefore, the method for achieving both high sensitivity and high dynamic range according to the present disclosure may not function due to spatial crosstalk. This is a new problem found in the present disclosure.

In the above description, Expressions (1) to (6) are individually established for each light-emitting point. In a case where spatial crosstalk is considered, it is necessary to extend these expressions as follows. At each of the light-emitting points P(e) (e=1, 2, . . . , and E), fluorescence of each of the fluorophores D(e, g) (e=1, 2, . . . , and E, and g=1, 2, . . . , and G) is emitted. The fluorescence received in all the bins W(e, f) (e=1, 2, . . . , and E, and f=1, 2, . . . , and F) is measured. At an arbitrary time, the concentration of the fluorophore D(e, g) at the light-emitting point P(e) is denoted by Z(e, g), and the signal intensity of the bin W(e', f) for the light-emitting point P(e') is denoted by X(e', f). Here, a vector of (E×F) rows and 1 column having the signal intensity X(e', f) as an element is denoted by X. A vector of (E×G) rows and 1 column having the concentration Z(e, g) as an element is denoted by Z. A matrix of (E×F) rows and (E×G) columns having Y(e', f) (e, g) as an element is denoted by Y. The following Expressions (73) to (78) are established corresponding to Expressions (1) to (6).

[Expression 73]

$$X = Y \times Z \tag{73}$$

[Expression 74]

$$X = \begin{pmatrix} X(1,1) \\ \vdots \\ X(1,F) \\ X(2,1) \\ \vdots \\ X(E,F) \end{pmatrix} \tag{74}$$

[Expression 75]

$$Y = \begin{pmatrix} Y(1,1)(1,1) & \cdots & Y(1,1)(1,G) & Y(1,1)(2,1) & \cdots & Y(1,1)(E,G) \\ \vdots & \ddots & \vdots & \vdots & \ddots & \vdots \\ Y(1,F)(1,1) & \cdots & Y(1,F)(1,G) & Y(1,F)(2,1) & \cdots & Y(1,F)(E,G) \\ Y(2,1)(1,1) & \cdots & Y(2,1)(1,G) & Y(2,1)(2,1) & \cdots & Y(2,1)(E,G) \\ \vdots & \ddots & \vdots & \vdots & \ddots & \vdots \\ Y(E,F)(1,1) & \cdots & Y(E,F)(1,G) & Y(E,F)(2,1) & \cdots & Y(E,F)(E,G) \end{pmatrix} \tag{75}$$

[Expression 76]

$$Z = \begin{pmatrix} Z(1,1) \\ \vdots \\ Z(1,G) \\ Z(2,1) \\ \vdots \\ Z(E,G) \end{pmatrix} \tag{76}$$

[Expression 77]

$$\sum_{f=1}^{F} \sum_{e=1}^{E} Y(e,f)(e_0, g_0) = 1 \tag{77}$$

[Expression 78]

$$Z = Y^{-} \times X \tag{78}$$

Here, the element Y(e', f) (e, g) of the matrix Y of (E×F) rows and (E×G) columns is indicated by one of the following. (i) When e'=e, Y(e', f) (e, g) is the signal-intensity ratio at which the fluorescence of the fluorophore D(e, g) emitted from the light-emitting point P(e) is detected in the bin W(e, f) for the same light-emitting point P(e) due to spectral crosstalk. (ii) When e'≠e, Y(e', f) (e, g) is the signal-intensity ratio at which the fluorescence of the fluorophore D(e, g) emitted from the light-emitting point P(e) is detected in the bin W(e', f) for the different light-emitting point P(e') due to spatial crosstalk. At any one light-emitting point P($e_0$), any one type of fluorophore D($e_0$, $g_0$) is caused to emit the fluorescence alone, whereby each column Y(e, f) ($e_0$, $g_0$) (e=1, 2, . . . , and E, and f=1, 2, . . . , and F) of the matrix Y can be determined. Expression (77) is normalized such that the sum of (E×F) elements of each column Y(e, f) ($e_0$, $g_0$) of the matrix Y becomes 1. As described above, among the (E×F) elements of each column Y(e, f) ($e_0$, $g_0$) of the matrix Y, the F elements where e=$e_0$ indicate the spectral-crosstalk ratios, and the ((E−1)×F) elements where e≠$e_0$ indicate the spatial-crosstalk ratios. The above F elements, the spectral-crosstalk ratios are the same as the F elements of the elements Y(f) ($g_0$) of each column of the matrix Y of Expression (3). Note that the normalization condition is different between Expression (5) and Expression (77). In general, the spatial-crosstalk ratios<<the spectral-crosstalk ratios, but the spatial-crosstalk ratios may not be regarded as zero. Conversely, if all spatial-crosstalk ratios can be considered as 0, then Expressions (73) to (78) are the same as Expressions (1) to (6).

The maximum value among the spatial-crosstalk ratios indicated by the element Y(e', f) (e, g) where e'≠e in the matrix Y is referred to as a maximum spatial-crosstalk ratio XR2=Y($e_m$', $f_m$') ($e_m$, $g_m$). Here, it is assumed that the fluorescence of the fluorophore D($e_m$, $g_m$) emitted from the light-emitting point P($e_m$) is measured in the bin W($e_m$', $f_m$') for the light-emitting point P($e_m$') at the maximum spatial-crosstalk ratio XR2. That is, it is assumed that the maximum spatial crosstalk is obtained in the bin W($e_m$', $f_m$'). For the bin W($e_m$', $f_m$'), the number of pixels is denoted by $B_m$', the number of pixels of hardware binning is denoted by $B_h$', and the number of pixels of software binning is denoted by $B_s$'. The readout noise per single pixel is denoted by $N_r$. The dark-current noise per single pixel is denoted by $N_d$. The shot noise of the background light measured in the bin W($e_m$', $f_m$') in a state where light is emitted from each light-emitting point is denoted by $N_s$'. The dark-current-noise ratio is denoted by b. The shot-noise ratio is denoted by c'. The saturation-light-amount coefficient is denoted by α. The lower limit of detection LLOD, the upper limit of detection ULOD, and the dynamic range DR for the bin W($e_m$', $f_m$') are expressed by Expressions (79), (80), and (81) by modifying Expressions (13), (14), and (15), respectively.

[Expression 79]

$$LLOD = \sqrt{B'_s + b^2 \cdot B'_m + c'^2} \times 3 \cdot N_r \quad (79)$$

[Expression 80]

$$ULOD = B'_s \cdot \alpha \cdot M \quad (80)$$

[Expression 81]

$$DR = \frac{B'_s}{\sqrt{B'_s + b^2 \cdot B'_m + c^2}} \cdot \frac{\alpha \cdot M}{3 \cdot N_r} \quad (81)$$

On the other hand, the maximum value among the spectral-crosstalk ratios indicated by the element the element Y(e', f) (e, g) where e'=e in the matrix Y is referred to as a maximum spectral-crosstalk ratio XR1=Y($e_m$, $f_m$) ($e_m$, $g_m$). It is assumed that the fluorescence of the fluorophore D($e_m$, $g_m$) emitted from the light-emitting point P($e_m$) is measured in the bin W($e_m$, $f_m$) for the light-emitting point P($e_m$) at the maximum spectral-crosstalk ratio XR1. That is, it is assumed that the maximum spectrum crosstalk is obtained in the bin ($e_m$, $f_m$). For the bin W($e_m$, $f_m$), the number of pixels is denoted by $B_m$, the number of pixels of hardware binning is denoted by $B_h$, and the number of pixels of software binning is denoted by $B_s$. The readout noise per single pixel is denoted by $N_r$. The dark-current noise per single pixel is denoted by $N_d$. The shot noise of the background light when light is emitted from each light-emitting point and measured in the bin W($e_m$, $f_m$) is denoted by $N_s$. The dark-current-noise ratio is denoted by b. The shot-noise ratio is denoted by c. The saturation-light-amount coefficient is denoted by x. LLOD, ULOD, and DR for the bin W($e_m$, $f_m$) are expressed by Expression (13), Expression (14), and Expression (15), respectively.

As described above, based on the fluorescence of the fluorophore D($e_m$, $g_m$) emitted from the light-emitting point P($e_m$), a ratio of the maximum signal intensity measured by the spatial crosstalk to the maximum signal intensity measured by the spectral crosstalk is referred to as a crosstalk ratio XR, which is expressed as XR=XR2/XR1. When only the fluorophore D($e_m$, $g_m$) emits fluorescence at the light-emitting point P($e_m$), the crosstalk ratio XR also coincides with the maximum value of a ratio of the signal intensity of the concentration Z($e_m$', $g_m$') of the fluorophore D($e_m$', $g_m$') at the light-emitting point P ($e_m$') to the signal intensity of the concentration Z($e_m$, $g_m$) of the fluorophore D($e_m$, $g_m$) at the light-emitting point P ($e_m$), where the above signal intensities are derived by the color conversion of Expression (6). That is, the crosstalk ratio XR can be derived from both before and after color conversion, and is an index representing the influence of spatial crosstalk.

Here, it is assumed that the light amount at ULOD is measured in the bin W($e_m$, $f_m$) when the fluorescence of the fluorophore D($e_m$, $g_m$) is emitted from the light-emitting point P($e_m$). Then, the light amount of the maximum spatial crosstalk measured in the bin W($e_m$', $f_m$') for the light-emitting point P($e_m$') is obtained by multiplying the saturation-light amount at ULOD in Expression (14) by the crosstalk ratio XR. In order to realize both high sensitivity and high dynamic range without being affected by the spatial crosstalk, it is sufficient if the light amount of the maximum spatial crosstalk is smaller than LLOD in Expression (79). This condition is expressed by Expression (82).

[Expression 82]

$$XR \leq \frac{\sqrt{B'_s + b^2 \cdot B'_m + c'^2}}{B_s} \cdot \frac{3 \cdot N_r}{\alpha \cdot M} \quad (82)$$

Hereinafter, $B_m$'=$B_m$, $B_h$'=$B_h$, $B_s$'=$B_s$, $N_s$'=$N_s$, and c'=c by equalizing the binning conditions and the noise conditions for the light-emitting point P ($e_m$) and for the light-emitting point P ($e_m$'). Then, Expression (82) is expressed by Expression (83).

[Expression 83]

$$XR \leq \frac{\sqrt{B_s + b^2 \cdot B_m + c^2}}{B_s} \cdot \frac{3 \cdot N_r}{\alpha \cdot M} \quad (83)$$

Expressions (79), (73), and (81) are replaced with Expressions (13), (14), and (15), respectively. The right side of Expression (83) is the reciprocal of the dynamic range DR expressed by Expression (15). By satisfying Expression (83) above with the high-sensitivity condition and the high-dynamic-range condition proposed so far, for example, Expression (26) or Expression (27), it is possible to avoid the influence of spatial crosstalk and achieve both high sensitivity and high dynamic range.

Conversely, when Expression (83) is not satisfied, Expression (13) is replaced with the following Expression (84).

[Expression 84]

$$LLOD = XR \cdot B_s \cdot \alpha \cdot M \quad (84)$$

That is, LLOD is determined by the crosstalk ratio XR regardless of the binning condition and the noise condition. Since ULOD is still represented by Expression (14), the dynamic range DR is expressed by Expression (85).

[Expression 85]

$$DR = \frac{1}{XR} \quad (85)$$

Therefore, the dynamic range DR is also determined by the crosstalk ratio XR regardless of the binning condition and the noise condition.

From the above, it is clear that suppressing the crosstalk ratio XR to a low level is important for achieving both high sensitivity and high dynamic range. FIGS. 18A to 18F illustrate LLOD, ULOD, and DR against $B_s$ when the crosstalk ratio XR is changed from 0 to $10^{-2}$ based on the conditions in FIG. 15C where $B_h=1$, b=0, and c=10. Here, XR=0 in FIG. 18A, which shows the same results as FIG. 15C. And, XR=$10^{-6}$ in FIG. 18B, XR=$10^{-5}$ in FIG. 18C, XR=$10^{-4}$ in FIG. 18D, XR=$10^{-3}$ in FIG. 18E, and XR=$10^{-2}$ in FIG. 18F. In each graph, ULOD against $B_s$ is the same in each graph. On the other hand, LLOD and DR against $B_s$ are the same as those in FIG. 18A when Expression (83) is satisfied, but follow Expressions (84) and (85) when Expression (83) is not satisfied. As can be seen from FIG. 18, the effect of increasing DR by increasing $B_s$ is limited since the upper limit of DR decreases according to Expression (85) as the crosstalk ratio XR increases. According to the results of FIGS. 18A to 18F, it is found that XR≤$10^{-4}$ needs to be satisfied in order to satisfy the first high-sensitivity condition and the first high-dynamic-range condition.

Figure 19A:
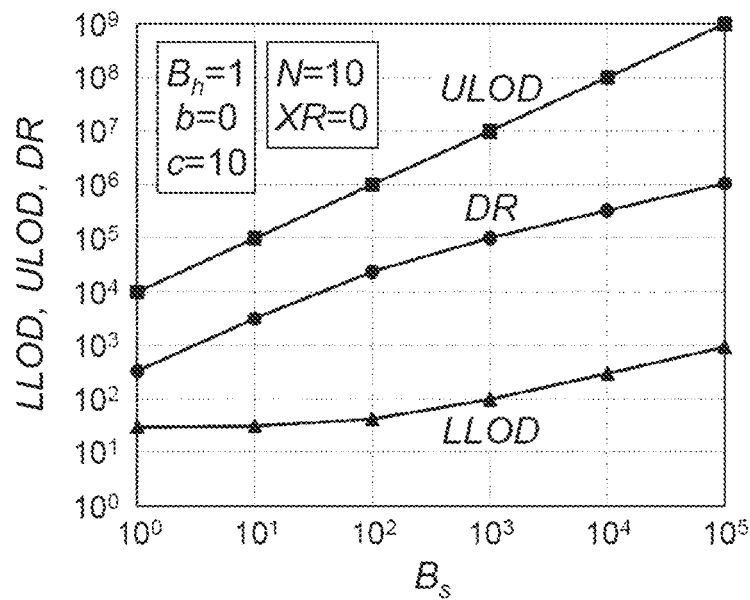
FIG. 19A illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=10, and XR (crosstalk ratio)=0.
Figure 19B:
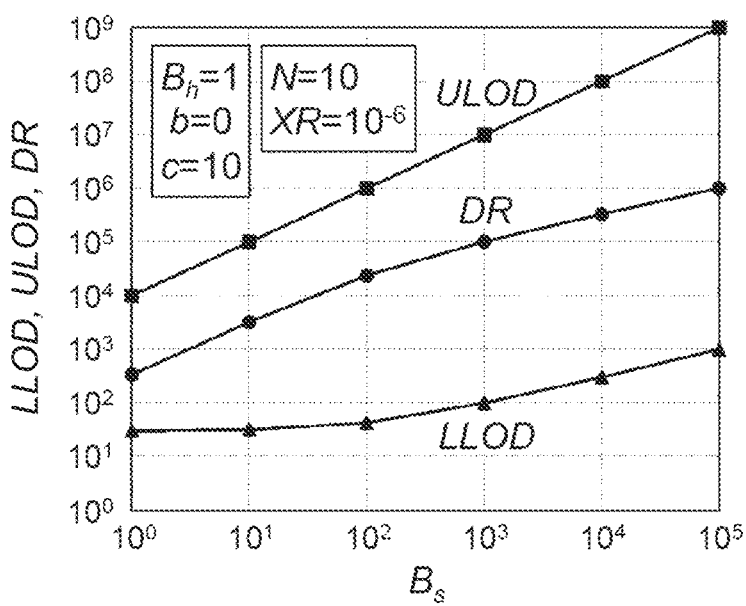
FIG. 19B illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=10, and XR (crosstalk ratio)=$10^{-6}$.
Figure 19C:
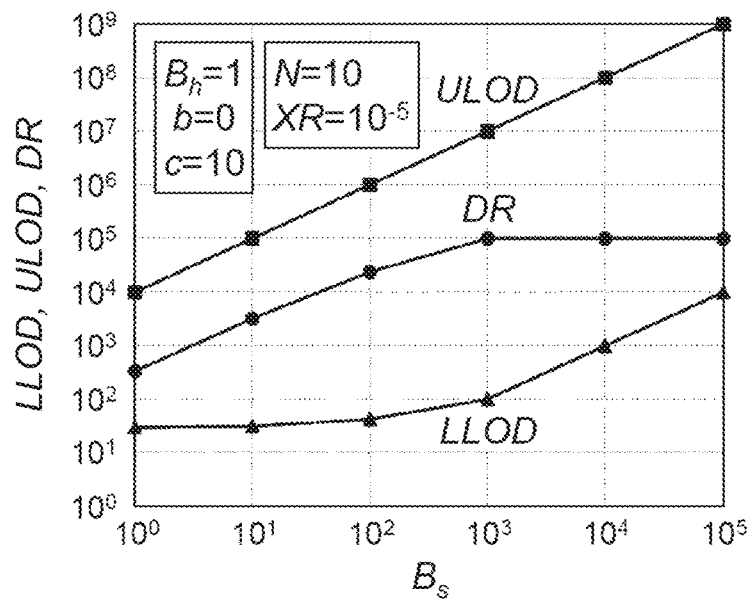
FIG. 19C illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=10, and XR (crosstalk ratio)=$10^{-5}$.
Figure 19D:
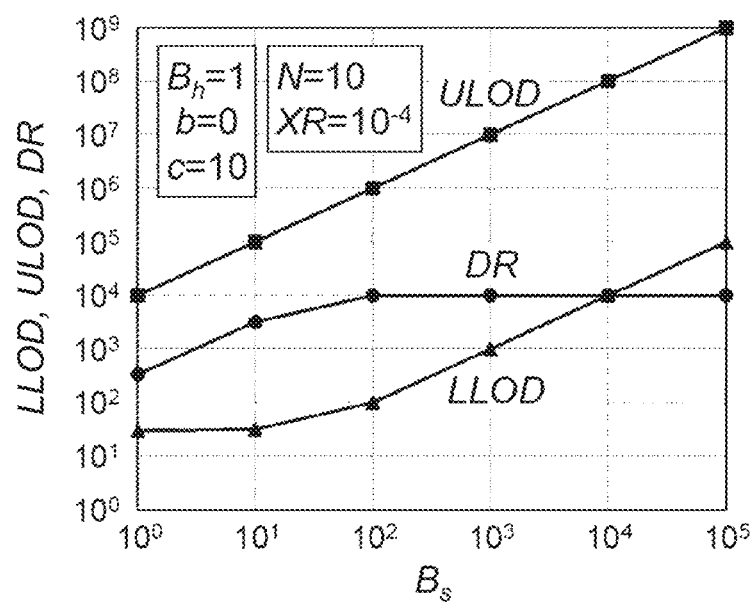
FIG. 19D illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=10, and XR (crosstalk ratio)=$10^{-4}$.
Figure 19E:
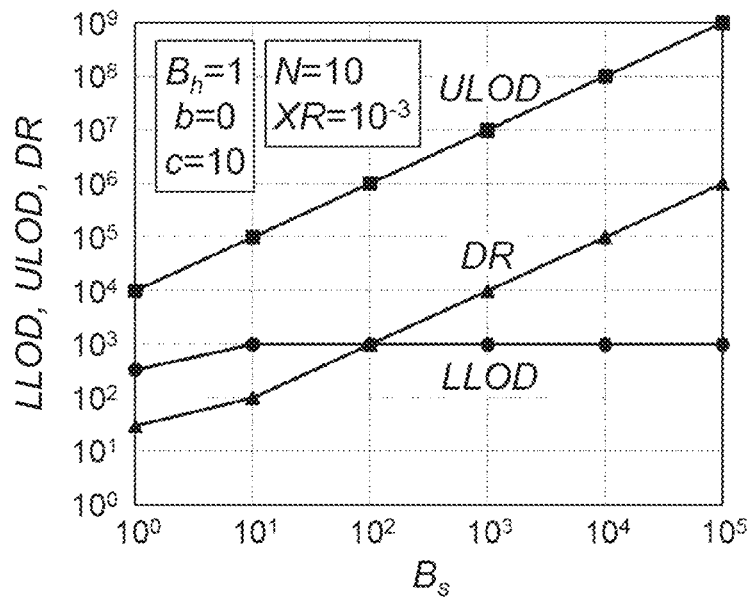
FIG. 19E illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=10, and XR (crosstalk ratio)=$10^{-3}$.
Figure 19F:
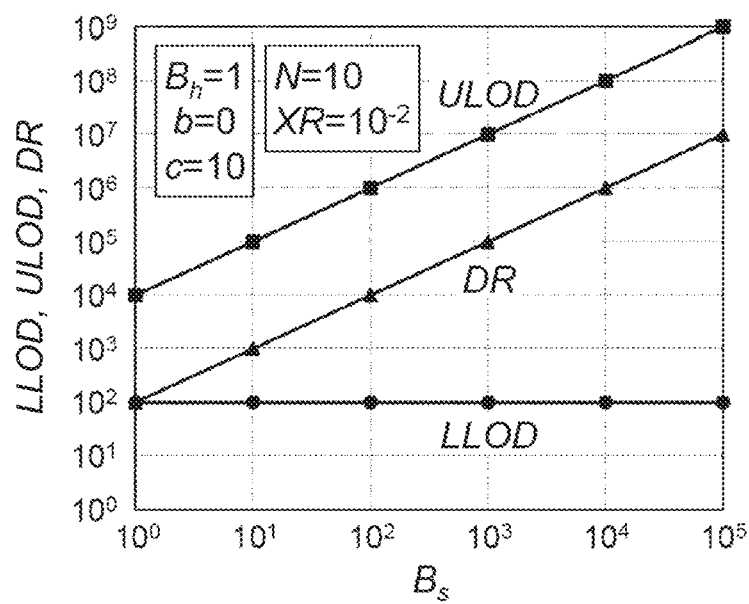
FIG. 19F illustrates a graph showing LLOD (lower limit of detection), ULOD (upper limit of detection), and DR (dynamic range) against $B_s$ (pixel number of software binning) under conditions of $B_h$ (pixel number of hardware binning)=1, b (dark-current-noise ratio)=0, c (shot-noise ratio)=10, N (total noise in case of $B_h=B_s=1$)=10, and XR (crosstalk ratio)=$10^{-2}$.

In FIGS. 18A to 18F, the total noise in the case of $B_h=B_s=1$ is constant at N=1. On the other hand, in FIGS. 19A to 19F, the total noise in the case of $B_h=B_s=1$ is changed and constant at N=10, and the other conditions are the same as those in FIG. 18. In FIG. 19A, the total noise is increased by one digit as compared with FIG. 18A. Accordingly, LLOD is increased by one digit overall, and DR is reduced by one digit. In FIGS. 19B to 19F, similarly to FIGS. 18B to 18F, it is found that the effect of increasing DR by increasing $B_s$ is limited, whereas the effect of increasing DR is obtained in a wider range. For example, according to the results in FIGS. 19A to 19F, it is found that XR≤$10^{-3}$ needs to be satisfied in order to satisfy the first high-sensitivity condition and the first high-dynamic-range condition. The range of the crosstalk ratio XR is wider by 1 digit than that in FIGS. 18A to 18F. In FIGS. 19A to 19F, the influence of increasing the total noise by one digit is examined. Alternatively, the same effects as those in FIGS. 19A to 19F can be obtained by reducing the saturation-light amount M per single pixel by one digit. The above can also be understood from the fact that the noise and the saturation-light amount are respectively contained in the numerator and the denominator of the right side of Expression (83).

As described above, in order to achieve both high sensitivity and high dynamic range, it is important to suppress the crosstalk ratio to be low in addition to satisfying the high-sensitivity condition and the high-dynamic-range condition represented by Expressions (8) to (67). There are several ways to reduce the crosstalk ratio. Although it is a basic means to apply a low-reflective antireflection coating to the surfaces of the constituent lenses of the camera lens, it may not be sufficient by itself. It is also effective to apply an antireflection coating to the surfaces of each optical component of the multicolor-detection optical system. For example, it is effective to apply an antireflection coating to the input/output surfaces of the transmission-type diffraction grating, particularly the surface on the side on which no engraving is applied. It is very effective to apply an antireflection coating to the surface of the image sensor, particularly both surfaces of the glass window of the image sensor, because such antireflection coating is often not applied.

Alternatively, it is also effective to reduce crosstalk by data processing. In the color conversion represented by Expression (6), spatial crosstalk is not considered. Therefore, in a case where the spatial crosstalk is significantly present, the influence thereof is directly reflected in the results. On the other hand, since the spatial crosstalk is considered in Expression (78), the influence of the spatial crosstalk can be reduced by Expression (78). That is, Expression (78) is a method of collectively canceling the spatial crosstalk and canceling the spectral crosstalk. Canceling the spectral crosstalk corresponds to the conventional color conversion. The crosstalk ratio XR=XR2/XR1 does not change even if Expression (78) is implemented. However, when only the fluorophore $D(e_m, g_m)$ emits fluorescence at the light-emitting point $P(e_m)$, and a crosstalk ratio XR is defined by the maximum value of the ratio of the signal intensity of the concentration $Z(e_m', g_m')$ of the fluorophore $D(e_m', g_m')$ at the light-emitting point $P(e_m')$ to the signal intensity of the concentration $Z(e_m, g_m)$ of the fluorophore $D(e_m, g_m)$ at the light-emitting point $P(e_m)$, the crosstalk ratio XR can be reduced by Expression (78). In this manner, by reducing the spatial crosstalk by the data processing of Expression (78), it is possible to achieve both high sensitivity and high dynamic range, which is the objects of the present disclosure.

[Modifications]

The present disclosure is not limited to the embodiments described above, but includes various modifications. For example, the above embodiments have been described in detail for easy understanding of the present disclosure, and the invention does not necessarily have all the configurations described. Some of certain embodiment can be replaced with the configuration of the other embodiment. Further, it is possible to add the configuration of one embodiment to the configuration of another embodiment. It is also possible to add, delete, or replace a part of the configuration of another embodiment with respect to a part of the configuration of each embodiment.

REFERENCE SIGNS LIST 1 capillary
2 sample-injection end
3 sample-elution end
4 cathode electrode
5 anode electrode
6 cathode-side-buffer solution
7 anode-side-buffer solution
8 power supply
9 pump block
10 valve
11 syringe
12 laser-light source
13 laser beam
14 light-emitting point
15 multicolor-detection optical system
16 first camera lens
17 longpass filter
18 transmission-type diffraction grating
19 second camera lens
20 image sensor
21 optical axis
22 fluorescence
23, 24, 25 dispersed fluorescence 26 overall image
27 wavelength-dispersed image
28 pixel
7-1 hardware binning region with $B_h=36$
8-1 to 8-12 hardware binning region with $B_h=3$
9-1 to 9-36 hardware binning region with $B_h=1$
10-1 hardware binning region with $B_h=4$
10-2 hardware binning region with $B_h=5$
10-3 hardware binning region with $B_h=6$
10-4 hardware binning region with $B_h=5$
10-5 hardware binning region with $B_h=4$
10-6 hardware binning region with $B_h=6$
10-7 hardware binning region with $B_h=5$
10-8 hardware binning region with $B_h=1$
$B_h$ number of pixels of hardware binning
$B_s$ number of pixels of software binning
b dark-current-noise ratio
c shot-noise ratio
LLOD lower limit of detection
ULOD upper limit of detection
DR dynamic range
$B_s/B_m$ software-binning ratio
N total noise
XR crosstalk ratio

The invention claimed is:

1. A multi-capillary electrophoresis instrument comprising:
E ($\geq 2$) samples containing components labeled with G ($\geq 2$) fluorophores are injected into E capillaries and simultaneously electrophoresed in the E capillaries;
a laser-light source configured to irradiate measurement portions of the E capillaries disposed on the same plane with a laser beam; and
an optical system that receives fluorescences of the G fluorophores excited by the laser beam when the G fluorophores pass through the measurement portions, wherein
the optical system includes:
a spectroscopic element configured to respectively disperse the fluorescences emitted from the E capillaries into F ($\geq 2$, F$\geq$G) predetermined wavelength bands; and
an image sensor having a plurality of two-dimensionally arranged pixels and configured to receive E×F dispersed fluorescences in E×F different bin regions on the image sensor,
the image sensor is configured to:
measure E×F signal intensities of the E×F dispersed fluorescences in the E×F bin regions; and
acquire time-series data of the E×F signal intensities by continuous repeated measurements at a predetermined exposure time and a predetermined time interval,
in a case where, in a bin region of any one of the E×F bin regions,
a number of pixels in the bin region is denoted by $B_m$ ($\geq 1$),
the bin region is divided into $B_s$ ($\geq 1$) hardware-binning regions,
an average number of pixels of the $B_s$ hardware-binning regions is denoted by $B_h$ ($\geq 1$),
a number of pixels of hardware binning in the bin region is denoted by $B_h$,
a number of pixels of software binning in the bin region is denoted by $B_s$,
$B_m=B_h\times B_s$,
a ratio of a maximum value of a saturation-light amount obtained by performing hardware binning to a saturation-light amount per single pixel of the image sensor is set as a saturation-light-amount ratio k ($\geq 1$),
a saturation-light-amount coefficient $\alpha$ is set to $\alpha=1$ when $B_h=1$, $\alpha=B_h$ when $1<B_h<k$, and $\alpha=k$ when $k\leq B_h$, and
$B_m=B_h=B_s=1$,
total noise of the time-series data is classified into three components of readout noise of the image sensor, dark-current noise of the image sensor, and shot noise of background light, and
when the total noise is denoted by N, the readout noise is denoted by $N_r$, the dark-current noise is denoted by $N_d$, and the shot noise is denoted by $N_s$, and
a dark-current-noise ratio is represented by $b=N_d/N_r$ and a shot-noise ratio is represented by $c=N_s/N_r$,
$B_m$, $B_h$, $B_s$, k, $\alpha$, b, and c satisfy a predetermined relationship.

2. The multi-capillary electrophoresis instrument according to claim 1, wherein

[Expression 1]

$$\frac{9+\sqrt{81+36\cdot\alpha^2\cdot(b^2+c^2+1)\cdot(B_m\cdot b^2+c^2)}}{2\cdot\alpha^2\cdot(b^2+c^2+1)} \leq$$

$$B_s \leq (9-B_m)\cdot b^2 + 8\cdot c^2 + 9$$

is satisfied.

3. The multi-capillary electrophoresis instrument according to claim 2, wherein
$B_h=1$, and

[Expression 2]

$$\frac{9\cdot(b^2+1)+\sqrt{81\cdot(b^2+1)^2+36\cdot\alpha^2\cdot(b^2+c^2+1)\cdot c^2}}{2\cdot\alpha^2\cdot(b^2+c^2+1)} \leq$$

$$B_s \leq \frac{9\cdot b^2 + 8\cdot c^2 + 9}{b^2+1}$$

is satisfied.

4. The multi-capillary electrophoresis instrument according to claim 1, wherein

[Expression 3]

$$\frac{100+\sqrt{10000+400\cdot\alpha^2\cdot(b^2+c^2+1)\cdot(B_m\cdot b^2+c^2)}}{2\cdot\alpha^2\cdot(b^2+c^2+1)} \leq$$

$$B_s \leq \frac{(9-4\cdot B_m)\cdot b^2 + 5\cdot c^2 + 9}{4}$$

is satisfied.

5. The multi-capillary electrophoresis instrument according to claim 4, wherein
$B_h=1$, and

[Expression 4]

$$\frac{100 \cdot (b^2+1) + \sqrt{10000 \cdot (b^2+1)^2 + 400 \cdot \alpha^2 \cdot (b^2+c^2+1) \cdot c^2}}{2 \cdot \alpha^2 \cdot (b^2+c^2+1)} \leq$$

$$B_s \leq \frac{9 \cdot b^2 + 5 \cdot c^2 + 9}{4 \cdot (b^2+1)}$$

is satisfied.

6. The multi-capillary electrophoresis instrument according to claim 1, wherein
$c \geq 2.5$,
$B_h=1$, and
$4 \leq B_s \leq 59$
are satisfied.

7. The multi-capillary electrophoresis instrument according to claim 1, wherein
$c \geq 10$,
$B_h=1$, and
$3 \leq B_s \leq 809$
are satisfied.

8. The multi-capillary electrophoresis instrument according to claim 7, wherein
$c \geq 10$,
$B_h=1$, and
$11 \leq B_s \leq 127$
are satisfied.

9. A multi-capillary electrophoresis instrument comprising:
E ($\geq 2$) samples containing components labeled with G ($\geq 2$) fluorophores are injected into E capillaries and simultaneously electrophoresed in the E capillaries;
a laser-light source configured to irradiate measurement portions of the E capillaries disposed on the same plane with a laser beam; and
an optical system that receives fluorescences of the G fluorophores excited by the laser beam when the G fluorophores pass through the measurement portions, wherein
the optical system includes:
a spectroscopic element configured to respectively disperse the fluorescences emitted from the E capillaries into F ($\geq 2$, F$\geq$G) predetermined wavelength bands; and
an image sensor having a plurality of two-dimensionally arranged pixels and configured to receive E×F dispersed fluorescences in E×F different bin regions on the image sensor,
the image sensor is configured to:
measure E×F signal intensities of the E×F dispersed fluorescences in the E×F bin regions;
when any one fluorophore of the G fluorophores emits fluorescence from the measurement portion of any one capillary of the E capillaries,
derive F normalized signal intensities by normalizing the F signal intensities in the F bin regions for the one capillary so that a maximum value of the F signal intensities becomes 1;
set a merged-bin region that merges bin regions having the normalized signal intensity of 0.5 or more among the F normalized-signal intensities and derive a merged-signal intensity in the merged-bin region; and assume to acquire time-series data of a merged-signal intensity in the merged-bin region by continuous repeated measurements at a predetermined exposure time and a predetermined time interval,
a number of pixels in the merged-bin region is denoted by $B_m$ ($\geq 1$),
the merged-bin region is divided into $B_s$ ($\geq 1$) hardware-binning regions,
an average number of pixels of the $B_s$ hardware-binning regions is denoted by $B_h$ ($\geq 1$),
a number of pixels of hardware binning in the merged-bin region is denoted by $B_h$,
a number of pixels of software binning in the merged-bin region is denoted by $B_s$, $B_m = B_h \times B_s$, a ratio of a maximum value of a saturation-light amount obtained by performing hardware binning to a saturation-light amount per single pixel of the image sensor is set as a saturation-light-amount ratio k ($\geq 1$),
a saturation-light-amount coefficient $\alpha$ is set to $\alpha=1$ when $B_h=1$, $\alpha=B_h$ when $1<B_h<k$, and $\alpha=k$ when $k \leq B_h$, and
when $B_m=B_h=B_s=1$,
total noise of the time-series data is classified into three components of readout noise of the image sensor, dark-current noise of the image sensor, and shot noise of background light, and
the total noise is denoted by N, the readout noise is denoted by $N_r$, the dark-current noise is denoted by $N_d$, and the shot noise is denoted by $N_s$, and
a dark-current-noise ratio is represented by $b=N_d/N_r$ and a shot-noise ratio is represented by $c=N_s/N_r$,
$B_m$, $B_h$, $B_s$, k, $\alpha$, b, and c satisfy a predetermined relationship.

10. The multi-capillary electrophoresis instrument according to claim 9, wherein

[Expression 5]

$$\frac{9 + \sqrt{81 + 36 \cdot \alpha^2 \cdot (b^2+c^2+1) \cdot (B_m \cdot b^2 + c^2)}}{2 \cdot \alpha^2 \cdot (b^2+c^2+1)} \leq$$

$$B_s \leq (9 - B_m) \cdot b^2 + 8 \cdot c^2 + 9$$

is satisfied.

11. The multi-capillary electrophoresis instrument according to claim 10, wherein
$B_h=1$, and

[Expression 6]

$$\frac{9 \cdot (b^2+1) + \sqrt{81 \cdot (b^2+1)^2 + 36 \cdot \alpha^2 \cdot (b^2+c^2+1) \cdot c^2}}{2 \cdot \alpha^2 \cdot (b^2+c^2+1)} \leq$$

$$B_s \leq \frac{9 \cdot b^2 + 8 \cdot c^2 + 9}{b^2+1}$$

is satisfied.

12. The multi-capillary electrophoresis instrument according to claim 9, wherein

[Expression 7]

$$\frac{100 + \sqrt{10000 + 400 \cdot \alpha^2 \cdot (b^2 + c^2 + 1) \cdot (B_m \cdot b^2 + c^2)}}{2 \cdot \alpha^2 \cdot (b^2 + c^2 + 1)} \leq$$

$$B_s \leq \frac{(9 - 4 \cdot B_m) \cdot b^2 + 5 \cdot c^2 + 9}{4}$$

is satisfied.

13. The multi-capillary electrophoresis instrument according to claim 12, wherein
$B_h=1$, and

[Expression 8]

$$\frac{100 \cdot (b^2 + 1) + \sqrt{10000 \cdot (b^2 + 1)^2 + 400 \cdot \alpha^2 \cdot (b^2 + c^2 + 1) \cdot c^2}}{2 \cdot \alpha^2 \cdot (b^2 + c^2 + 1)} \leq$$

$$B_s \leq \frac{9 \cdot b^2 + 5 \cdot c^2 + 9}{4 \cdot (b^2 + 1)}$$

is satisfied.

14. A multi-capillary electrophoresis instrument comprising:
E ($\geq 2$) samples containing components labeled with G ($>2$) fluorophores are injected into E capillaries and simultaneously electrophoresed in the E capillaries;
a laser-light source configured to irradiate a measurement portions of the E capillaries disposed on the same plane with a laser beam; and
an optical system that receives fluorescences of the G fluorophores excited by the laser beam when the G fluorophores pass through the measurement portions, wherein
the optical system includes:
a spectroscopic element configured to respectively disperse the fluorescences emitted from the E capillaries into F ($\geq 2$, F$\geq$G) predetermined wavelength bands; and
an image sensor having a plurality of two-dimensionally arranged pixels and configured to receive E×F dispersed fluorescences in E×F different bin regions on the image sensor,
the image sensor is configured to:
measure E×F signal intensities of the E×F dispersed fluorescences in the E×F bin regions;
acquire first time-series data of the E×F signal intensities by continuous repeated measurements at a predetermined exposure time and a predetermined time interval; and
derive second time-series data of E x G concentrations of the G fluorophores at the measurement portions of the E capillaries by calculation using the first time-series data,
when any one fluorophore of the G fluorophores emits fluorescence from the measurement portion of any one capillary of the E capillaries, and
in a case where XR is a ratio of a maximum value of the concentrations of the G fluorophores at the measurement portions of the E capillaries excluding the one capillary to the concentration of the one the fluorophore at the measurement portion of the one capillary, in a bin region of any one of the E×F bin regions,
a number of pixels in the bin region is denoted by $B_m$ ($\geq 1$),
the bin region is divided into $B_s$ ($\geq 1$) hardware-binning regions,
an average number of pixels of the $B_s$ hardware-binning regions is denoted by $B_h$ ($\geq 1$),
a number of pixels of hardware binning in the bin region is denoted by $B_h$,
a number of pixels of software binning in the bin region is denoted by $B_s$, $B_m = B_h \times B_s$, a ratio of a maximum value of a saturation-light amount obtained by performing hardware binning to a saturation-light amount per single pixel of the image sensor is set as a saturation-light-amount ratio k ($\geq 1$),
a saturation-light-amount coefficient $\alpha$ is set to $\alpha=1$ when $B_h=1$, $\alpha=B_h$ when $1<B_h<k$, and $\alpha=k$ when $k \leq B_h$, and $B_m = B_h = B_s = 1$, total noise of the first time-series data is classified into three components of readout noise of the image sensor, dark-current noise of the image sensor, and shot noise of background light, and
when the total noise is denoted by N, the readout noise is denoted by $N_r$, the dark-current noise is denoted by $N_d$, and the shot noise is denoted by $N_s$, and
a dark-current-noise ratio is represented by $b=N_d/N_r$ and a shot-noise ratio is represented by $c=N_s/N_r$,
XR, $B_m$, $B_h$, $B_s$, k, $\alpha$, b, and c satisfy a predetermined relationship.

15. The multi-capillary electrophoresis instrument according to claim 14, wherein
$XR \leq 10^{-3}$, and

[Expression 9]

$$\frac{9 + \sqrt{81 + 36 \cdot \alpha^2 \cdot (b^2 + c^2 + 1) \cdot (B_m \cdot b^2 + c^2)}}{2 \cdot \alpha^2 \cdot (b^2 + c^2 + 1)} \leq$$

$$B_s \leq (9 - B_m) \cdot b^2 + 8 \cdot c^2 + 9$$

is satisfied.

16. The multi-capillary electrophoresis instrument according to claim 15, wherein
$B_h=1$, and

[Expression 10]

$$\frac{9 \cdot (b^2 + 1) + \sqrt{81 \cdot (b^2 + 1)^2 + 36 \cdot \alpha^2 \cdot (b^2 + c^2 + 1) \cdot c^2}}{2 \cdot \alpha^2 \cdot (b^2 + c^2 + 1)} \leq$$

$$B_s \leq \frac{9 \cdot b^2 + 8 \cdot c^2 + 9}{b^2 + 1}$$

is satisfied.

17. The multi-capillary electrophoresis instrument according to claim 14, wherein XR≤10⁻³, and

[Expression 11]

$$\frac{100+\sqrt{10000+400\cdot\alpha^2+(b^2+c^2+1)\cdot(B_m\cdot b^2+c^2)}}{2\cdot\alpha^2\cdot(b^2+c^2+1)} \le$$

$$B_s \le \frac{(9-4\cdot B_m)\cdot b^2+5\cdot c^2+9}{4}$$

is satisfied.

18. The multi-capillary electrophoresis instrument according to claim 17, wherein
$B_h=1$, and

[Expression 12]

$$\frac{100\cdot(b^2+1)+\sqrt{10000\cdot(b^2+1)^2+400\cdot\alpha^2\cdot(b^2+c^2+1)\cdot c^2}}{2\cdot\alpha^2\cdot(b^2+c^2+1)} \le$$

$$B_s \le \frac{9\cdot b^2+5\cdot c^2+9}{4\cdot(b^2+1)}$$

is satisfied.

19. A multi-capillary electrophoresis instrument comprising:
E (>2) samples containing components labeled with G (≥2) fluorophores are injected into E capillaries and simultaneously electrophoresed in the E capillaries;
a laser-light source configured to irradiate measurement portions of the E capillaries disposed on the same plane with a laser beam;
an optical system that receives fluorescences of the G fluorophores excited by the laser beam when the G fluorophores pass through the measurement portions; and
a computer configured to control the instrument, wherein the optical system includes:
a spectroscopic element configured to respectively disperse the fluorescences emitted from the E capillaries into F (>2, F≥G) predetermined wavelength bands; and
an image sensor having a plurality of two-dimensionally arranged pixels and configured to receive E×F dispersed fluorescences in E×F different bin regions on the image sensor,
the image sensor is configured to:
measure E×F signal intensities of the E×F dispersed fluorescences in the E×F bin regions; and
acquire time-series data of the E×F signal intensities by continuous repeated measurements at a predetermined exposure time and a predetermined time interval,
in a case where, in a bin region of any one of the E×F bin regions,
a number of pixels in the bin region is denoted by $B_m$ (≥1),
the bin region is divided into $B_s$ (≥1) hardware-binning regions,
an average number of pixels of the hardware-binning regions is denoted by $B_h$ (≥1),
a number of pixels of hardware binning in the bin region is denoted by $B_h$,
a number of pixels of software binning in the bin region is denoted by $B_s$,
$B_m=B_h\times B_s$,
a ratio of a maximum value of a saturation-light amount obtained by performing hardware binning to a saturation-light amount per single pixel of the image sensor is set as a saturation-light-amount ratio k (≥1),
a saturation-light-amount coefficient α is set to α=1 when $B_h=1$, α=$B_h$ when 1<$B_h$<k, and α=k when k≤$B_h$, and $B_m=B_h=B_s=1$,
total noise of the time-series data is classified into three components of readout noise of the image sensor, dark-current noise of the image sensor, and shot noise of background light, and
when the total noise is denoted by N, the readout noise is denoted by $N_r$, the dark-current noise is denoted by $N_d$, and the shot noise is denoted by $N_s$, and
a dark-current-noise ratio is represented by $b=N_d/N_r$ and a shot-noise ratio is represented by $c=N_s/N_r$,
a plurality of types of predetermined relationships satisfied by $B_m$, $B_h$, $B_s$, k, α, b, and c are provided, and
the computer is configured to provide an environment in which a desired predetermined relationship can be selected from among the plurality of types of predetermined relationships.

20. The multi-capillary electrophoresis instrument according to claim 19, wherein
the computer provides a user interface that allows a user to select the desired predetermined relationship.

* * * * *